(12) United States Patent
Desing et al.

(10) Patent No.: US 10,975,921 B2
(45) Date of Patent: Apr. 13, 2021

(54) SYSTEMS, METHODS, AND APPARATUS TO CONTROL FLUID ASSOCIATED WITH VEHICLE CLUTCHES

(71) Applicant: JTEKT AUTOMOTIVE NORTH AMERICA, INC., Plymouth, MI (US)

(72) Inventors: Patrick Desing, Simpsonville, SC (US); Shun Ono, Novi, MI (US); Evan Swinger, Farmington Hills, MI (US); Sean Hayes, Farmington Hills, MI (US); Masaki Mita, Novi, MI (US)

(73) Assignee: JTEKT AUTOMOTIVE NORTH AMERICA, INC., Plymouth, MI (US)

( * ) Notice: Subject to any disclaimer, the term of this patent is extended or adjusted under 35 U.S.C. 154(b) by 122 days.

(21) Appl. No.: 16/425,555

(22) Filed: May 29, 2019

(65) Prior Publication Data
US 2020/0378450 A1    Dec. 3, 2020

(51) Int. Cl.
| | | |
|---|---|---|
| *F16D 25/06* | (2006.01) | |
| *F16D 25/10* | (2006.01) | |
| *F16D 48/02* | (2006.01) | |
| *F16D 48/06* | (2006.01) | |
| *B60K 23/02* | (2006.01) | |
| *F16D 25/0638* | (2006.01) | |
| *B60K 17/02* | (2006.01) | |
| *F16D 13/52* | (2006.01) | |

(Continued)

(52) U.S. Cl.
CPC .......... *F16D 25/0638* (2013.01); *B60K 17/02* (2013.01); *F16D 13/52* (2013.01); *F16D 25/10* (2013.01); *F16D 48/0206* (2013.01); *F16D 48/066* (2013.01); *B60K 23/02* (2013.01); *F16D 2121/04* (2013.01); *F16D 2131/02* (2013.01)

(58) Field of Classification Search
None
See application file for complete search history.

(56) References Cited

U.S. PATENT DOCUMENTS

| | | | | |
|---|---|---|---|---|
| 3,948,146 | A * | 4/1976 | Maurer | F15B 11/02 91/517 |
| 5,810,142 | A * | 9/1998 | Schaefer | F16D 25/0638 137/517 |

(Continued)

FOREIGN PATENT DOCUMENTS

| | | |
|---|---|---|
| JP | 58-150650 | 10/1983 |
| JP | 2013-253615 A | 12/2013 |
| WO | 2013/045444 A1 | 4/2013 |

*Primary Examiner* — Colby M Hansen
(74) *Attorney, Agent, or Firm* — Oblon, McClelland, Maier & Neustadt, L.L.P.

(57) ABSTRACT

Systems, apparatus, and methods to control fluid associated with vehicle clutches are disclosed. A disclosed apparatus includes a drive unit assembly for a vehicle. The drive unit assembly includes a housing and a clutch in a cavity of the housing. Rotation of a drum of the clutch expels a fluid from the cavity. The apparatus also includes a vehicle controller configured to disengage the clutch via an actuator. Actuation of the actuator reduces a flow of the fluid into the cavity. The vehicle controller is also configured to maintain engagement of a vehicle transfer device operatively coupled between a vehicle transmission and the drum such that the drum continues to rotate for a time interval during which the clutch is disengaged.

20 Claims, 18 Drawing Sheets

(51) Int. Cl.
*F16D 131/02* (2012.01)
*F16D 121/04* (2012.01)

(56) References Cited

U.S. PATENT DOCUMENTS

2015/0041274 A1* 2/2015 Bouton .................. F16D 13/72
 192/66.3
2017/0204915 A1* 7/2017 Miles ...................... F16D 13/74

* cited by examiner

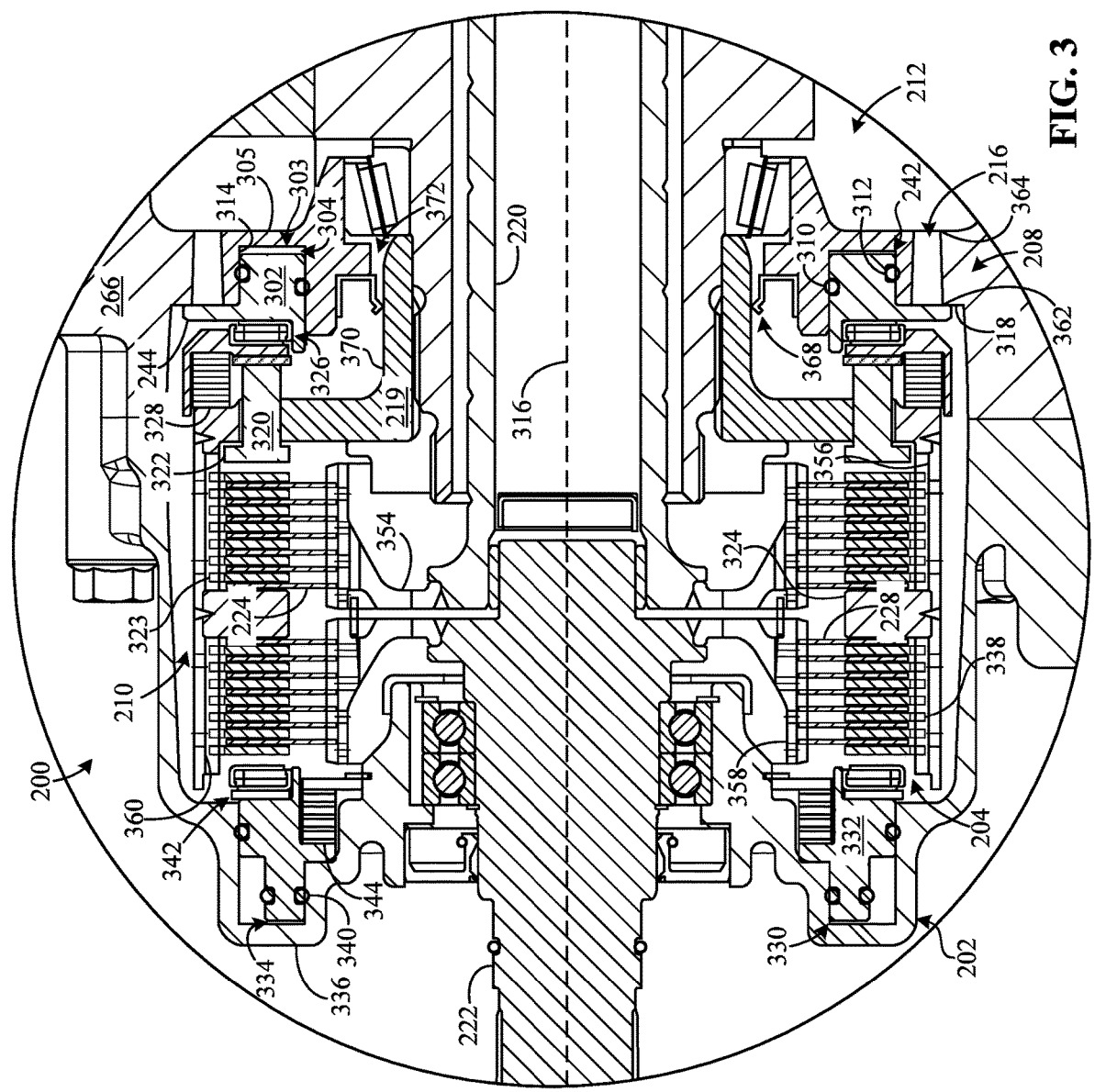
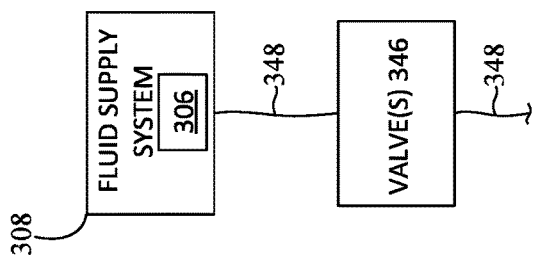
FIG. 3

SYSTEMS, METHODS, AND APPARATUS TO CONTROL FLUID ASSOCIATED WITH VEHICLE CLUTCHES

FIELD OF THE DISCLOSURE

This disclosure relates generally to vehicles and, more particularly, to systems, methods, and apparatus to control fluid associated with vehicle clutches.

BACKGROUND

Motor vehicles typically employ clutch systems to facilitate transferring torque from an engine to a vehicle driveshaft and/or one or more vehicle axles. Some vehicle clutch systems utilize fluids (sometimes referred to as wet clutches) such as oil for moving components (e.g., a clutch pack) of a clutch to cool and/or lubricate the components, which improves clutch performance and/or increases a lifespan of the clutch. Typically, the clutch is immersed in an oil bath within a sealed cavity of a housing.

SUMMARY

An example apparatus includes a drive unit assembly for a vehicle. The drive unit assembly includes a housing and a clutch in a cavity of the housing. Rotation of a drum of the clutch expels a fluid from the cavity. The apparatus also includes a vehicle controller configured to disengage the clutch via an actuator. Actuation of the actuator reduces a flow of the fluid into the cavity. The vehicle controller is also configured to maintain engagement of a vehicle transfer device operatively coupled between a vehicle transmission and the drum such that the drum continues to rotate for a time interval during which the clutch is disengaged.

Another example apparatus includes a drive unit assembly for a vehicle. The drive unit assembly includes a housing and a clutch in a cavity of the housing. Rotation of a drum of the clutch expels a fluid from the cavity. The apparatus also includes a vehicle controller configured to disengage a vehicle transfer device operatively coupled between a vehicle transmission and the drum to disconnect the drum from the vehicle transmission. The vehicle controller is also configured to disengage the clutch via an actuator such that the drum maintains a connection to a vehicle wheel for a time during which the vehicle transfer device is disengaged. Actuation of the actuator reduces a flow of the fluid into the cavity.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 is an enlarged partial-view of the drive unit assembly of FIG. 2 and shows a first example configuration of an example clutch and an example actuator system;

In general, the same reference numbers will be used throughout the drawing(s) and accompanying written description to refer to the same or like parts.

DETAILED DESCRIPTION

Figure 1:
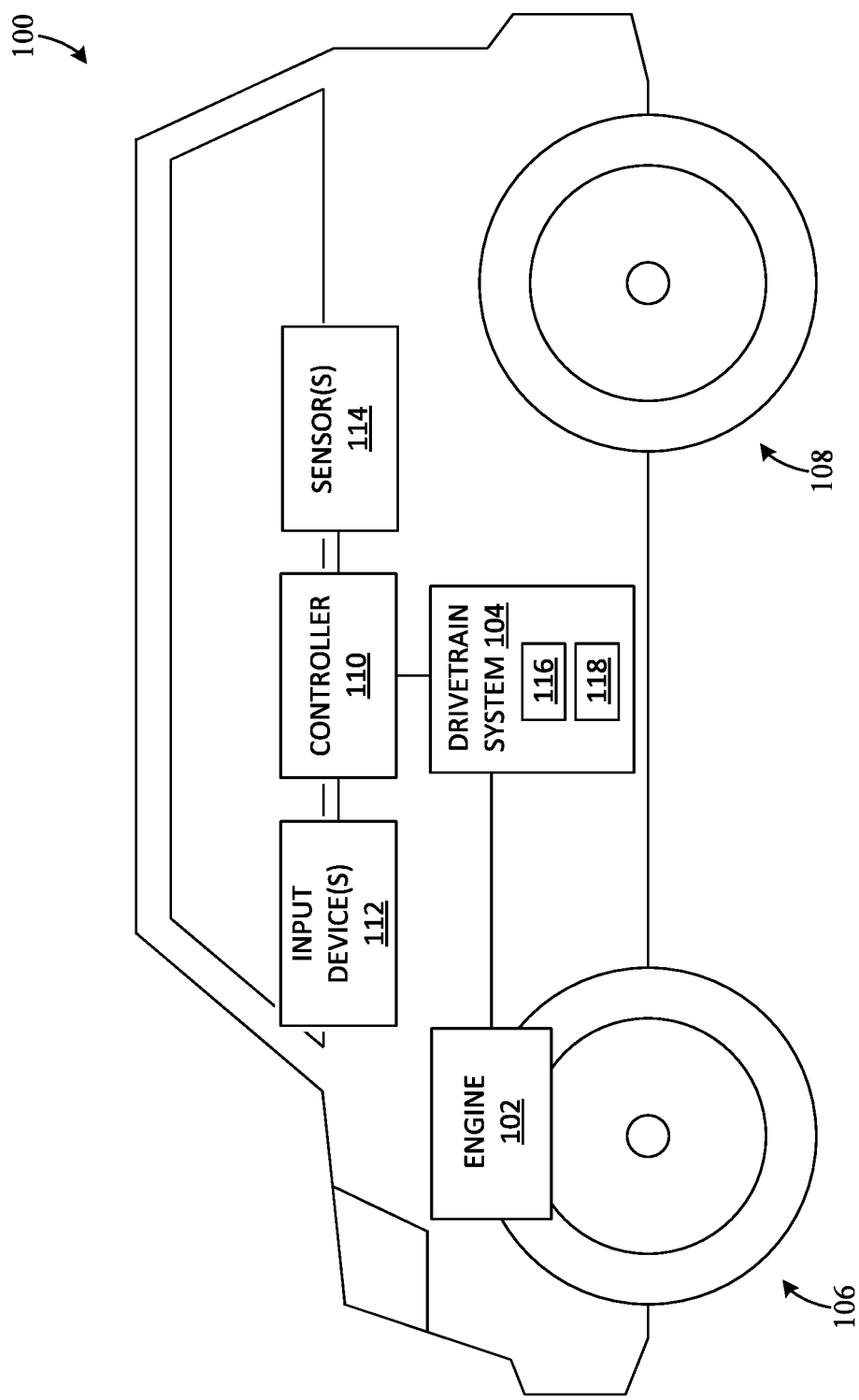
FIG. 1 is a view of an example vehicle in which examples disclosed herein can be implemented.

Some known rear drive module or unit (RDU) systems enable a vehicle to change between two-wheel drive and four-wheel or all-wheel drive functionality, which improves vehicle performance and/or handling in certain driving conditions. A known RDU system may be operatively coupled between a propeller shaft and a rear axle of the vehicle and configured to transfer torque therebetween based on interaction between plates of a clutch. To shift to a connected state such that the clutch is engaged, these known RDU systems may include a hydraulic actuator operatively coupled to the clutch that actuates to squeeze inner and outer clutch plates together, thereby generating torque for the rear axle and/or rear road wheels of the vehicle. Such known RDU systems may be implemented as a permanent active on demand (AOD) system as well as a disconnecting system where a ring gear and pinion in a housing are stopped when four-wheel drive functionality is not needed. For such disconnecting systems, the hydraulic actuator has to provide sufficient clearance (i.e., the hydraulic actuator is sufficiently spaced from clutch plates) when the system is disconnected to prevent excessive energy loss due to friction experienced by the clutch plates.

Additionally, such known RDU systems may utilize oil that is contained in sealed clutch and gear cavities of the housing within which the clutch and the ring gear are positioned. However, when in two-wheel drive (i.e., the clutch is not engaged), the oil adversely affects vehicle fuel economy by increasing fluid drag on clutch plates and/or other moving components associated therewith. To prevent this undesired energy loss due to the oil, some known RDU systems are configured to evacuate the oil from the clutch cavity during vehicle operation such that, when the vehicle is in two-wheel drive, the fluid cavity contains a relatively small volume of the oil. Further, these known systems are also configured to circulate the oil between the clutch and gear cavities when the vehicle is in four-wheel drive. Such clutch and gear cavities are typically fluidly coupled together via one or more fluid lines or oil paths (which may include fluid reservoir(s) for temporarily storing the oil during the oil circulation) such that the oil can be conveyed between the cavities, for example, in response to movement of the clutch, gear, etc. However, when shifting and/or otherwise transitioning from four-wheel drive to two-wheel, an undesired portion of the oil remaining in the oil paths may drain into the clutch cavity. Thus, after shifting to a disconnected state such that the clutch disengages, these known RDU systems leave one or more components (e.g., one or more of a clutch drum, one or more plates, etc.) of the clutch substantially submerged in the oil resulting from such a remaining or excess portion of the oil. That is, the remaining portion of the oil flows into the clutch cavity, thereby increasing the amount of the oil in the clutch cavity. In particular, the component(s) of the clutch experience substantial fluid drag and/or the oil imparts a substantial drag torque on the component(s) when the vehicle is driving in two-wheel drive. As a result, these known RDU systems reduce vehicle fuel economy after such a vehicle transition from four-wheel drive (or all-wheel drive) to two-wheel drive.

These known RDU systems are also configured to provide or flow the oil back into the clutch cavity when the vehicle is shifting and/or otherwise transitioning to four-wheel drive (i.e., the clutch engages) to reduce a temperature of the clutch plates, improve thermal capacity of the clutch plates, and/or otherwise properly lubricate the clutch. For example, rotation of the ring gear pumps the oil back into the clutch cavity. However, for high torque applications of the clutch when transitioning from two-wheel drive to four-wheel drive, the hydraulic actuator actuates relatively quickly before a sufficient amount of the oil is provided to the clutch cavity. In particular, these known RDU systems flow the oil back into the clutch cavity at a relatively low flow rate that relies on a rate of rotation of the gear and/or long oil paths extending from the gear cavity to the clutch cavity. Thus, when shifting to a connected state such that the clutch re-engages, these known RDU systems take a relatively long time to fill the clutch cavity with the oil, which leaves the clutch insufficiently and/or improperly lubricated for a substantial time interval during clutch operation. As a result, these known RDU systems cause the clutch and/or moving components associated therewith to rapidly wear and/or degrade during such a vehicle transition.

Systems, apparatus, and methods to control fluid associated with vehicle clutches are disclosed. Examples disclosed herein provide an example controller for a vehicle that is operatively coupled to an example drive unit (e.g., an RDU) and an example transfer device (e.g., power transfer unit (PTU), a transfer case, etc.) of the vehicle. The drive unit is operatively coupled between two vehicle wheels (e.g., rear wheels) and the transfer device and configured to distribute and/or transfer engine torque from the transfer device to the two wheels (e.g., rear wheels) based a state (e.g., a connected or disconnected state) of the drive unit. The disclosed drive unit includes a housing defining an example cavity (e.g., a clutch cavity) in which a drum of a clutch is positioned. In some examples, the cavity is fluidly coupled to a fluid reservoir (e.g., a tank and/or another cavity defined by the housing) such that an example fluid (e.g., a lubricant such as oil) for the clutch is conveyable between the cavity and the fluid reservoir. In particular, the disclosed drive unit is sized, shaped, structured, and/or otherwise configured such that rotation of the drum conveys the fluid from the cavity to the fluid reservoir. More particularly, when the drive unit changes to an example state of interest (e.g., a fully disconnected or a partially disconnected state), an example actuator (e.g., an active piston) blocks a port that extends from the cavity to a different cavity (e.g., a gear cavity) and fluidly couples the cavities together, which reduces (e.g., ceases) a flow of the fluid through the port into the cavity. Further, the transfer device is operatively coupled between a transmission of the vehicle, the drive unit, and a vehicle axle (e.g., a front axle). The transfer device is configured to distribute and/or transfer engine torque from the transmission to the clutch drum and the vehicle axle based on a state (e.g., a connected state or a disconnected state) of the transfer device.

In particular, to advantageously control the fluid when the vehicle is transitioning between driving modes (e.g., from four-wheel drive to two-wheel drive), the vehicle controller is configured to change, via one or more actuators, the states of the respective drive unit and the transfer device in accordance with one or more example control methods, as discussed in greater detail below in connection with FIGS. 16 and 17. As a result of carrying out the disclosed control method(s), the controller enables the drum to continue to rotate and/or maintains rotation thereof (i.e., the drum continues to expel the fluid from the cavity) while also reducing a flow of the fluid into the cavity due to the drive unit operating in the disclosed state of interest. That is, during the transition of the vehicle between the two driving modes, a flow rate of the fluid out of the cavity is greater than a flow rate of the fluid into the cavity. In this manner, disclosed examples evacuate the fluid from the clutch cavity and/or otherwise expel a predetermined or target amount (e.g., an excess amount remaining in a fluid line) of the fluid from the clutch cavity before the vehicle completes transitioning between the driving modes. Thus, disclosed examples substantially maintain or reduce a fluid level associated with the cavity during such a vehicle transition, which would have otherwise been unattainable using the above-mentioned known RDU systems. As a result, disclosed examples improve vehicle fuel economy by reducing and/or eliminating a drag torque that would have otherwise been experienced by the clutch when the vehicle operates in two-wheel drive.

In some examples, to keep the clutch drum rotating during the vehicle transition, the controller maintains a connected state of the transfer device after changing the state of drive unit to a fully disconnected state. In such examples, the clutch drum remains connected to the transmission such that engine torque drives the drum. Alternatively, in some examples, to similarly keep the clutch drum rotating, the controller changes the drive unit to a partially connected state in which the drum is connected to a single vehicle wheel when the transfer device is in disconnected state. In such examples, rotation of the vehicle wheel drives the drum.

Further, in some examples, the controller determines when the fluid has been sufficiently expelled from the clutch cavity based on one or more detected parameters such as, for example, one or more of a vehicle speed, a wheel speed, a time interval corresponding to the vehicle transition, etc. In such examples, the controller includes one or more maps, one or more equations, one or more models, one or more empirical relationships, etc. that are stored thereon and correlate the detected parameter(s) and an amount of the fluid expelled from the cavity. In particular, a flow rate at which the clutch drum expels the fluid from the cavity is substantially based on an angular speed of the clutch drum and, thus, a speed of the vehicle. Accordingly, as the vehicle speed increases, the flow rate increases while a time interval required to keep the drum rotating in order to expel the target amount of the fluid from the cavity decreases. Conversely, as the vehicle speed decreases, the flow rate decreases while the time interval increases. Thus, in some examples, the controller waits and/or otherwise maintains the rotation of the drum for a particular time interval based on the detected parameters and such reference data. In this manner, disclosed examples ensure that the target amount of the fluid has likely been expelled from the cavity before fully disconnecting the drum. In response to such a determination, the controller controls the drive unit or the transfer device to disconnect the clutch drum from all vehicle wheels as well as the transmission such that the drum decelerates or ceases rotating, thereby completing the transition of the vehicle to two-wheel drive.

FIG. 1 is a view of an example vehicle (e.g., a car, a truck, a sport utility vehicle (SUV), etc.) 100 in which examples disclosed herein can be implemented. According to the illustrated example of FIG. 1, the vehicle 100 includes an example engine (e.g., an internal combustion engine) 102, an example drivetrain system 104, and one or more examples wheels 106, 108 (sometimes referred to as road wheels), two of which are shown in this examples, (i.e., a first or front wheel 106 and a second or rear wheel 108). The drivetrain system 104 of FIG. 1 is structured and/or configured to transfer from the engine 102 to the wheel(s) 106, 108 to cause the vehicle 100 to move, for example, via one or more of a fluid coupling (e.g., a torque converter), a transmission, a transfer device (e.g., a PTU, a transfer case or box, etc.), one or more driveshafts, one or more clutches, one or more axles, one or more differentials, etc., as discussed further below. For example, the engine 102 generates a torque (sometimes referred to as an engine torque) and, in response, the drivetrain system 104 controls an amount or degree of the torque provided to the wheel(s) 106, 108.

According to the illustrated example of FIG. 1, the vehicle 100 also includes an example controller 110, one or more example input devices 112, and one or more example sensors 114. The controller 110 is communicatively and/or operatively coupled to the input device(s) 112, the sensor(s) 114, an example drive unit (e.g., an RDU) 116 of the drivetrain system 104, and an example transfer unit (e.g., one of a PTU, a transfer case or box, etc.) of the drivetrain system 104, for example, via one or more transmission or signal wires, a bus (e.g., a controller area network (CAN)), radio frequency, etc.

The drivetrain system 104 of FIG. 1 enables the vehicle 100 to change between a first vehicle driving mode (e.g., two-wheel drive) that is associated with a first driving characteristic of the vehicle 100 and a second vehicle driving mode (e.g., four-wheel or all-wheel drive) that is associated with a second driving characteristic of the vehicle 100 different from the first driving characteristic. In some examples, the driving mode of the vehicle 100 is based on a state (e.g., one of a connected state or a disconnected state) of the drive unit 116 and a state (e.g., one of a connected state or a disconnected state) of the transfer device 118. For example, when the vehicle 100 is in the first driving mode, the drive unit 116 is in a first example state (e.g., a disconnected state) and the transfer device 118 is in a first example state (e.g., a disconnected state). In such examples, the drivetrain system 104 transfers output from the engine 102 to only front ones of the wheel(s) 106, 108 or rear ones of the wheel(s) 106, 108 when the vehicle 100 is in the first driving mode. On the other hand, when the vehicle 100 is in the second driving mode, the drive unit 116 is in a second example state (e.g., a connected state) and the transfer device 118 is in a second example state (e.g., a connected state). In such examples, the drivetrain system 104 transfers the output from the engine 102 to all of the wheels 106, 108 when the vehicle 100 is in the second driving mode.

In some examples, to facilitate transitioning the vehicle 100 from the second driving mode to the first driving mode, the drive unit 116 is configured to shift or change from the second state to a third example state (e.g., a partially connected or disconnected state) in which a clutch drum in the drive unit 116 is connected to a single wheel 106, 108. In particular, in such examples, rotation of the single wheel 106, 108 drives a clutch drum in a housing of the drive unit 116.

The controller 110 of FIG. 1 can be implemented, for example, using one or more electronic control units (ECUs) operatively coupled to the vehicle 100. As previously mentioned, the controller is 110 is communicatively coupled to the input device(s) 112, the sensor(s) 114, and one or more components of the drivetrain 104. In some examples, the controller 110 is configured to control the state of the drive unit 116, for example, via actuating one or more example first actuators (e.g., one or more of a hydraulic actuator, an electric actuator, a mechanical actuator, etc.) operatively coupled to the drive unit 116 such as, for example, one or more of the first piston 242 of FIG. 2, the valve(s) 346, and/or the second piston 330 of FIG. 3. Additionally, in some examples, the controller 110 is configured to control the state of the transfer device 118, for example, via actuating one or more example second actuators (e.g., one or more of hydraulic actuator, an electric actuator, a mechanical actuator, etc.) operatively coupled to the transfer device 118 such as, for example, the PTU actuator(s) 274 shown in FIG. 2. In particular, to advantageously control a fluid (e.g., oil) within the drive unit 116 when the vehicle 100 is transitioning between vehicle driving modes (e.g., from the second driving mode to the first driving mode), the controller 110 is configured to control the drive unit 116 and the transfer device 118 in accordance with one or more example methods, as discussed further below in connection with FIGS. 16 and 17.

The input device(s) 112 of FIG. 1 include one or more of a shifter, a knob, a touch screen, a button, a switch, a voice command system, etc. that is/are communicatively coupled (e.g., via one or more of a transmission or signal wire, a bus, radio frequency, etc.) to the controller 110 to provide user data to the controller 110, which enable a user (e.g., one of a driver, a vehicle occupant) to select a driving mode of the vehicle 100. For example, in response to the user interacting with the input device(s) 112, the controller 110 detects resulting user input(s) or selection(s) and/or data (e.g., a user request) corresponding to a particular driving mode (e.g., one of two-wheel drive, four-wheel drive, all-wheel drive, etc.) of the vehicle 100. Such selection(s) or data enables the controller 110 to determine when and/or how to control the drive unit 116 and the transfer device 118 and/or otherwise servers as trigger for transitioning the vehicle 100 between two driving modes.

The sensor(s) 114 of FIG. 1 are positioned on the vehicle 100 and configured to generate, obtain, and/or otherwise provide data to the controller 110 that is associated with the drivetrain system 104 and/or, more generally, the vehicle 100. For example, the controller 110 detects, via the sensor (s) 114, one or more parameters associated with the vehicle 100 such as, for example, one or more of a vehicle speed, a wheel speed, and/or any other appropriate parameter. Further, in such examples, the controller 110 repeatedly (e.g., periodically, aperiodically, etc.) and/or continuously detects such parameters(s). In particular, the controller 110 monitors and/or particularly processes such data, which enables the controller 110 to determine when and/or how to control the drive unit 116 and the transfer device 118. In some examples, the sensor(s) 114 of FIG. 1 include one or more of a wheel speed sensor, a tachometer, an angular position sensor, and/or any other appropriate sensor capable of providing data indicative of such parameter(s).

The drive unit 116 of FIG. 1 is operatively coupled to the transfer device 118 to receive the engine torque therefrom when the transfer device 118 is in the second state. The drive unit 116 is structured and/or configured to shift or change between the different states thereof when operated by the controller 110. The drive unit 116 is also interposed between a first pair of vehicle wheels (e.g., two rear ones of wheels 106, 108) and configured to connect the first pair of vehicle wheels to the transfer device 118 when the drive unit 116 is in the second state.

The transfer device 118 of FIG. 1 is operatively coupled to a transmission of the vehicle 100 to receive the engine torque therefrom regardless of the state of the transfer device 118. The transfer device 118 is also operatively coupled to a second pair of vehicle wheels (e.g., two front ones of the wheels 106, 108) and the first pair of vehicle wheels via the drive unit 116. In particular, in such examples, the transfer device 118 is configured to distribute and/or transfer the engine torque from the transmission to the second pair of vehicle wheels and/or the drive unit 116 based on the state of the transfer device 118. That is, the drive unit 116 is structured and/or configured to shift or change between the different states thereof when operated by the controller 110. In some examples, when the transfer device 118 is in the first state and the drive unit 116 is in the first state, the transfer device 118 provides the engine torque to the second pair of vehicle wheels but does not provide the engine torque to the drive unit 116 and, thus, does not provide the torque to the first pair of wheels. On the other hand, in some examples, when the transfer device 118 is in the second state and the drive unit 116 is in the second state, the transfer device 118 provides portions of the engine torque to (a) the first pair of the vehicle wheels and (b) the drive unit 116 whereby the drive unit 116 provides resulting torque to the first pair of vehicle wheels.

Figure 2:
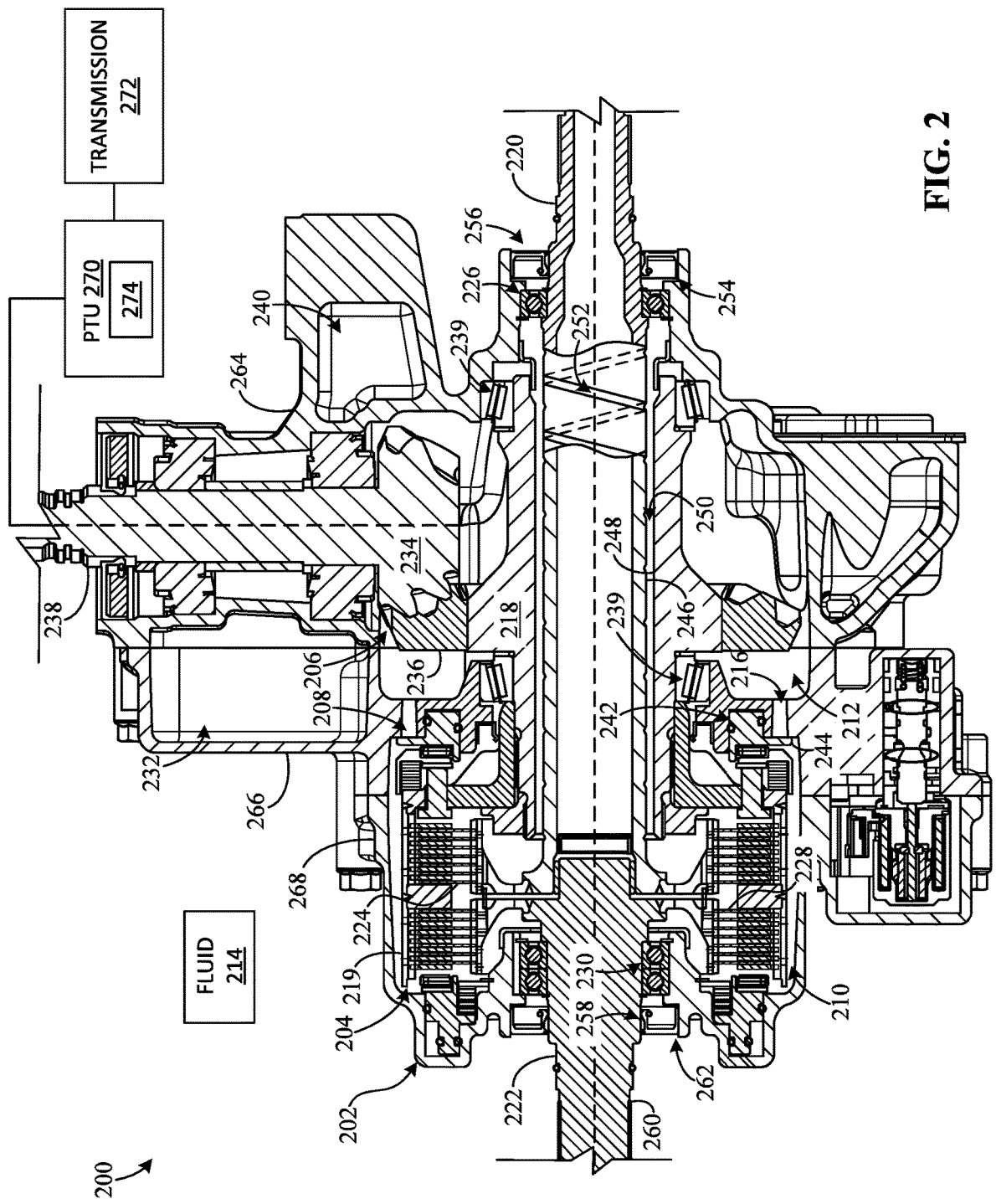
FIG. 2 is a cross-sectional view of an example drive unit assembly and shows a first example configuration thereof in accordance with the teachings of this disclosure.

FIG. 2 is a cross-sectional view of an example drive unit assembly 200 and shows a first example configuration thereof in accordance with the teachings of this disclosure. In some examples, the drive unit assembly 200 of FIG. 2 is used to implement at least a portion of the drivetrain system 104 of FIG. 1 such as, for example, the drive unit 116. The drive unit assembly 200 of FIG. 2 includes an example housing 202, an example clutch 204, an example gear system 206, and an example actuator system 208. As shown in FIG. 2, the clutch 204 is positioned in a first example cavity 210 (sometimes referred to as a clutch cavity) formed and/or defined by the housing 202. The housing 202 of FIG. 2 also forms and/or defines a second example cavity 212 (sometimes referred to as a fluid reservoir and/or a gear cavity) separate from the first cavity 210. The first cavity 210 and the second cavity 212 are in fluid communication (e.g., via one or more fluid supply lines, one or more fluid channels, etc.) with each other and receive a first example fluid (e.g., oil) 214 for lubricating and/or cooling one or more components of the drive unit assembly 200. In particular, the actuator system 208 is structured and/or configured to control a flow of the first fluid 214 through a first example port 216 (sometimes referred to as a crossover port) extending through the first housing 202 from the second cavity 212 to the first cavity 210 as the vehicle 100 changes between the first driving mode and the second driving mode and/or as the clutch 204 changes between a first example state (e.g., disengaged state) and a second example state (e.g., an engaged state), as discussed further below. That is, the drive unit assembly 200 includes the port 216, which is fluidly coupled to the first cavity 210 and the second cavity 212. In such examples, the first state of the clutch 204 corresponds to and/or otherwise provides the first state of the drive unit 116, and the second state of the clutch 204 corresponds to and/or otherwise provides the second state of the drive unit 116.

The clutch 204 of FIG. 2 is operatively coupled to the first housing 202 and configured to control an amount or degree of torque transferred from the engine 102 to one or more of the wheel(s) 106, 108 based on the state of the clutch 204. According to the illustrated example of FIG. 2, the clutch 204 of FIG. 2 receives the engine torque from the gear system 206 via a first shaft 218 coupled to and extending between a second example housing (e.g., a drum) 219 of the clutch 204 and a portion of the gear system 206. The second housing 219 is sometimes referred to as a clutch drum and/or drum. In particular, when the clutch 204 is in the second state and/or at least partially engaged, the clutch 204 transfers at least a portion of the engine torque from the engine 102 to one or more example shafts or axles 220, 222 (sometimes referred to as output shafts) extending through and/or out of the first housing 202, two of which are shown in this example (i.e., a first axle 220 and a second axle 222). The clutch 204 of FIG. 2 may be implemented, for example, using a friction based clutch such as a multi-plate clutch. However, in some examples, the clutch 204 may be implemented differently. In some examples, the clutch 204 includes and/or is implemented using a twin or dual clutch, as shown in FIG. 2. Additionally or alternatively, in some examples, the clutch 204 includes and/or is implemented using a single clutch, as discussed further below in connection with FIGS. 8-12.

As shown in FIG. 2, the second housing 219 is cylindrically shaped and defines a cavity in which one or more clutch components are positioned. Although FIG. 2 depicts the second housing 219 having a particular shape and/or structure, in some examples, the second housing 219 is implemented differently while still sufficiently maintaining associated functionality.

The first axle 220 of FIG. 2 is coupled to one or more first example inner discs or plates (e.g., annular plates) 224 (seven of which are shown in this example) of the clutch 204 and a first one of the wheels 106, 108 (e.g., a rear right wheel). That is, the clutch 204 of FIG. 2 includes the first inner plate(s) 224. As such, when the clutch 204 is at least partially engaged during vehicle operation, the engine torque causes the first axle 220, the first inner plate(s) 224, and the first one of the vehicle wheels 106, 108 to rotate cooperatively or simultaneously. Additionally, the first axle 220 is rotatably coupled to the first housing 202, for example, via one or more example bearings (e.g., one or more ball bearings) 226 operatively coupled to and/or interposed between the first axle 220 and a portion of the first housing 202, one of which is shown in this example. Further, the second axle 222 of FIG. 2 is coupled to one or more second example inner discs or plates (e.g., annular plates)

228 (seven of which are shown in this example) of the clutch 204, different from the first inner plate(s) 224, and a second one of the wheels 106, 108 (e.g., a rear left wheel) different from the first one of the wheel(s) 106, 108. As such, when the clutch 204 is at least partially engaged and/or otherwise in a third example state, the engine torque causes the second axle 222, the second inner plate(s) 228, and the second one of the wheels 106, 108 to rotate cooperatively or simultaneously. Additionally, the second axle 222 is rotatably coupled to the first housing 202, for example, via one or more example bearings (e.g., one or more ball bearings) 230 operatively coupled to and/or interposed between second axle 222 and a portion of the first housing 202, two of which are shown in this example.

According to the illustrated example of FIG. 2, in response to at least a portion (e.g., the second housing 219) of the clutch 204 rotating, the first fluid 214 flows from the first cavity 210 to the second cavity 212 (i.e., the first fluid 214 flows out of the first cavity 210), for example, through a first example fluid channel 402 (shown in FIG. 4) extending from the first cavity 210 to the second cavity 212, as discussed further below in connection with FIG. 4. That is, in some examples, the clutch 204 pumps the first fluid 214 out of the first cavity 210 and into the second cavity 212. For example, forces imparted on the first fluid 214 by the rotating housing 219 urges the first fluid 214 away from the second housing 219 radially outward relative to an axis of the second housing 219 and into or through the first fluid channel 402. Additionally, in some such examples, to store the first fluid 214 and/or facilitate controlling a flow of the first fluid 214 into the second cavity 212, the drive unit assembly 200 includes a first example fluid reservoir (e.g., a tank or a cavity formed and/or defined by the first housing 202) 232 fluidly coupled between the first cavity 210 and the second cavity 212.

The gear system 206 of FIG. 2 is operatively interposed between the clutch 204 and the engine 102 to transfer torque therebetween. For example, the gear system 206 includes a first example gear (e.g., a pinion gear) 234 meshed with and/or operatively coupled to a second example gear (e.g., a ring gear) 236. The first gear 234 of FIG. 2 is coupled to a second example shaft (e.g., a propeller shaft) 238, for example, via one or more example fasteners and/or more example fastening methods or techniques. That is, the drive unit assembly 200 includes the second shaft 238, which extends through and/or out of the first housing 202, for example, to connect to one or more components (e.g., one or more of a vehicle transfer device, a vehicle transmission, etc.) of the drivetrain system 104 and/or otherwise receive the engine torque during vehicle operation.

In some examples, to stabilize and/or facilitate rotational movement of the first gear 234 and/or second shaft 238, the second shaft 238 is rotatably coupled to a portion of the first housing 202, for example, via one or more example bearings operatively coupled to and/or interposed between the second shaft 238 and a portion of the first housing 202. The second gear 236 of FIG. 2 is coupled to the first shaft 218 associated with the second housing 219 of the clutch 204, for example, via one or more example fasteners and/or one or more example fastening methods or techniques. As a result, in some examples, when the second shaft 238 receives the torque from the engine 102, the second shaft 238, the first gear 234, the second gear 236, the first shaft 218, and the second housing 219 rotate cooperatively or simultaneously. In some examples, to maintain a proper position and/or orientation of the second gear 236 when transferring torque, the first shaft 218 of FIG. 2 is rotatably coupled to the first housing 202, for example, via one or more example bearings (e.g., one or more tapered roller bearings) 239 operatively coupled to and/or interposed between the first shaft 218 and at least a portion of the first housing 202, two of which are shown in this example. Although FIG. 2 depicts the two gears 234, 236, in some examples, the gear system 206 is implemented differently, for example, using a differential, as discussed further below in connection with FIG. 8.

As shown in FIG. 2, the first gear 234 and the second gear 236 are positioned in the second cavity 212 to receive and/or interact with the first fluid 214. In some such examples, in response to at least a portion (e.g., the second gear 236) of the gear system 206 rotating, the first fluid 214 flows from the second cavity 212 to the first cavity 210, for example, via a second example fluid channel 412 (shown in FIG. 4) extending from the second cavity 212 to the first cavity 210, as discussed further below in connection with FIG. 4. That is, in such examples, the gear system 206 pumps the first fluid 214 out of the second cavity 212 and into the first cavity 210 via rotation of one or more of the gears 234, 236. For example, forces imparted on the first fluid 214 by the gear(s) 234, 236 urge the first fluid 214 away from the gears relative to axes of the respective gear(s) 234, 236 and into or through the second fluid channel 412. Additionally, in some such examples, to store the first fluid 214 and/or facilitate controlling a flow of the first fluid 214 into the first cavity 210, the drive unit assembly 200 includes a second example fluid reservoir (e.g., a tank or a cavity formed by the first housing 202) 240 fluidly coupled between the second cavity 212 and the first cavity 210.

The actuator system 208 of FIG. 2 can be implemented, for example, using a hydraulic actuator system. In particular, the actuator system 208 of FIG. 2 includes a first example piston 242 that is operatively coupled to the housing 202 and positioned in the first cavity 210 (i.e., positioned in the first housing 202) and/or proximate to the first port 216, which is sometimes referred to as an active piston. More particularly, the first piston 242 is configured to move toward and away from the first port 216 (e.g., in response to a fluid pressure imparted on the first piston 242), thereby controlling a flow of the first fluid 214 through the first port 216 from the second cavity 212 to the first cavity 210. In some examples, to facilitate controlling the flow of the first fluid 214 through the port 216, the first piston 242 includes an example fluid flow control portion (e.g., a flange) 244, which is discussed further below. In particular, when the first piston 242 is in a first position (e.g., a retracted position), the fluid flow control portion 244 substantially covers, blocks, plugs, and/or otherwise seals the first port 216, thereby preventing the first fluid 214 from flowing therethrough. As shown in FIG. 2, the first piston 242 is in the first position. On the other hand, when the first piston 242 is at least partially actuated and/or moves away from the first position to a second position (e.g., an extended position), the fluid flow control portion 244 uncovers, unblocks, unplugs, and/or otherwise unseals the first port 216 to allow the first fluid 214 to flow through the first port 216 from the second cavity 212 to the first cavity 210. Thus, actuation of the first piston 242 or movement of the first piston 242 away from the first port 216 enables fluid forces experienced by the first fluid 214 to urge the first fluid 214 to flow through the first port 216. Conversely, actuation of the first piston 242 or movement of the first piston 242 toward the first port 216 (e.g., away from a clutch pack) decreases (e.g., ceases) the flow of the first fluid 214 through the first port 216. In other words, the flow of the first fluid 214 through the port 216 is based on the position of the second piston 242. Additionally, in some examples, the actuator system 208 is structured and/or configured to operate the clutch 204 via the first piston 242 and/or a second example piston 330 (shown in FIG. 3), as discussed further below in connection with FIG. 3.

As shown in FIG. 2, the first axle 220 is positioned in and/or extends through the first shaft 218. As such, the first shaft 218 is hollow in this example. In some examples, the first axle 220 is concentric with the first shaft 218. In particular, an outer surface (e.g., a circumferential surface) 246 of the first axle 220 is spaced from an inner surface 248 (e.g., a circumferential surface) of the first shaft 218 such that a space (e.g., a channel) 250 is defined therebetween. In this manner, the first axle 220 and the first shaft 218 do not interfere with each other when rotating. Additionally, in some examples, the first axle 220 is configured to draw the first fluid from the second fluid reservoir 240 and/or pump the first fluid 214 through the space 250 into the first cavity 210 and/or the second housing 219. In particular, in such examples, the first axle 220 includes one or more grooves (e.g., helical grooves) 252 formed by and/or positioned on the outer surface 246 and extending at least partially across a length of the first axle 220. As such, as the first axle 220 rotates, the groove(s) 252 convey the first fluid 214 therethrough to the second cavity 212. Stated differently, the groove(s) 252 carry the first fluid 214 across at least a portion of the length of the first axle 220 toward the clutch. As such, in some examples, the first axle 220 is considered a pump, which is operated by the engine torque and/or the one of the wheel(s) 106, 108 associated with the first axle 220.

In some examples, to fluidly seal the first cavity 210 and/or the second cavity 212, the drive unit assembly 200 includes one or more examples seals. For example, the drive unit assembly 200 includes a first example seal 254 operatively couple to and/or interposed between a portion of the first housing 202 and the outer surface 246 of the first axle 220. As a result, the first seal 254 and the first housing 202 form a fluid seal, thereby preventing the first fluid 214 from leaking out of the second cavity 212 through a first opening 256 positioned on the first housing 202 through which the first axle 220 extends. Further, the drive unit assembly 200 also includes a second example seal 258 operatively coupled to and/or interposed between a portion of the first housing 202 and an outer surface 260 of the second axle 222. As a result, the second seal 258 and the first housing 202 form a fluid seal, thereby preventing the first fluid 214 from leaking out of the first cavity 210 through a second opening 262 positioned on the first housing 202 through which the second axle 222 extends. Although FIG. 2 depicts the two seals 254, 258, in some examples, the drive unit assembly 200 is implemented with one or more additional, fewer, and/or different seals to appropriately seal the cavities 210, 212 of the drive unit assembly 200.

The first housing 202 of FIG. 1 is sometimes referred to as a drive unit housing. In some examples, the first housing 202 includes one or more example portions 264, 266, 268, three of which are shown in this example (i.e., a first or end portion 264, a second or intermediate portion 266, and a third or end portion 268). According to the illustrated example of FIG. 2, the first housing portion 264, the second housing portion 266, and the third housing portion 268 are coupled and/or otherwise assembled together, for example, via one or more example fasteners and/or one or more example fastening methods or techniques. As shown in FIG. 2, the second housing portion 266 is coupled to and/or interposed between the first and third housing portions 264, 268. As such, the second housing portion 266 of FIG. 2 partially forms and/or defines the first cavity 210 and the second cavity 212. For example, according to the illustrated example of FIG. 2, the second and third housing portions 266, 268 form and/or define the first cavity 210. Further, according to the illustrated example of FIG. 2, the first and second housing portions 264, 266 form and/or define the second cavity 212. Additionally, in some examples, the first and third housing portions 264 form and/or define opposite ends of the first housing 202.

According to the illustrated example of FIG. 2, the second shaft 238 is coupled to an example PTU 270 of the drivetrain system 104 to receive the engine torque from the PTU 270. In some examples, the PTU 270 of FIG. 2 corresponds to and/or is used to implement the transfer device 118 of FIG. 1. As shown in FIG. 2, the PTU 270 is operatively interposed between an example transmission 272 of the drivetrain system 104 and the drive unit assembly 200. In some examples, the PTU 270 has an input portion (e.g., a shaft) coupled to the transmission 272 and two output portions (e.g., two shafts), one of which is coupled to the second shaft 238. In particular, based on a state of the PTU 270, the PTU 270 is configured to transfer the engine torque from the transmission 272 to the second shaft 238 and/or, more generally, the drive unit assembly 200. For example, when the PTU 270 is in a first example state (e.g., a disconnected state), the PTU 270 does not provide the engine torque to the second shaft 238 and/or, more generally, the drive unit assembly 200. That is, the second housing 219 is not connected to or disconnected from the transmission 272 when the PTU 270 is in the first state such that the engine torque does not cause the second housing 219 to rotate. On the other hand, when the PTU 270 is in a second example state (e.g., a connected state), the PTU 270 provides the engine torque to the second shaft 238 and/or, more generally, the drive unit assembly 200, which causes the second housing 219 to rotate. That is, the second housing 219 is connected to the transmission 272 when the PTU 270 is in the second state such that the engine torque rotates the second housing 219.

In some examples, to facilitate changing the state of the PTU 270, the actuator system 208 includes one or more example second actuators (e.g., one or more of an electric actuator, a hydraulic actuator, etc.) 274 that are communicatively coupled to the controller 110 and operatively coupled to the PTU 270. In particular, the actuator(s) 274 are configured to change the state of the PTU 270 based on the control signal(s) or command(s) and/or electrical power provided to the actuator(s) 274 from the controller 110. In such examples, the controller 110 directs the actuator(s) 274 to move and/or actuate, thereby causing the PTU 270 to change between the first state and the second state.

In some examples, the vehicle 100 is in the first driving mode when the clutch 204 is in the first state and the PTU 270 is in the first state. In some such examples, the second shaft 238 does not rotate and/or otherwise does not receive any torque when the vehicle 100 is moving in the first driving mode. Further, in some examples, the vehicle 100 is in the second driving mode when the clutch 204 is in the second state and the PTU 270 is in the second state. Although FIG. 2 depicts the second shaft 238 connected to the PTU 270, in some examples, the second shaft 238 is similarly connected to a different vehicle transfer device alternatively to the PTU 270 such as, for example, a transfer box or case.

The transmission 272 of FIG. 2 can be implemented, for example, using one or more of an automatic transmission, an automated manual transmission, a manual transmission, etc.

In particular, the transmission 272 is operatively interposed between the engine 102 and the PTU 270 and configured to control a degree of torque (e.g., multiply torque) transferred from the engine 102 to the PTU 270 based on a state of the transmission 272 and/or a gear ratio associated with the transmission 272. For example, the transmission 272 increases torque provided to the PTU 270 from the engine 102 when the transmission 272 shifts or changes from a first state in which the gear ratio is relatively low to a second state in which the gear ratio is relatively high. In some example, the transmission 272 is structured and/or configured to have multiple (e.g., 4, 5, 6, etc.) shiftable states, each of which providing a different gear ratio. In some such examples, the controller 110 is configured to operate the transmission 272 and/or control the state thereof.

FIG. 3 is an enlarged partial-view of the drive unit assembly 200 of FIG. 2 and shows a first example configuration of the clutch 204 and the actuator system 208. According to the illustrated example of FIG. 3, the first piston 242 includes an example body (e.g., an annular body) 302 that is movable within a first example recessed area (e.g., an annular groove) 303 positioned on the second housing portion 266. In some examples, the second housing portion 266 includes an example wall (e.g., an annular wall) 305 that has the recessed area 303 positioned thereon, as shown in FIG. 3. In particular, the piston body 302 and the wall 305 form and/or define a first example chamber (sometimes referred to as a fluid chamber), which facilitates control of the first piston 242.

The first chamber 304 of FIG. 3 is configured to receive a second example fluid (e.g., hydraulic fluid) 306 from an example fluid supply system 308 (i.e., the first chamber 304 is in fluid communication with the fluid supply system 308). As such, in some examples, movement of the first piston 242 is based on a fluid pressure and/or a flow of the second fluid 306 within the first chamber 304. That is, during operation of the first piston 242, the second fluid 306 imparts a force on the first piston 242, thereby moving the first piston 242 between the first and second positions thereof. In some examples, to maintain the fluid pressure and/or prevent the second fluid 306 from leaking out of the first chamber 304, the first piston 242 includes one or more example seals (e.g., O-rings) 310, 312 operatively coupled to and/or interposed between the body 302 and the first wall 305, two of which are shown in this example (i.e., a first seal 310 and a second seal 312). Accordingly, during operation of the first piston 242, the first seal 310 and/or the second seal 312 sealingly engage respective surfaces (e.g., circumferential surface(s)) of the body 302 and respective surfaces (e.g. circumferential surface(s)) 314 of the first wall 305 forming and/or defining the first chamber 304.

As shown in FIG. 3, the fluid flow control portion 244 of the first piston 242 extends away from the body 302 radially outward relative to a first example axis 316 of the body 302. Stated differently, the fluid flow control portion 244 protrudes from the body 302. In particular, when the first piston 242 is in the first position, the fluid flow control portion 244 engages (e.g., sealingly engages) a particular area or surface on a first side 318 of the first wall 305 that surrounds and/or is proximate to the first port 216. In this manner, the fluid flow control portion 244 prevents the first fluid 214 from flowing through the first port 216. As the first piston 242 actuates and/or the body 302 moves out of the first chamber 304, the fluid flow control portion 244 separates and/or moves away from this area or surface of the first side 318, which enables the first fluid 214 to flow through the first port 216 from the second cavity 212 to the first cavity 210.

Additionally, in some examples, the first piston 242 is structured and/or configured to operate at least a portion of the clutch 204 and/or otherwise change the state of the clutch 204, as previously mentioned. In some such examples, the actuator system 208 includes an example apply plate 320 that extends away from the body 302 along the first axis 316 through the second housing 219 of the clutch 204 such that an end 322 of the apply plate 320 is positioned on or near one of the first inner plate(s) 224 or one or more first outer plate(s) 323 of the clutch 204. That is, the clutch 204 of FIG. 3 also includes the first outer plate(s) 323, seven of which are shown in this example. Each of the first outer plates(s) 323 is sometimes referred to as a separator plate. As used herein, the term(s) "first plates," "first clutch plates," and/or "first clutch pack" refer(s) to the first inner plate(s) 224 and the first outer plate(s) 323 of the clutch 204. The first clutch plates 224, 323 of FIG. 3 enable the clutch 204 to generate torque for the first axle 220 and/or transfer torque between the second shaft 238 and the first axle 220 based on a degree of pressure that the first plates 224, 323 impart on each other. In particular, when the first piston 242 actuates and/or moves to or toward the second position, a surface (e.g., an annular surface) at or near the end 322 is configured to engage the first plates 224, 323 and/or otherwise urge the first plates 224, 323 toward a protruding portion 324 of the second housing 219, which squeezes the first plates 224, 323 and/or increases the pressure experienced by the first plates 224, 323. Stated differently, the first piston 242 causes the apply plate 320 to impart a load on a nearest one of the first plates 224, 323 when the first piston 242 is in the second position. In some examples, the end 322 is defined by an annular body that extends around the first axle 220 and/or proximate to the nearest one of the first plates 224, 323, which better and/or more evenly distributes the load on the first plates 224, 323. Further, in some examples, the end 322 and/or a portion of the apply plate 320 proximate thereto limits movement of the apply plate 320 by engaging an inner portion of the second housing 219.

The apply plate 320 of the first piston 242 is slidably coupled to the second housing 219 and configured to rotate cooperatively with the second housing 219 relative to the body 302. In some examples, to facilitate transferring a load from the first piston 242 to the apply plate 320 and/or reduce friction therebetween during operation of the first piston 242, the drive unit assembly 200 of FIG. 3 includes an example bearing (e.g., a thrust bearing) 326 operatively coupled to and/or interposed between the body 302 and the apply plate 320. Further, in some examples, to facilitate positioning the apply plate 320, the actuator system 208 of FIG. 3 also includes one or more example springs 328 that are operatively coupled to the apply plate 320 and configured to urge the apply plate 320 and/or the piston 242 away from the first plates 224, 323, which reduces (e.g., minimizes) the pressure experienced by the first plates 224, 323 when the clutch 204 is disengaged and/or in the first state thereof. Further, in some such examples, the end 322 of the apply plate 320 separates and/or disengages from the nearest one of the first plates 224, 323 when the first piston 242 is not in actuated and/or in the first position, which causes the first plates 224 to substantially separate and/or disengage from each other. As a result, in such examples, the clutch 204 disconnects the second shaft 238 from the first axle 220 when the vehicle 100 is operating in the first driving mode. In some examples, the apply plate 320 is a one-piece or integral component. However, in some examples, the apply plate 320 includes multiple portions, for example, radially distributed relative to the first axis 316.

Additionally, in some examples, the actuator system 208 also includes the aforementioned second piston 330, which is operatively coupled to the first housing 202 and structured and/or configured to operate a different portion of the clutch 204, similar to the first piston 242. In some examples, a body (e.g., an annular body) 332 of the second piston 330 is positioned in a second example chamber 334, for example, that is at least partially formed and/or defined by a second wall 336 of the first housing 202. In other words, the second piston 330 is positioned in the first housing 202. The second chamber 334 of FIG. 3 is in fluid communication with the fluid supply system 308 to receive the second fluid 306. In particular, the body 332 of FIG. 3 is configured to move toward and/or away from a nearest one of the second inner clutch plate(s) 228 or second outer clutch plate(s) 338 based a fluid pressure and/or a flow of the second fluid 306 within the second chamber 334, similar to the first piston 242. That is, the clutch 204 of FIG. 3 also includes one or more of the second outer plate(s) 338, seven of which are shown in this example. Each of the outer plate(s) 338 of FIG. 3 is sometimes referred to as a separator plate. As used herein, the term(s) "second plates," "second clutch plates," and/or "second clutch pack" refer(s) to the second inner plate(s) 228 and the second outer plate(s) 338 of the clutch 204. The second clutch plates 228, 338 of FIG. 3 enable the clutch 204 to generate torque for the second axle 222 and/or transfer torque between the second axle 222 and the second shaft 238 based on a degree of pressure that the second plates 228, 338 impart on each other. In some examples, to maintain the fluid pressure and/or prevent the second fluid 306 from leaking out of the second chamber 334 during operation of the second piston 330, the second piston 330 includes one or more example seals (e.g., O-rings) 340 operatively coupled to and/or interposed between an outer surface (e.g., a circumferential surface) the body 332 and an inner surface (e.g., a circumferential surface) of the second wall 336 that forms and/or defines the second chamber 334, three of which are shown in this example.

In some examples, to facilitate transferring a load from the body 332 of the second piston 330 to the second plates 228, 338 and/or reducing friction therebetween, the drive unit assembly 200 includes an example bearing (e.g., a thrust bearing) 342 operatively coupled to and/or interposed between the body 332 and the nearest one of the second plates 228, 338. In particular, when the second piston 330 actuates and/or moves from a first position (e.g., a retracted position) to a second position (e.g., an extended position) in response to the first fluid 214 within the second chamber 334, the bearing 342 urges the second plates 228, 338 toward the protruding portion 324 of the second housing 219, which squeezes the second plates 228, 338 and/or increases the pressure experienced by the second plates 228, 338. Stated differently, the bearing 342 imparts a load on a nearest one of the second plates 228, 338 when the second piston 330 is in the second position. Further, in some examples, the second piston 330 includes one or more example springs 344 operatively coupled to the body 332 and the second wall 336 to urge the body 332 and, thus, the bearing 342 away from the second plates 228, 338, which reduces (e.g., minimizes) the pressure experienced by the second plates 228, 338 when the clutch 204 is disengaged. In some such examples, the bearing 342 separates from a nearest one of the second plates 228, 338, which causes the second plates 228, 338 to separate from each other. As a result, the clutch 204 disconnects the second shaft 238 from the second axle 222 when the vehicle 100 is operated in the first driving mode.

As shown in FIG. 3, each of the piston bodies 302, 332 is concentric with a respective one of the axles 220, 222. However, in some examples, the first piston 242 and/or the second piston 330 are shaped, positioned, and/or otherwise implemented differently.

In some examples, to facilitate positional control of the piston(s) 242, 330, the actuator system 208 includes one or more example valves (e.g., one or more solenoid valves) 346 fluidly coupled to the fluid supply system 308 to receive the second fluid 306, for example, when the second fluid 306 provided by the fluid supply system 308 is at a relatively high pressure. In such examples, the controller 110 is communicatively coupled to the valve(s) 346 and configured to open, close, and/or otherwise change positions of the respective valve(s) 346, thereby changing one or more fluid parameters of the second fluid 306 downstream from the valve(s) 346 such as, for example, a flow rate, a fluid pressure, etc. In some examples, a first one of the valve(s) 346 is fluidly coupled to the first chamber 304 to control, based on a position of the first one of the valve(s) 346, a flow of the second fluid 306 into the first chamber 304 and/or the fluid pressure within the first chamber 304. Additionally or alternatively, in some examples, a second one of the valve(s) 346 is fluidly coupled to the second chamber 334 to control, based on a position of the second one of the valve(s) 346, a flow of the second fluid 306 into the second chamber 334 and/or the fluid pressure within the second chamber 334. As shown in FIG. 3, the valve(s) 348 are in fluid communication with and/or otherwise fluidly coupled to one or more of the fluid chamber(s) 304, 334 and the fluid supply system 308 via one or more example fluid lines 348.

In some examples, to facilitate regulating the second fluid 306, the actuator system 208 includes the fluid supply system 308, as shown in FIG. 3. The fluid supply system 308 of FIG. 3 is configured to provide the second fluid 306 to the valve(s) 346 via the fluid line(s) 348 at a sufficient flow rate and/or fluid pressure. The fluid supply system 308 can be implemented, for example, using one or more pumps fluidly coupled to the respective valve(s) 346 via the fluid supply line(s) 348. In some examples, the pump(s) are operated by engine torque and/or one or more electric motors operatively coupled to the respective pump(s). When in operation, the pump(s) 346 of FIG. 3 are structured and/or configured to change one or more fluid parameters (e.g., a fluid pressure, a flow rate, etc.) of the second fluid 306. In some examples, the components of the fluid supply system 308 are coupled to and/or positioned on the first housing 202 and/or a portion of the vehicle 100 near the first housing 202. Although FIG. 3 depicts the actuator system 208 as a hydraulic actuator system that is particularly configured, in some examples, the actuator system 208 is implemented differently to likewise and/or sufficiently control one or more of the pistons 242, 330 of the drive unit assembly 200. For example, the actuator system 208 can be implemented using one or more of an electric actuator system, a mechanical actuator system, etc., and/or any other appropriate actuator system. Thus, although FIG. 3 depicts the actuator system 208 having the two pistons 242, 330, in some examples, the actuator system 208 includes one or more other actuators in addition or alternatively to the first piston 242 and/or the second piston 330. As such, the first piston 242 is sometimes referred to as a first actuator, and the second piston 330 is sometimes referred to as a second actuator.

As previously mentioned, the clutch 204 of FIG. 3 can provide at least a portion of the engine torque to both the first axle 220 and the second axle 222 (e.g., independent of each other). The first plates 224, 323 of FIG. 3 are configured to transfer at least a portion of the engine torque from the second housing 219 to the first axle 220 based on a position of the first piston 242 and/or the pressure experienced by the first plates 224, 323. In particular, the first inner plate(s) 224 are splined with an outer portion 354 associated with the first axle 220 such that the first inner plate(s) 224 can slide along the outer portion 354 toward and away from the first outer plate(s) 323 while maintaining an orientation thereof relative to the first axle 220 and/or the outer portion 354 (i.e., the first inner plate(s) 224 rotate cooperatively with the first axle 220). Similarly, the first outer plate(s) 323 are splined with a first inner portion 356 of the second housing 219 such that the first outer plate(s) 323 can slide along the first inner portion 356 toward and the away from the first inner plate(s) 224 while maintaining an orientation thereof relative to the second housing 219 (i.e., the first outer plate(s) 323 rotate cooperatively with the second housing 219). That is, the first inner plate(s) 224 are slidably coupled (e.g., via slots or grooves disposed on the outer portion 354) to the outer portion 354, and the first outer plate(s) 323 are slidably coupled (e.g., via slots or grooves disposed on the first inner portion 356) to the first inner portion 356. As a result, the first plates 224, 323 better engage with and disengage from each other and, in some examples where the second shaft 238 disconnects from the first axle 220, separate from each other.

Similarly, the second plates 228, 338 are configured to transfer at least a portion of the engine torque from the second shaft 238 to the second axle 222 based on a position of the second piston 330 and/or the pressure experienced by the second plates 228, 338. In particular, the second inner plate(s) 228 are splined with an outer portion 358 associated with the second axle 222 such that the second inner plate(s) 228 can slide along the outer portion 358 toward and away from the second outer plate(s) 338 while maintaining an orientation thereof relative to the second axle 222 and/or the outer portion 358 (i.e., the second inner plate(s) 228 rotate cooperatively with the second axle 222). Similarly, the second outer plate(s) 338 are splined with a second example inner portion 360 of the second housing 219 such that the second outer plate(s) 338 can slide along the second inner portion 360 toward and away from the second inner plates 228 while maintaining an orientation thereof relative to the second housing 219 (i.e., the second outer plate(s) 338 rotate cooperatively with the second housing 219). That is, the second inner plate(s) 228 are slidably coupled (e.g., via slots or grooves disposed on the outer portion 358) to the outer portion 358, and the second outer plate(s) 338 are slidably coupled (e.g., via slots or grooves disposed on the second inner portion 360) to the second inner portion 360. As a result, the second plates 228, 338 better engage with and disengage from each other and, in some examples where the second shaft 238 disconnects from the second axle 222, separate from each other.

As shown in FIG. 3, the protruding portion 324 of the second housing 219 is interposed between the first plates 224, 323 and the second plates 228, 338. The protruding portion 324 is affixed to the second housing 219 and extends radially inward relative the first axis 316. In some examples, the protruding portion 324 is annularly shaped to engage a larger surface area of a nearest one of the first plates 224, 323 and the second plates 228, 338.

The first port 216 of FIG. 3 is sized, shaped, structured, and/or otherwise configured to rapidly convey or provide the fluid 214 from the first cavity 210 to the second cavity 212 when the first piston 242 actuates and/or moves away from the first position (e.g., when the vehicle 100 changes from the first driving mode to the second driving mode). That is, a flow of the first fluid 214 through the port 216 is based on the position the first piston 242 and/or movement of the first piston 242, a previously mentioned. In some examples, the first port 216 is tapered. That is, first port 216 includes a cross-sectional area or diameter that varies across a length of the first port 216 and/or between a first end 362 of the first port 216 and a second end 364 of the first port 216 opposite the first end 362. For example, the cross-sectional area or diameter at the first end 362 is greater than the cross-sectional area or diameter at the second end 364. However, in some examples, the first port 216 is implemented differently. For example, the cross-sectional area or diameter of the first port 216 can be substantially uniform across the length and/or from the first end 362 to the second end 364. As shown in FIG. 3, the first end 362 is positioned near the fluid flow control portion 244 and/or, more generally, the first piston 242.

In some examples, the first port 216 is positioned at or near an end of the first wall 305 such as, for example, at or near a lowermost portion of the first housing 202. In this manner, the first port 216 is submerged below a surface of the first fluid 214 (e.g., after the first fluid 214 accumulates in the second cavity 212), which allows gravity and/or fluid pressure to effectively urge the first fluid 214 through the first port 216 when the first port 216 is unblocked. However, in some examples, the first port 216 is positioned on the second housing portion 266 in a different location.

Although FIG. 3 depicts the single port 216, in some examples, in addition or alternatively to the first port 216, the first housing 202 includes one or more other ports (e.g., similar or different relative to the first port 216) that extend through the first wall 305 from the first cavity 210 to the second cavity 212 and/or otherwise fluidly couple the cavities 210, 212 together, which may provide the first fluid 214 to the second cavity 212 in a more effective manner compared to a single port. In some such examples, the multiple ports 216 are radially distributed on the first wall 305 relative to the first axis 316. In particular, in such examples, the fluid flow control portion 244 of the first piston 242 is configured to the control a flow of the first fluid 214 through each port 216 based on movement of the first piston 242.

In some examples, to further fluidly seal the cavities 210, 212, the drive unit assembly 200 of FIG. 3 includes a third example seal 368 operatively coupled to and/or interposed between a portion of the first wall 305 and an outer surface 370 of the second housing 219 that extends through an example aperture (e.g., a circular opening) 372 positioned on the first wall 305. As shown in FIG. 3, the opening 372 of the first wall 305 receives a portion of the first shaft 218 and the second axle 222 in addition to the second housing 219. In particular, the third seal 368 is effective in preventing the first fluid 214 from leaking or flowing between the first and second cavity 210, 212. As shown in FIG. 3, the first wall 305 extends toward the first axle 220 radially inward relative to the first axis 316 to partially form and/or define the first cavity 210 and the second cavity 212.

Figure 4:
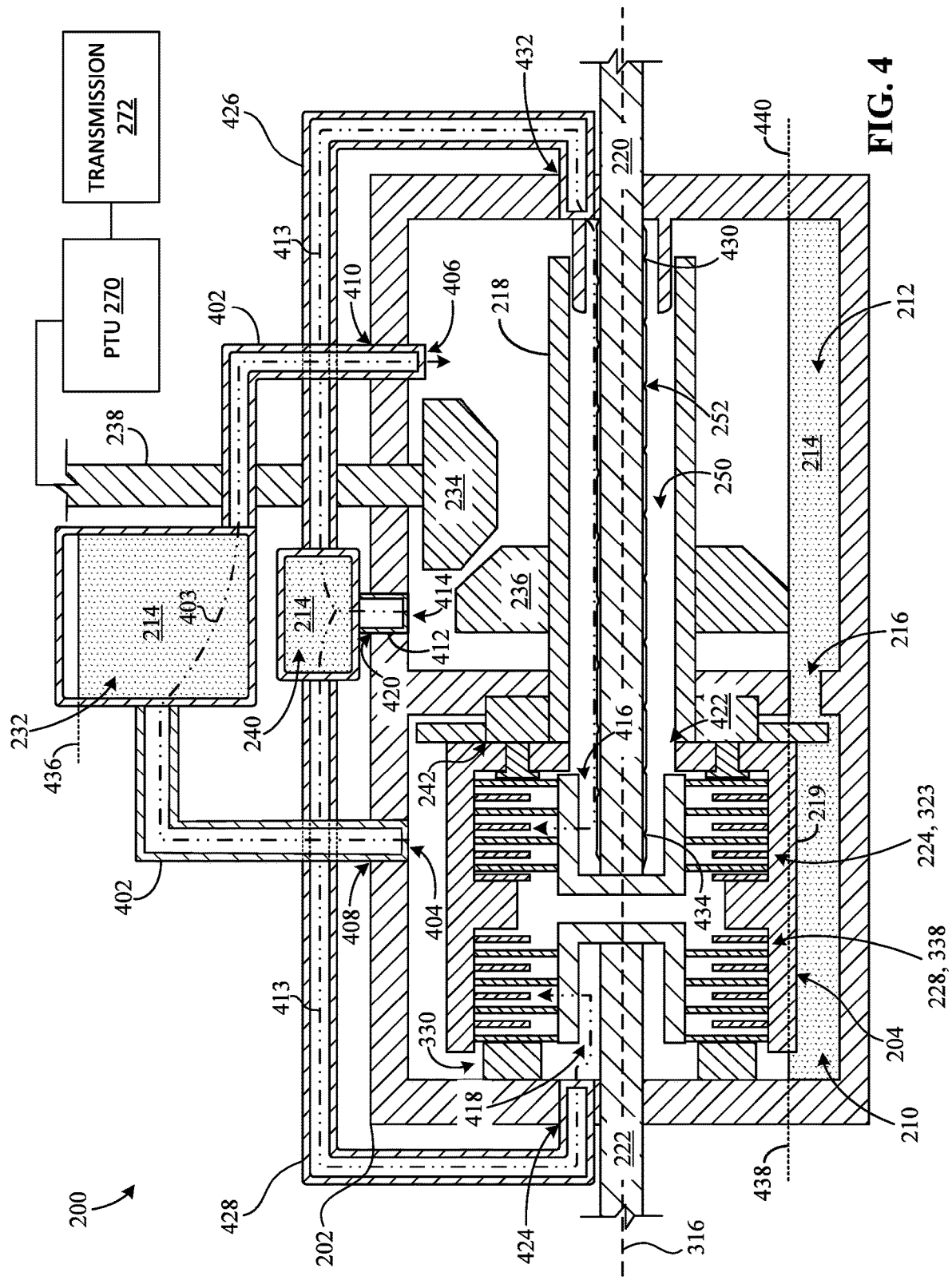
FIGS. 4-7 are schematic illustrations of the example drive unit assembly of FIGS. 2 and 3 and show example fluid flow based on different vehicle driving modes and/or transitions between the driving modes.

FIGS. 4-7 are schematic illustrations of the drive unit assembly 200 of FIGS. 2 and 3 and show example fluid flow based on the vehicle 100 operating in the different driving modes and/or transitions between the driving modes. According to the illustrated example of FIG. 4, to facilitate conveying the first fluid 214, the drive unit assembly 200 includes the aforementioned first fluid channel 402 that extends from the first cavity 210 to the second cavity 212, thereby fluidly coupling the first cavity 210 to the second cavity 212. The first fluid channel 402 provides a first example flow path 403 (as represented by the dotted/dashed lines in FIG. 4) along which the first fluid 214 is to flow. In some examples, the first fluid channel 402 is formed and/or defined by the first housing 202 and/or one or more other components (e.g., a tube, a pipe, etc.). As shown in FIG. 4, the first fluid channel 402 is coupled to the housing 202 and at least partially positioned external to the first cavity 210 and the second cavity 212. In particular, as the second housing 219 of the clutch 204 rotates relative to the first axis 316 associated therewith, the first fluid 214 moves or is urged away from the second housing 219 radially outward relative to the first axis 316 such that the first fluid 214 flows into an inlet 404 of the first channel 402 and then out of an outlet 406 of the first channel 402.

As shown in FIG. 4, the inlet 404 of the first channel 402 is positioned in or near first cavity 210 to receive the first fluid 214 therefrom. For example, the inlet 404 is adjacent to and/or extends through a third opening 408 positioned on a portion of the first housing 202 associated with the first cavity 210. Further, the outlet 406 of the first channel 402 is positioned in or near the second cavity 212 to provide the first fluid 214 thereto. For example, the outlet 406 is adjacent to and/or extends through a fourth opening 410 positioned on another portion of the first housing 202 associated with the second cavity 212.

Additionally, in some examples, the first channel 402 includes the first fluid reservoir 232 to store the first fluid 214, as previously mentioned. As shown in FIG. 4, the first fluid reservoir 232 is fluidly coupled to the first channel 402 and interposed between the inlet 404 and the outlet 406. The first fluid reservoir 232 may be implemented, for example, using a tank (sometimes referred to as a catch tank) that is coupled to the first housing 202. In such examples, the first channel 402 and/or the first fluid reservoir 232 are sized, shaped, structured, and/or otherwise configured such that when the vehicle 100 is driving in the second driving mode (i.e., the clutch is 204 engaged), the first fluid 214 flows into the first fluid reservoir 232 at a first flow rate and flows out of the first fluid reservoir 232 at a second flow rate (e.g., a restricted flow rate) less than the first flow rate, which allows the first fluid 214 to accumulate in the first fluid reservoir 232 (e.g., until a steady state fluid level is reached).

To further facilitate conveying the first fluid 214, the drive unit assembly 200 of FIG. 4 includes the aforementioned second fluid channel 412 that extends from the second cavity 212 to the first cavity 210, thereby fluidly coupling the second cavity 212 to the first cavity 210. The second fluid channel 412 provides a second example flow path 413 (as represented by the dotted/dashed lines in FIG. 4) along which the first fluid 214 is to flow. In some examples, the first fluid channel 402 is formed and/or defined by the first housing 202 and/or one or more other components (e.g., a tube, a pipe, etc.). As shown in FIG. 4, the second fluid channel 412 is coupled to the housing 202 and at least partially positioned external to the first cavity 210 and the second cavity 212. In particular, as the second gear 236 rotates relative to the first axis 316 associated therewith, the first fluid 214 moves or is urged away from the second gear 236 radially outward relative to the first axis 316 such that the first fluid 214 flows into an inlet 414 of the second channel 412 and then out of one or more outlets 416, 418 of the second channel 412, two of which are shown in this example (i.e., a first outlet 416 and a second outlet 418).

As shown in FIG. 4, the inlet 414 of the second channel 412 is positioned in or near the second cavity 212 to receive the first fluid 214 therefrom. For example, the inlet 414 is adjacent to and/or extends through a fifth opening 420 positioned on the first housing 202. Further, the first and second outlets 416, 418 are positioned in and/or near the first cavity 210 to provide the first fluid 214 to the plates 224, 323, 228, 338 of the clutch 204. For example, the first outlet 416 is adjacent to and/or extends through an opening 422 positioned on the second housing 219 to direct the first fluid 214 out of the second channel 412 and/or onto the first clutch plates 224, 323. Further, the second outlet 418 is adjacent to and/or extends through a sixth opening 424 positioned on the first housing 202 to direct the first fluid 214 out of the second channel 412 and/or onto the second clutch plates 228, 338. As such, in the illustrated example of FIG. 4, the second channel 412 includes a first portion 426 and a second portion 428 that diverge from each other. In some examples, after the first fluid 214 flows through the inlet 414, the first fluid 214 then flows through the first portion 426 and the second portion 428 in different directions (e.g., opposite directions). The first portion 426 of FIG. 4 includes the first outlet 416, and the second portion 428 of FIG. 4 includes the second outlet 418.

Additionally, in some examples, the first portion 426 of the second fluid channel 412 includes the space 250 formed by the first shaft 218 and the first axle 220 (i.e., the second fluid channel 412 is partially formed and/or defined by the space 250), as shown in FIG. 4. In such examples, at least one of the groove(s) 252 of the first axle 220 includes a first end 430 that receives the first fluid 214 from a seventh opening 432 positioned on the first housing 202 through which the first portion 426 of the second fluid channel 412 extends. As such, the first end 430 of the groove 252 of FIG. 4 is positioned proximate to the seventh opening 432. In some examples, as the first axle 220 rotates, the groove 252 draws the first fluid 214 from the second cavity 212 and/or the second fluid reservoir 240 and urges the first fluid 214 to move through the groove 252 along the first axle 220 toward the first cavity 210 and/or the clutch 204. The groove 252 of FIG. 4 also includes a second end 434, opposite the first end 430, positioned near the outer portion 354 of the first axle 220 and/or the first plates 224, 323 to expel the first fluid 214 from the groove 252.

Additionally, in some examples, the second fluid channel 412 includes the second fluid reservoir 240 to store the first fluid 214, as previously mentioned. The second fluid reservoir 240 may be implemented, for example, using a tank coupled to the first housing 202. As shown in FIG. 2, the second fluid reservoir 240 is fluidly coupled to the second fluid channel 412 and interposed between the inlet 414, the first outlet 416, and the second outlet 418 of the second channel 412.

According to the illustrated example of FIG. 4, the vehicle 100 is driving in the second driving mode. That is, the PTU 270 transfers the engine torque from the transmission 272 to the second shaft 238 and/or, more generally, the drive unit assembly 200 resulting from the PTU 270 operating in the second state. In particular, the second housing 219 receives the engine torque and, in response, the clutch 204 transfers torque between second housing 219 and the axle(s) 220, 222 resulting from the clutch 204 operating in the second state and/or based on the position(s) of the respective first piston 242 and/or the second piston 330. As such, each of the first shaft 218, the second housing 219, the first gear 234, the second gear 236, the second shaft 238, the first axle 220, and the second axle 222 are rotating in this example due to the engine torque and/or rotation of the rear road wheel(s) 108. As shown in FIG. 4, the first piston 242 is in or near the second position to engage at least a portion (e.g., the first clutch plates 224, 323) of the clutch 204 and allow the first fluid 214 to flow through the first port 216. In particular, the first fluid 214 of FIG. 4 continuously circulates through the drive unit assembly 200 (e.g., after the second housing 219 and the second gear 236 rotate for a substantial time interval), which lubricates and/or cools one or more of the components in the first housing 202. More particularly, in such examples, the first fluid 214 substantially flows: (1) through the first fluid channel 402 from the first cavity 210 to the second cavity 212; (2) through the second fluid channel 412 from the second cavity 212 to the first cavity 210; and (3) through the port 216 (e.g., from the second cavity 212 to the first cavity 210). This flow of the first fluid 214 is primarily caused by rotation of the second housing 219 and the second gear 236. However, in some examples, rotation of the first axle 220 and/or the second axle 222 facilitate the flow of the first fluid 214 through the channel(s) 402, 412. As a result of such fluid circulation, the first outlet 406 of the first fluid channel 402 provides (e.g., continuously or repeatedly) the first fluid 214 to the first gear 234 and/or the second gear 236. Further, the first outlet 416 of the second channel 412 provides (e.g., continuously or repeatedly) the first fluid 214 to the first plates 224, 323 inside of the second housing 219, and the second outlet 418 of the second fluid channel 412 provides (e.g., continuously or repeatedly) the first fluid 214 to the second plates 228, 338 inside the second housing 219. Additionally, in some examples, this circulation of the first fluid 214 lubricates one or more of the bearings 226, 230, 239, 326, 342 of the drive unit assembly 200.

In some examples, when the vehicle 100 has been operating in the second driving mode for a substantial time interval, each of the first fluid reservoir 232, the second fluid reservoir 240, the first cavity 210, and the second cavity 212 substantially reaches a steady state fluid level of the first fluid 214, as shown in FIG. 4. For example, the first fluid reservoir 232 of FIG. 4 has a particular amount of the first fluid 214 therein, which is indicated by a first or initial example fluid level 436 (as represented by the dotted/dashed line in FIG. 4) associated with the first fluid reservoir 232. Further, the second fluid reservoir 240 of FIG. 4 is substantially full of the first fluid 214. Further still, each of the first and second cavities 210, 212 of FIG. 4 has a particular amount of the first fluid 214 therein, which is indicated by a first or initial example fluid level 438 (as represented by the dotted/dashed lines in FIG. 4) associated with the first cavity 210 and a first or initial example fluid level 440 associated with the second cavity 212. As shown in FIG. 4, the first fluid levels 438, 440 associated with the respective first and second cavities 210, 212 are substantially equal or the same.

Figure 5:
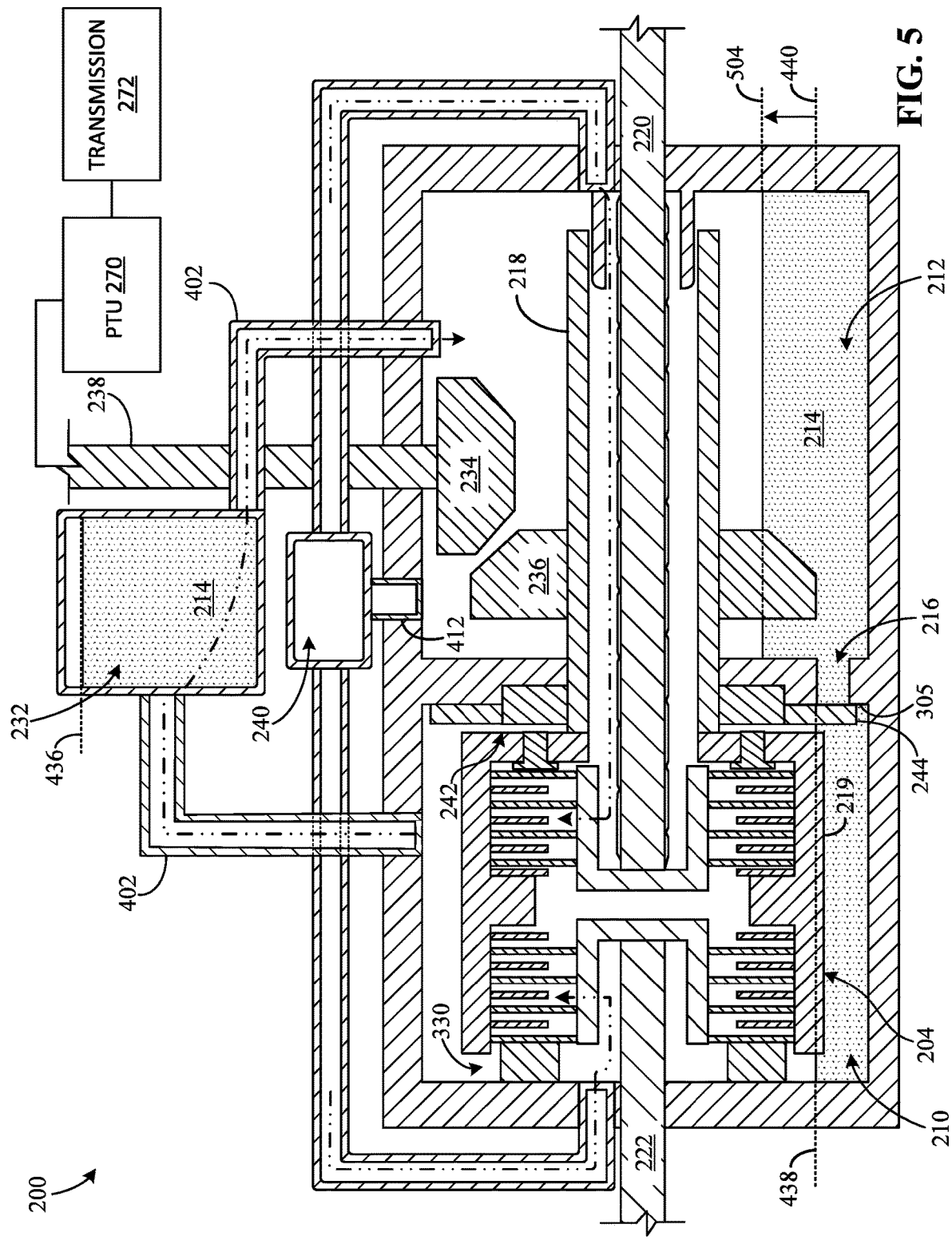

According to the illustrated example of FIG. 5, the vehicle 100 is shifting and/or otherwise transitioning from the second driving mode to the first driving mode. In particular, the PTU 270 of FIG. 5 is operating in the first state and, as a result, does not transfer the engine torque from the transmission 272 to the second shaft 238 and/or, more generally, the drive unit assembly 200. Thus, the second housing 219 does not receive the engine torque. However, in some examples, to maintain rotation of the second housing 219 and/or further pump the first fluid 214 out of the first cavity 210 during such a vehicle transition, the controller 110 controls the clutch 204 to change to the third example state (e.g., a partially engaged or disengaged state) in which the second housing 219 is connected to a single wheel 106, 108. In such examples, the third state of the clutch 204 of FIG. 5 corresponds to the third state of the drive unit 116.

In some examples, the controller 110 moves, via the first one of the valve(s) 346, the first piston 242 from the second position to or near the first position to disconnect second housing 219 from the first one of the wheel(s) 106, 108. In such examples, such actuation of the first piston 242 reduces (e.g., ceases) a flow of the first fluid 214 into the first cavity 210 from the port 216 during the transition of the vehicle 100 between the driving modes. As a result, in such examples, a flow of the first fluid 214 into the first cavity 210 (e.g., through the second channel 412) is less than a flow of the first fluid 214 out of the first cavity 210 through the first channel 402.

In particular, when the clutch 204 is in the third state, the controller 110 substantially maintains, adjusts, and/or otherwise controls the position of the second piston 330 such that the second housing 219 remains at least partially connected to the second one of the vehicle wheel(s) 106, 108. As a result, rotation of the second one of the wheel(s) 106, 108 causes the second housing 219 to rotate. In this manner, the controller 110 enables the second housing 219 to continue to rotate for a time interval (e.g., a predetermined time interval) when the vehicle 100 is transitioning between the driving modes and/or after the clutch 204 disengages (e.g., partially disengages) and the PTU 270 disengages. Thus, the controller 110 enables continued expulsion of the first fluid 214 from the first cavity 210 such that the amount of the first fluid 214 in the first cavity 210 decreases during the vehicle transition, which reduces and/or eliminates fluid drag that would have otherwise been experienced by the clutch 204 after the vehicle 100 completes transitioning to the first driving mode. Additionally or alternatively, in some examples, to similarly maintain rotation of the second housing 219, the controller 110 controls the PTU 270 to remain in the second state when the clutch 204 is in the first state.

As shown in FIG. 5, the first piston 242 is in the first position to substantially prevent the first fluid 214 from flowing through the first port 216, which allows the first fluid 214 to accumulate in the second cavity 212 and/or facilities expelling the first fluid 214 from the first cavity 210. That is, the fluid flow control portion 244 of FIG. 5 is substantially sealing the first port 216, for example, via a fluid seal formed by a surface of the fluid flow control portion 244 and a surface of the first wall 305. In particular, circulation of the first fluid 214 through the second fluid channel 412 has substantially ceased in the illustrated example of FIG. 5. However, in some examples, a portion (e.g., an excess portion) the first fluid 214 may still flow through the second fluid channel 412 while the vehicle 100 is transitioning to the first driving mode (e.g., while the second fluid reservoir 240 and/or second fluid channel 412 is/are draining), as shown in FIG. 5. In such examples, to prevent this portion of the first fluid 214 from excessively lubricating the clutch 204 in the first fluid 214 and/or otherwise causing the clutch 204 to experience fluid drag when the vehicle 100 is in the first driving mode, the controller 110 substantially maintains rotation of the second housing 219 for the time interval, as previously mentioned.

As shown in FIG. 5, the amount of the first fluid 214 in the first fluid reservoir 232 of FIG. 5 has not substantially changed, which is indicated by the first fluid level 436 associated with the first fluid reservoir 232. On the other hand, the second fluid reservoir 240 has substantially drained the first fluid 240 therein (e.g., the second fluid reservoir 240 is empty). In particular, the amount of the first fluid 214 in the first cavity 210 has not substantially changed. As such, the first fluid level 438 associated with the first cavity 210 has not substantially increased or decreased.

However, the amount of the first fluid 214 in the second cavity 212 has increased, as indicated by the second example fluid level 504 associated with the second cavity 212. As such, the second fluid level 504 is greater than the first fluid level 440 associated with the second cavity 212. In some examples, the amount of the first fluid 214 in the second cavity 212 continues to increase until the first fluid 214 has substantially emptied from the first fluid reservoir 232 and/or the first fluid channel 402.

Figure 6:
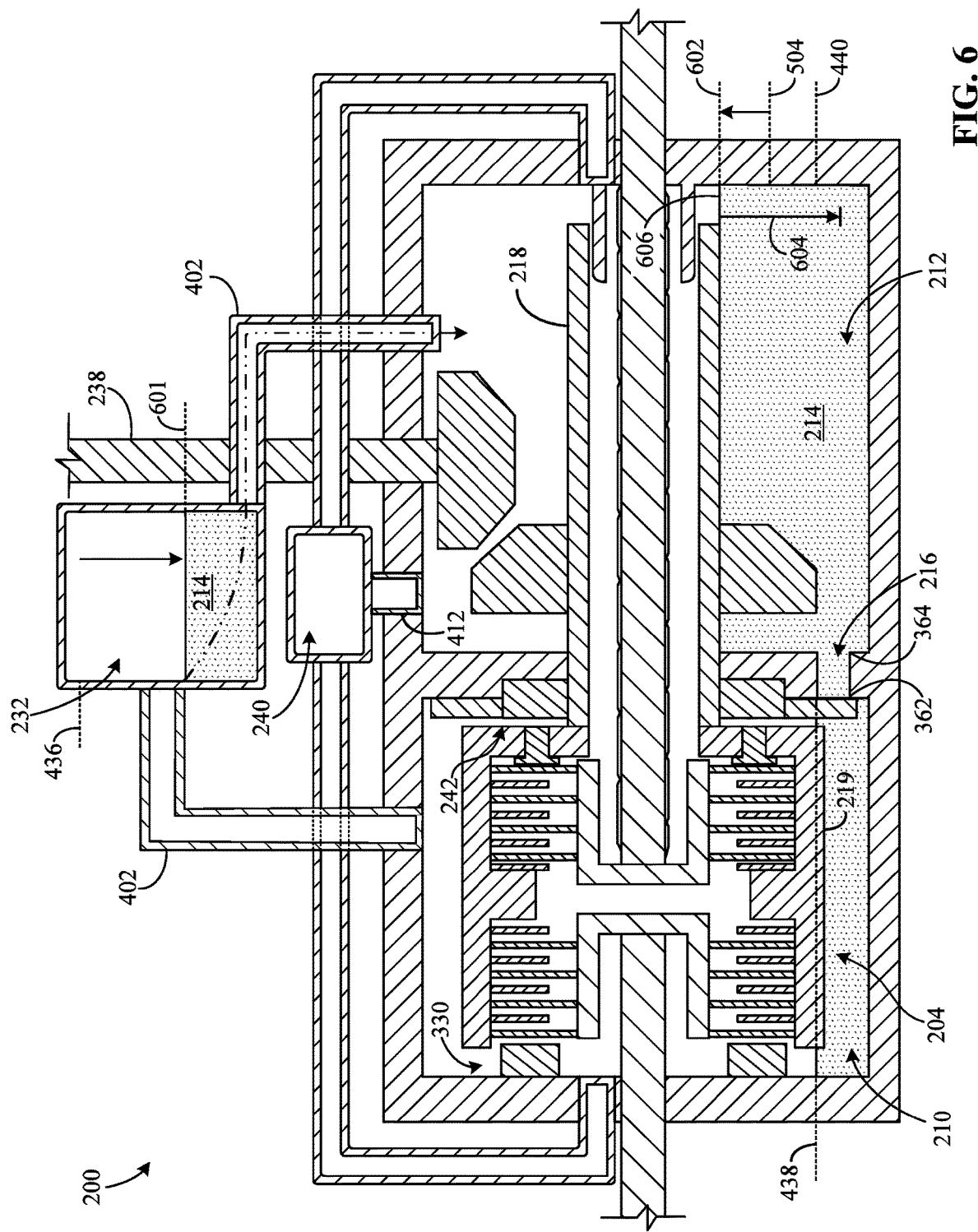

According to the illustrated example of FIG. 6, the vehicle 100 has shifted or changed to and/or otherwise is operating in the first driving mode (i.e., the vehicle 100 completed transitioning from the second driving mode to the first driving mode). In some such examples, the controller 110 moves, via the second one of the valve(s) 346, the second piston 330 from the second position to the first position to disconnect the second housing 219 from the second one of the wheel(s) 106, 108, which provides the first state of the clutch 204. As shown in FIG. 6, the second piston 330 is in the first position. As such, the second housing 219 of FIG. 6 is no longer expelling the first fluid 214 from the first cavity 210. That is, the second housing 219 of FIG. 6 has substantially ceased rotating and/or is rotating at an angular rate that is less than a threshold angular rate associated with expelling the first fluid 214 from the first cavity 210 via rotation of the second housing 219. Accordingly, the first fluid reservoir 232 is draining the first fluid 214 therefrom and/or the first fluid 214 is flowing through the first fluid channel 402 to the second cavity 212. As a result, the amount of the first fluid 214 in the first fluid reservoir 232 has decreased, which is represented by the second example fluid level 601 associated with the first fluid reservoir 232. In such examples, the second fluid level 601 associated with the first fluid reservoir 232 is less than the first fluid level 436 associated with the first fluid reservoir 232. Further, the amount of the first fluid 214 in the second cavity 212 has increased, as represented by the third example fluid level 602 associated with the second cavity 212. In such examples, the third fluid level 602 associated with the second cavity 212 is greater than the first and second fluid levels 440, 504 associated with the second cavity 212.

As shown in FIG. 6, the first port 216 is positioned at a particular depth 604 in the first fluid 214 that is below a surface 606 of the first fluid 214 within the second cavity 212. In such examples, gravity and/or a fluid pressure of the first fluid 214 at or near the depth 604 effectively urges the first fluid 214 through the first port 216 when the first piston 242 actuates or moves toward the second position. In particular, the first port 216 experiences a fluid pressure differential across its length in response to movement of the first piston 242. That is, in such examples, the fluid pressure of the first fluid 214 within the second cavity 212 at or near the second end 364 is greater than the fluid pressure of the first fluid 214 within the first cavity 210 at or near the first end 362. Such a difference in the fluid pressure rapidly provides the first fluid 214 through the first port 216 and to the clutch 204 (e.g., before the clutch 204 generates torque), which improves clutch performance.

Figure 7:
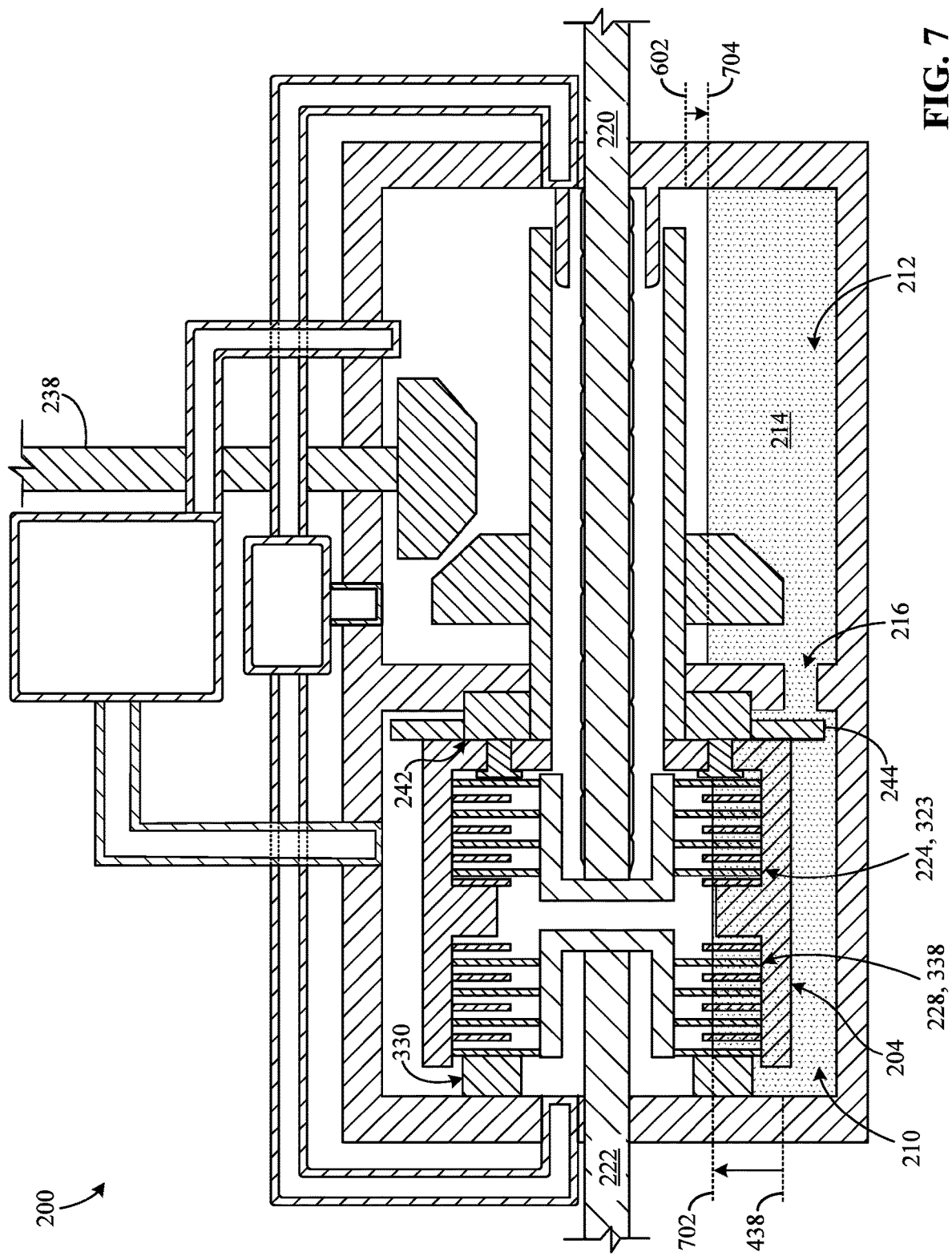

According to the illustrated example of FIG. 7, the vehicle 100 shifted or changed from the first driving mode back to the second driving mode. That is, the clutch 204 generates torque for the axles 220, 222 and/or otherwise transfers torque (e.g., a relatively low amount or degree of torque) between the axles 220, 222 and the second shaft 238 based on actuation of the first piston 242 and the second piston 330. In some examples, the second shaft 238 of FIG. 7 accelerates or speeds up (i.e., a rate of rotation of the second shaft 238 increases) to match a speed at which the vehicle 100 is moving. Stated differently, in such examples, the second shaft 238 has a rate of rotation that is less than a rate of rotation of the axles 220, 222 during a particular time interval (sometimes referred to as a synchronization phase).

In particular, as the fluid flow control portion 244 moves away from the first port 216 (and/or one or more other ports), the first fluid 214 stored in the second cavity 212 rapidly and/or sufficiently flows through the first port 216 from the second cavity 212 to the first cavity 210, which keeps the clutch 204 lubricated and/or cool during the synchronization phase. As shown in FIG. 7, the amount of the first fluid 214 within the first cavity 210 and the second cavity 212 has respectively increased and decreased, as indicated by a second example fluid level 702 (as represented by the dotted/dashed lines of FIG. 7) associated with the first cavity 210 and a fourth example fluid level 704 (as represented by the dotted/dashed lines of FIG. 7) associated with the second cavity 212. As such, the second fluid level 702 is greater than the first fluid level 438 associated with the first cavity 210, and the fourth fluid level 704 is less than the third fluid level 602 associated with the second cavity 212. In some examples, the second fluid level 702 associated with the first cavity 210 is substantially the same or equal to the fourth fluid level 704 associated with the second cavity 212.

The second fluid level 702 of FIG. 7 is above a bottom-most (in the orientation of FIG. 7) portion of the second housing 219 such that the clutch plates 224, 323, 228, 338 are substantially immersed in the first fluid 214. In this manner, a sufficient amount of the first fluid 214 is provided to the clutch plates 224, 323, 228, 338 to maintain a temperature thereof before the synchronization phase is complete, which enables the clutch plates 224, 323, 228, 338 to generate an increased (e.g., a maximum) amount of torque without damaging and/or otherwise adversely affecting the plates 224, 323, 228, 338 due to high temperature and/or friction.

Although FIGS. 2-7 depict the components of the drive unit assembly 200 and/or, more generally, the drive unit assembly 200 having a particular structure and/or configuration, in some examples, one or more of the components of the drive unit assembly 200 and/or, more generally, the drive unit assembly 200 is implemented differently, as discussed in greater detail below in connection with FIGS. 8-14.

Figure 8:
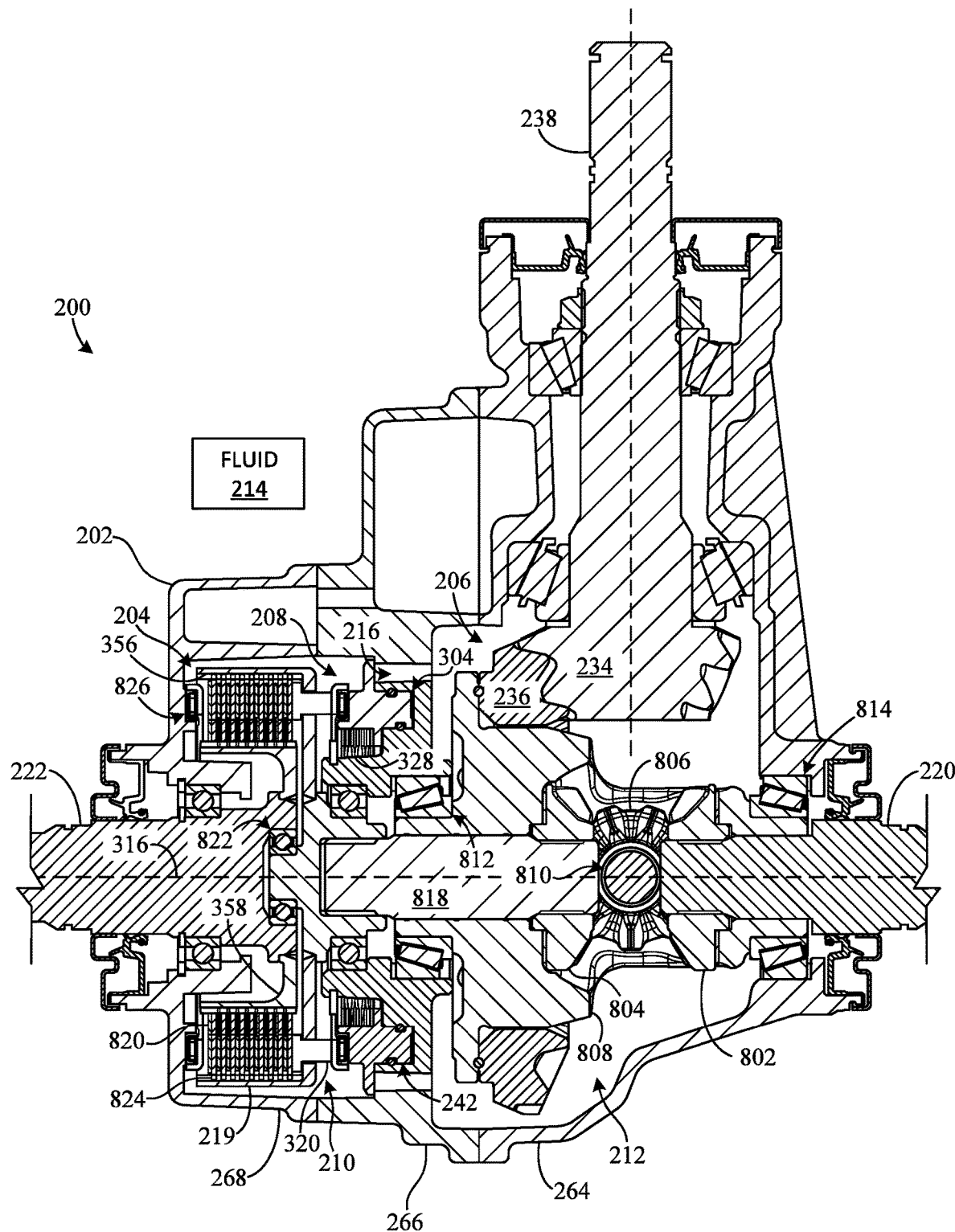
FIG. 8 is another cross-sectional view of the drive unit assembly of FIG. 2 and shows a second example configuration thereof in accordance with the teachings of this disclosure.

FIG. 8 is another cross-sectional view of the drive unit assembly 200 and shows a second example configuration thereof. In some examples, the drive unit assembly 200 of FIG. 8 is used to implement at least a portion of the drivetrain system 104 of FIG. 1. In particular, the clutch 204 of FIG. 8 is implemented using a single clutch. According to the illustrated example of FIG. 8, the clutch 204 is operatively coupled to and/or interposed between the gear system 206 and the first or second axle 220, 222 and configured to transfer torque between the gear system 206 and the first or second axle 220, 222 based on the state of the clutch 204. Additionally, the gear system 206 of FIG. 8 is implemented using a differential.

As shown in FIG. 8, the gear system 206 includes a third example gear (e.g., a bevel gear) 802 associated with the first axle 220 and a fourth example gear (e.g., a bevel gear) 804 associated with the second axle 222. Additionally, in some such examples, the gear system 206 of FIG. 8 also includes one or more intermediate gears (e.g., one or more bevel gears) 806 meshed with and/or operatively coupled between the third and fourth gears 802, 804 and configured to transfer torque therebetween, one of which is shown in this example. Each of the intermediate gears 806 of FIG. 8 is rotatably coupled to an example cage or carrier 808 of the gear system 206, for example, via one or more example bearings 810 (one of which is shown in this example). The carrier 808 of FIG. 8 is coupled to the second gear 236, for example, via one or more example fasteners and/or one more example fastening methods or techniques. As a result, in such examples, the second gear 236, the intermediate gear(s) 806, and the carrier 808 can rotate cooperatively, for example, relative to the first axis 316 during vehicle operation. Further, each of the intermediate gear(s) 806 can also rotate relative to the respective bearing(s) 810. In some examples, to stabilize and/or facilitate rotational movement the second gear 236 and/or the carrier 808, the drive unit assembly 200 of FIG. 8 also includes one or more example bearings (e.g., one or more tapered roller bearings) 812, 814 operatively coupled to and/or interposed between the carrier 808 and the first housing 202, two of which are shown in this example.

In some examples, as shown in FIG. 8, the third gear 802 is coupled (e.g., directly and/or via one or more intermediate components) to the first axle 220 to transfer torque between the intermediate gear(s) 806 and the first axle 220, for example, using one or more examples fasteners and/or one or more example fastening methods or techniques. Further, the fourth gear 804 is coupled (e.g., directly and/or via one or more intermediate components) to a portion (e.g., the second housing 219) of the clutch 204 to transfer torque between the intermediate gear(s) 806 and the portion of the clutch 204, for example, using one or more examples fasteners and/or one or more example fastening methods or techniques. In some examples, the drive unit assembly 200 of FIG. 8 includes a third example shaft 818 extending from the fourth gear 804 to the second housing 219, as shown in FIG. 8. In such examples, the third shaft 818 is coupled to a portion (e.g., an inner surface and/or a circumferential surface) of the fourth gear 804 and a portion (e.g., an inner surface and/or a circumferential surface) of the second housing 219, for example, via one or more example fasteners and/or one or more example fastening methods or techniques. As a result, the second housing 219, the fourth gear 804, and the third shaft 818 can rotate cooperatively, for example, relative to the first axis 316 during vehicle operation.

According to the illustrated example of FIG. 8, the gear system 206 includes a first example portion (e.g., an input), a second example portion (e.g., a first output), and a third example portion (e.g., a second output). In particular, the gear system 206 of FIG. 8 is structured and/or configured to distribute engine torque and/or otherwise transfer the engine torque from the first portion to the second portion and/or the third portion. In some examples, the first portion of the gear system 206 of FIG. 8 is formed and/or defined by one or more (e.g., all) of the first gear 234, the second gear 236, the second shaft 238, the intermediate gear(s) 806, and/or the carrier 808. Further, in some examples, the second portion of the gear system 206 of FIG. 8 is formed and/or defined by the third gear 802 and/or the first axle 220. Further still, in some examples, the third portion of the gear system 206 of FIG. 8 is formed and/or defined by the fourth gear 804 and/or the third shaft 818.

The clutch 204 of FIG. 8 is configured to control an amount or degree of engine torque transferred from the second shaft 238 to one or more of the wheel(s) 106, 108 based on the state of the clutch 204. For example, the clutch 204 receives the engine torque from the gear system 206 via the fourth gear 804 and/or the third shaft 818 when the vehicle 100 is operating in the second driving mode. In response, when the clutch 204 is in the engaged state and/or at least partially engaged, the clutch 204 generates torque for the second axle 222 and/or otherwise transfers at least a portion of the engine torque from the third shaft 818 to the second axle 222. Additionally, as a result of such engagement of the clutch 204, the third shaft 818 and/or the fourth gear 804 experience an inertia associated with the second axle 222, which causes the gear system 206 of FIG. 8 to also transfer at least a portion of the engine torque from the second shaft 238 to the third gear 802 and, thus, the first axle 220. That is, the fourth gear 804 applies a substantial resistance to the intermediate gear(s) 806 when the clutch 204 is in the engaged state. In this manner, the clutch 204 facilitates operation of the gear system 206 of FIG. 8 by connecting the second axle 222 to the fourth gear 804.

As shown in FIG. 8, the clutch 204 is at least partially positioned in the first cavity 210 of the first housing 202. In some examples, in response to at least a portion (e.g., the second housing 219) of the clutch 204 rotating relative to the first axis 316, the first fluid 214 flows from the first cavity 210 to the second cavity 212, for example, via the first fluid channel 402, as previously mentioned. Further, as shown in FIG. 8, the first gear 234, the second gear 236, the third gear 802, the fourth gear 804, the intermediate gear(s) 806, and the carrier 808 are positioned in the second cavity 212 to receive the first fluid 214. In some examples, in response to at least a portion (e.g., the second gear 238) of the gear system 206 rotating, the first fluid 214 flows from the second cavity 212 to the first cavity 210, for example, via the second fluid channel 412, as previously mentioned.

The second axle 222 of FIG. 8 is coupled to one or more third example inner discs or plates (e.g., annular plates) 820 of the clutch 204. That is, the clutch 204 of FIG. 8 includes the third inner plate(s) 820. As such, when the clutch 204 is at least partially engaged, the engine torque causes the third inner plate(s) 820 and second axle 222 to rotate cooperatively, for example, relative to the first axis 316. Additionally, in some examples, to stabilize and/or facilitate rotational movement of the second axle 222 and/or the third inner plate(s) 820, the second axle 222 is rotably coupled to the second housing 219, for example, via an example bearing (e.g., a bearing) 822 operatively coupled to and/or interposed between the second axle 222 and a portion of the second housing 219.

The actuator system 208 of FIG. 8 includes the first piston 242 but not the second piston 330. In other words, the actuator system 208 of FIG. 8 includes a single actuator 242. As previously mentioned, the first piston 242 is configured to move relative to the first port 216 (e.g., via the second fluid 306 provided to the first piston 242 from the fluid supply system 308), thereby controlling the flow of the fluid 214 through the first port 216 from the second cavity 212 to the first cavity 210. Additionally, in some examples, the first piston 242 is configured to operate the clutch 204. In such examples, the apply plate 320 of FIG. 8 is positioned on or near the third inner plates 820 and/or one or more third example outer discs or plate(s) (e.g., annular plates) 824 of the clutch 204. That is, the clutch 204 of FIG. 8 includes the third outer plate(s) 824, each of which is sometimes referred to as a separator plate. As used herein, the term(s) "third plates," "third clutch plates," and/or "a third clutch pack" refer(s) to the third inner plate(s) 820 and the third outer plate(s) 824 of the clutch 204 of FIG. 8. The third clutch plates 820, 824 of FIG. 8 enable the clutch 204 to generate torque and/or transfer torque between the third shaft 818 and the second axle 222 based on a degree of pressure that the third plates 820, 824 impart on each other. In particular, when the first piston 242 actuates and/or moves toward the second position (e.g., via the fluid pressure in the first chamber 304), the apply plate 320 urges the third plates 820, 824 toward and/or into engagement with an example bearing (e.g., a thrust bearing) 826, which squeezes the third plates 820, 824 and/or increases the pressure experienced by the third plates 820, 824. In some examples, the bearing 826 is positioned on and/or coupled to the third housing portion 268.

Thus, the third plates 820, 824 of FIG. 8 are configured to transfer at least a portion of the engine torque from the second housing 219 to the second axle 222 based on a position of the first piston 242 and/or the pressure experienced by the third plates 820, 824. In particular, the third inner plate(s) 820 are splined with the outer portion 358 associated with the second axle 222 such that the third inner plate(s) 820 can slide along the outer portion 358 toward and away from the third outer plate(s) 824 while maintaining an orientation thereof relative to the second axle 222 and/or the outer portion 358 (i.e., the third inner plate(s) 820 rotate cooperatively with the second axle 222). Similarly, the third outer plate(s) 824 are splined with the first inner portion 356 of the second housing 219 such that the first outer plate(s) 323 can slide along the first inner portion 356 toward and away from the third inner plate(s) 820 while maintaining an orientation thereof relative to the second housing 219 (i.e., the third outer plate(s) 824 rotate cooperatively with the second housing 219). That is, the third inner plate(s) 820 are slidably coupled (e.g., via slots or grooves disposed on the outer portion 358) to the outer portion 358, and the third outer plate(s) 824 are slidably coupled (e.g., via slots or grooves disposed on the first inner portion 356) to the first inner portion 356. As a result, the third plates 820, 824 better engage with and disengage from each other.

In some examples, to facilitate positioning the apply plate 320 and/or the first piston 242, the spring(s) 328 of FIG. 8 are operatively coupled to the first piston 242. As shown in FIG. 8, the spring(s) 328 are interposed between the first piston 242 and a portion of the first housing 202. In such examples, the spring(s) 328 urge the first piston 242 and/or the apply plate 320 away from the third clutch plates 820, 824.

FIGS. 9-12 are schematic illustrations of the drive unit assembly 200 of FIG. 8 and show example fluid flow based on the vehicle 100 operating in the different driving modes and/or transitions between the driving modes, for example, similar to the schematic illustrations shown in FIGS. 4-7. As such, in some examples, in response to rotation of the second housing 219, the first fluid 214 is urged and/or pumped out of the first cavity 210 and into the second cavity 212 and/or the first fluid reservoir 232, for example, through the first fluid channel 402 (a portion of which is shown in this example). In some such examples, as previously mentioned, the first fluid reservoir 232 drains the first fluid 214 into the second cavity 212 at a restricted rate, which allows the first fluid 214 to accumulate in the first fluid reservoir 232 when the vehicle is operating in the second driving mode. Additionally, the first fluid reservoir 232 facilitates maintaining sufficient levels of the first fluid 214 within the drive unit assembly 200 when the first fluid 214 is circulating therethrough as well as after such circulation. Further, in some examples, in response to rotation of at least a portion (e.g., one or more of the gears 234, 236, 802, 804, 806 and/or the carrier 808) of the gear system 206, the first fluid 214 is urged and/or pumped out of the second cavity 212 and into the first cavity 210 and/or the second fluid reservoir 240, for example, via the second fluid channel 412 (a portion of which is shown in this example).

Figure 9:
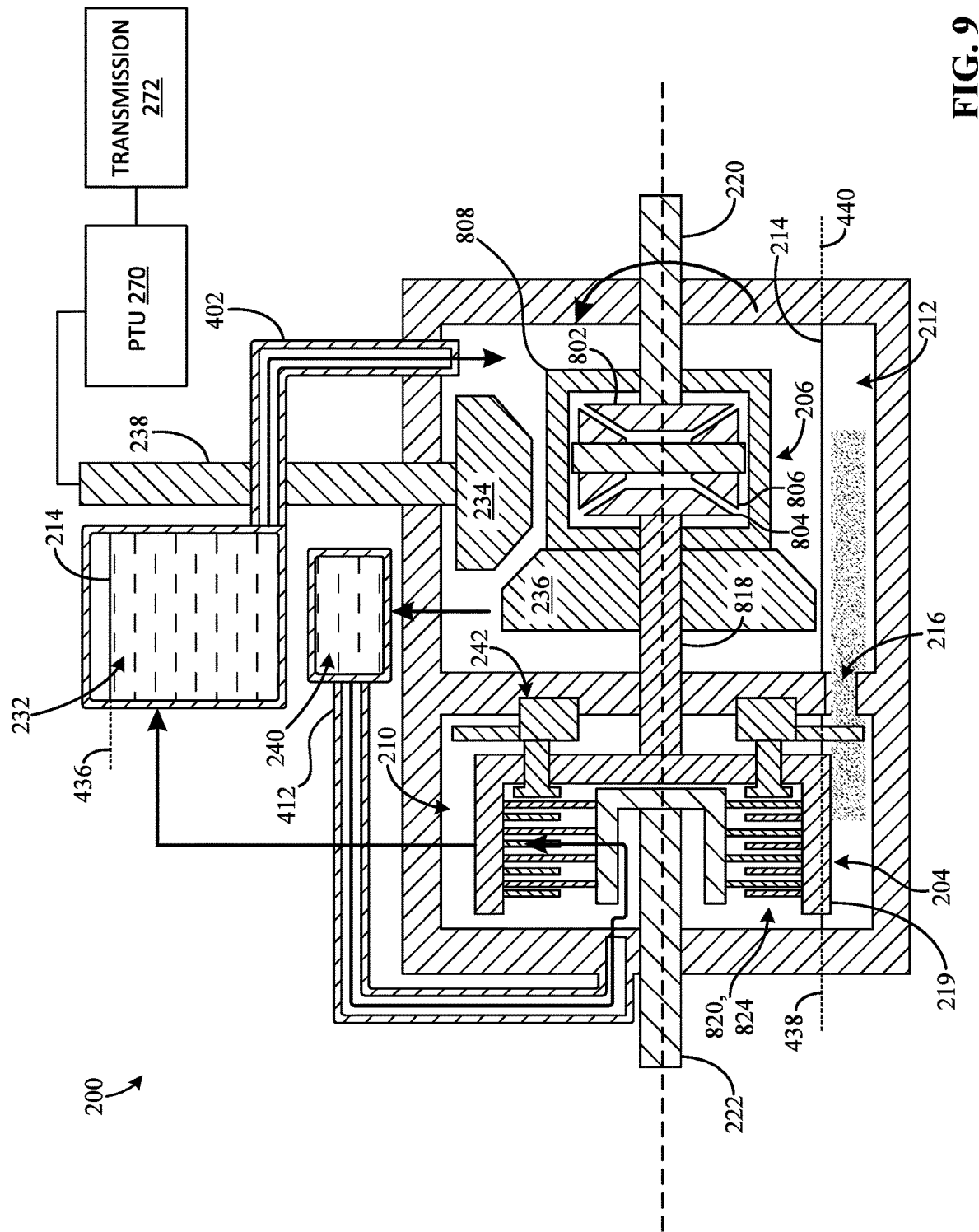
FIGS. 9-12 are schematic illustrations of the drive unit assembly of FIG. 8 and show example fluid flow based on different vehicle driving modes and/or transitions between the driving modes.

According to the illustrated example of FIG. 9, the vehicle 100 is driving in the second driving mode such that the clutch 204 enables torque transfer between the second shaft 238 and the axle(s) 220, 222. That is, the PTU 270 transfers the engine torque from the transmission 272 to the second shaft 238 and/or, more generally, the drive unit assembly 200 resulting from the PTU 270 operating in the second state. As a result, one or more (e.g., all) rotatable components of the drive unit assembly 200 of FIG. 9 are rotating due to the engine torque and/or rotation of the road wheel(s), 106, 108 such as, for example, the second housing 219 of the clutch 204, the first axle 220, the second axle 222, the first gear 234, the second gear 236, the third gear 802, the fourth gear 804, the second shaft 238, the third shaft 818, the carrier 808, etc. In particular, the first piston 242 of FIG. 9 is in or near the second position (e.g., to engage and/or squeeze one or more of the third clutch plates 820, 824), which allows the first fluid 214 to flow through the first port 216. Accordingly, the clutch 204 of FIG. 9 is in the engaged state or at least partially engaged. In some examples, the first fluid 214 of FIG. 9 continuously circulates through the drive unit assembly 200 (e.g., after the second housing 219 and the second gear 236 rotate for a substantial time interval), which lubricates and/or cools one or more of the components of the drive unit assembly 200. In some examples, when the vehicle 100 has been operating in the second driving mode for a substantial time interval, each of the first fluid reservoir 232, the second fluid reservoir 240, the first cavity 210, and the second cavity 212 reach a steady state fluid level of the first fluid 214, as shown in FIG. 9. That is, the first fluid reservoir 232 of FIG. 9 has a particular amount of the first fluid 214 therein, which is indicated by the first fluid level 436 associated with the first fluid reservoir 232. Further, the second fluid reservoir 240 of FIG. 9 is substantially full (e.g., completely full) of the first fluid 214. Further still, each of the first and second cavities 210, 212 of FIG. 9 has a particular amount of the first fluid 214 therein, which is indicated by the first or initial fluid level 438 associated with the first cavity 210 and the first or initial fluid level 440 associated with the second cavity 212. In some examples, the first fluid levels 438, 440 associated with the respective first and second cavities 210, 212 are substantially equal or the same, as shown in FIG. 9.

Figure 10:
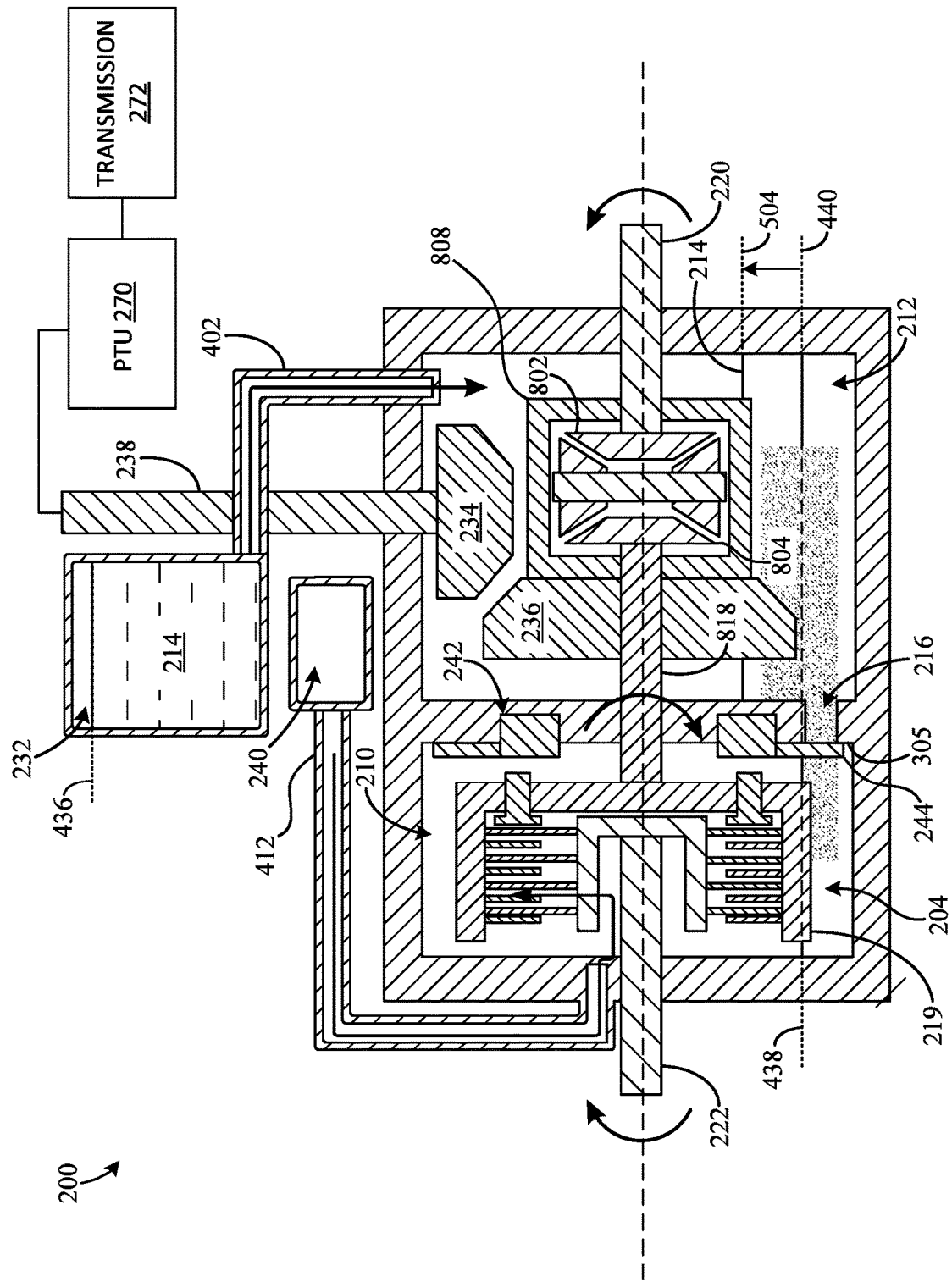

According to the illustrated example of FIG. 10, the vehicle 100 is shifting and/or transitioning from the second driving mode to the first driving mode. In particular, similar to FIG. 9, the PTU 270 of FIG. 10 is operating in the second state and, as a result, transfers the engine torque from the transmission 272 to the second shaft 238 and/or, more generally, the drive unit assembly 200. In some such examples, to maintain rotation of the second housing 219 and/or further pump the first fluid 214 out of the first cavity 210 during such a vehicle transition, the controller 110 controls the PTU 270 to remain in the second state while the clutch 204 is in the first state or disengaged.

In some examples, the controller 110 moves, via the first one of the valve(s) 346, the first piston 242 from the second position to the first position to disconnect second housing 219 from the first one and the second one of the wheel(s) 106, 108 during this transition of the vehicle 100. In such examples, such actuation of the first piston 242 reduces (e.g., ceases) a flow of the first fluid 214 into the first cavity 210 from the port 216 during the transition of the vehicle 100. In particular, when the clutch 204 of FIG. 10 is in the first state, the controller 110 substantially maintains and/or otherwise controls the PTU 270 such that the second housing 219 remains connected to the transmission 272. As a result, the engine torque provided to the second housing 219 from the PTU 270 causes the second housing 219 to rotate. In this manner, the controller 110 enables the second housing 219 to continue to rotate for a time interval (e.g., a predetermined time interval) when the vehicle 100 is transitioning between the driving modes and/or after the clutch disengages. Thus, the controller 110 enables continued evacuation of the first fluid 214 from the first cavity 210 such that the amount of the first fluid 214 in the first cavity 210 decreases during the vehicle transition, which reduces and/or eliminates fluid drag that would have otherwise been experienced by the clutch 204 after the vehicle 100 completes transitioning to the first driving mode.

As shown in FIG. 10, the first piston 242 is in or near the first position to substantially prevent the first fluid 214 from flowing through the first port 216, which allows the first fluid 214 to accumulate in the second cavity 212 and/or facilitates expelling the first fluid 214 from the first cavity 210 via rotation of the second housing 219. That is, the fluid flow control portion 244 of FIG. 10 is substantially sealing the first port 216, for example, via a fluid seal formed by the fluid control portion 244 and the first wall 305.

In particular, circulation of the first fluid 214 through the second fluid channel 412 has substantially ceased in the illustrated example of FIG. 10. However, in some examples, a portion (e.g., an excess portion) the first fluid 214 may still flow the second fluid channel 412 (e.g., while the second fluid reservoir 240 and/or second fluid channel 412 is/are draining), as shown in FIG. 5. In such examples, to prevent this portion of the first fluid 214 from excessively lubricating the clutch 204 and/or otherwise causing the clutch 204 to experience fluid drag when the vehicle 100 is in the first driving mode, the controller 110 advantageously controls the PTU 270 to substantially maintain rotation of the second housing 219 for the time interval, as previously mentioned.

As shown in FIG. 10, the amount of the first fluid reservoir 232 of FIG. 10 has not substantially changed, which is indicated by the first fluid level 436 associated with the first fluid reservoir 232. Further, the second fluid reservoir 240 has substantially drained the first fluid 240 therein (e.g., the second fluid reservoir 240 is empty). Further, the amount of the first fluid 214 in the first cavity 210 has not substantially changed. As such, the first fluid level 438 associated with the first cavity 210 has not substantially increased or decreased. However, the amount of the first fluid 214 in the second cavity 212 has increased, as indicated by the second example fluid level 504 associated with the second cavity 212. As such, the second fluid level 504 associated with the second cavity 212 is greater than the first fluid level 440 associated with the second cavity 212. In some examples, the amount of the first fluid 214 in the second cavity 212 continues to increase when the vehicle 100 is transitioning from the second driving mode to the first driving mode until the first fluid 214 has substantially emptied from the first fluid reservoir 232 and/or the first fluid channel 402 after the transition.

Figure 11:
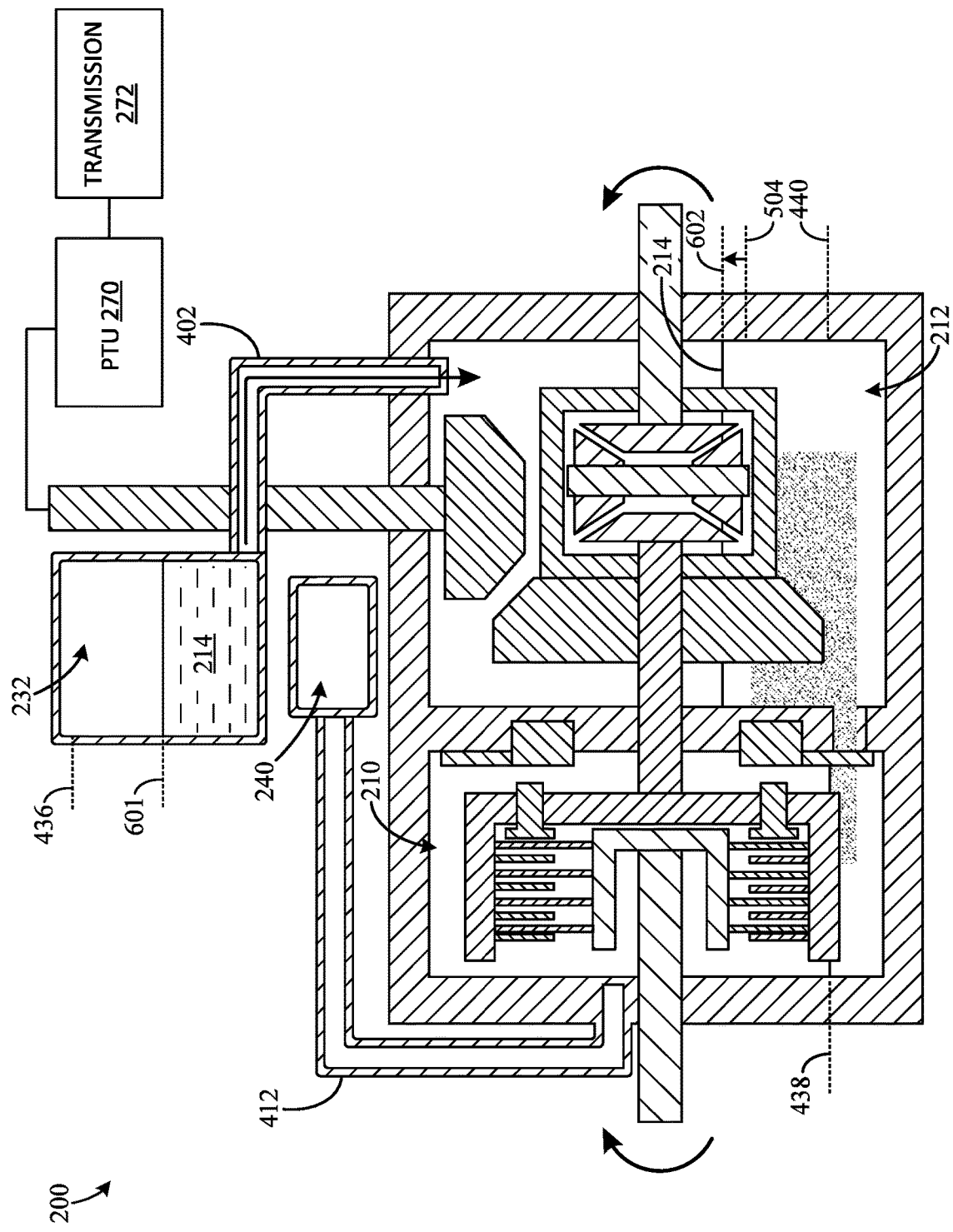

According to the illustrated example of FIG. 11, the vehicle 100 has shifted or changed to and/or otherwise is operating in the first driving mode (i.e., the vehicle 100 completed transitioning from the second driving mode to the first driving mode). In some examples, the controller 110 controls, via the actuator(s) 274, the PTU 270 to change from the second state to the first state to disconnect the second housing 219 from the transmission 272. As such, the second housing 219 is no longer expelling the first fluid 214 from the first cavity 210. That is, the second housing 219 of FIG. 11 has substantially ceased rotating and/or is rotating at an angular rate that is less than a threshold angular rate associated with expelling the first fluid 214 from the first cavity 210 via rotation of the second housing 219. Accordingly, the first fluid reservoir 232 is draining the first fluid 214 therefrom and/or the first fluid 214 is flowing through the first fluid channel 402 to the second cavity 212. As a result, the amount of the first fluid 214 in the first fluid reservoir 242 has decreased, which is represented by the second example fluid level 601 associated with the first fluid reservoir 232. In such examples, the second fluid level 601 associated with the first fluid reservoir 232 is less than the first fluid level 436 associated with the first fluid reservoir 232. Further, the amount of the first fluid 214 in the second cavity 212 has increased, as represented by the third example fluid level 602 associated with the second cavity 212. In such examples, the third fluid level 602 associated with the second cavity 212 is greater than the first and second fluid levels 440, 504 associated with the second cavity 212.

Figure 12:
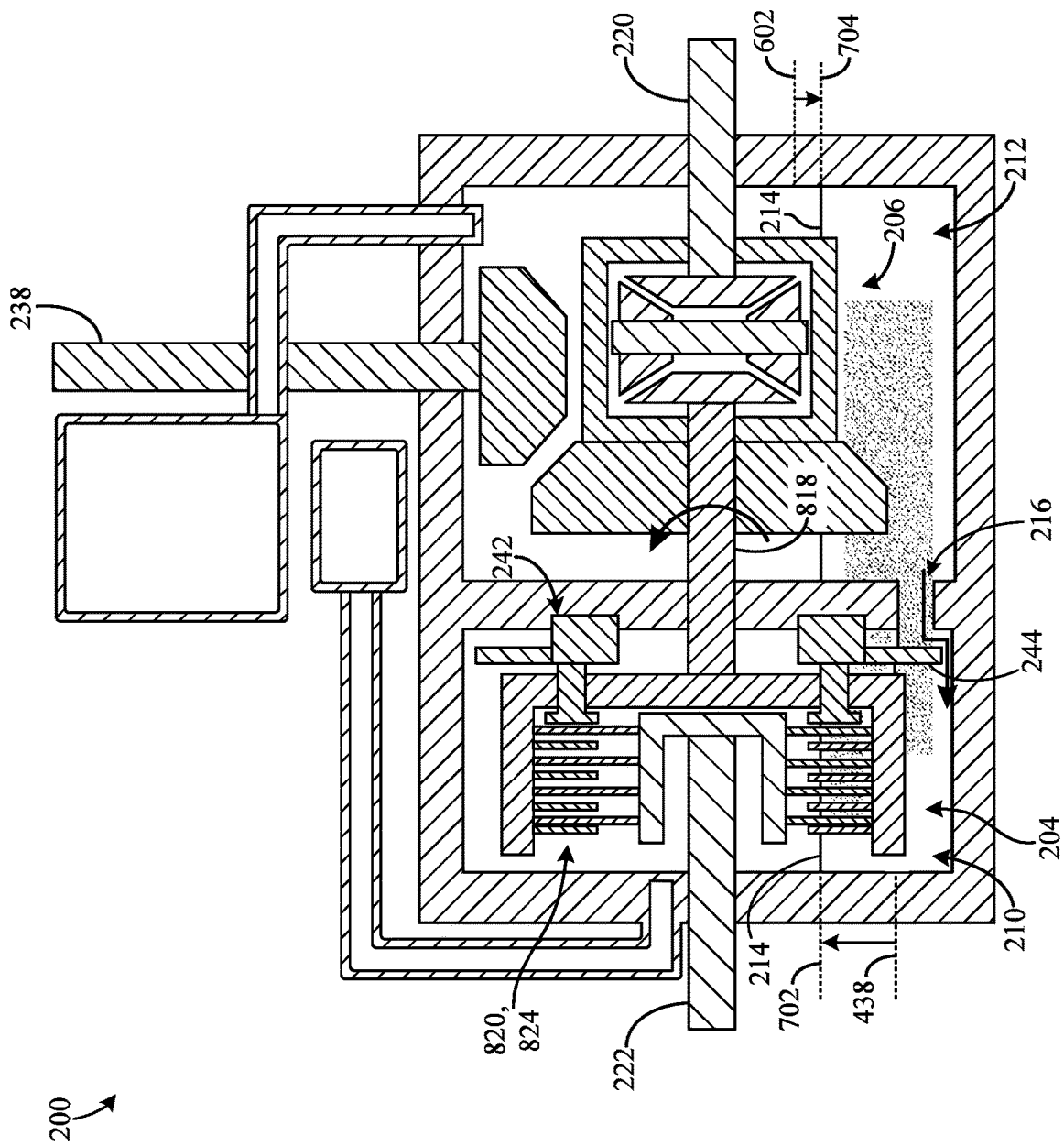

According to the illustrated example of FIG. 12, the vehicle 100 shifted or changed from the first driving mode back to the second driving mode. That is, the PTU 270 is in the second state and the clutch 204 of FIG. 12 transfers torque (e.g., a relatively low amount or degree of torque) between the second axle 222 and the third shaft 818 based on actuation of the first piston 242. Stated differently, actuation or movement of the first piston 242 commands and/or controls the clutch 204 to generate torque and/or otherwise transfer torque between the second shaft 238 and the second axle 222 via the gear system 206. In some examples, the second shaft 238 accelerates or speeds up (i.e., a rate of rotation of the second shaft 238 is increases) to match a speed at which the vehicle 100 is moving. In other words, the second shaft 238 has a rate of rotation that is less than a rate of rotation of the axle(s) 220, 222 during the synchronization phase associated with the drive unit assembly 200.

In particular, as the fluid flow control portion 244 moves away from the first port 216, the first fluid 214 stored in the second cavity 212 rapidly and/or sufficiently flows through the first port 216 from the second cavity 212 to the first cavity 210, which keeps the clutch 204 properly lubricated and/or cool during the synchronization phase. In this manner, a sufficient amount of the first fluid 214 is provided to the third clutch plates 820, 824 to maintain a temperature thereof before the synchronization phase is complete, which enables the third clutch plates 820, 824 to generate an increased (e.g., a maximum) amount of torque without damaging the plates 820, 824 due to high temperature and/or friction.

As shown in FIG. 12, the amount of the first fluid 214 within the first cavity 210 and the second cavity 212 has respectively increased and decreased as a result of the first fluid 214 flowing through the first port 216, which is indicated by the second example fluid level 702 associated with the first cavity 210 and the fourth example fluid level 704 associated with the second cavity 212. As such, the second fluid level 702 associated with the first cavity 210 is greater than the first fluid level 438 associated with the first cavity 210, and the fourth fluid level 704 associated with the second cavity 212 is less than the third fluid level 602 associated with the second cavity 212. In some examples, the second fluid level 702 associated with the first cavity 210 is substantially the same or equal to the fourth fluid level 704 associated with the second cavity 212 during at least a portion of the synchronization phase. In such examples, the second fluid level 702 associated with the first cavity 210 is above a bottommost (in the orientation of FIG. 12) portion of the second housing 219 such that the clutch plates 820, 824 are substantially immersed in the first fluid 214.

Figure 13:
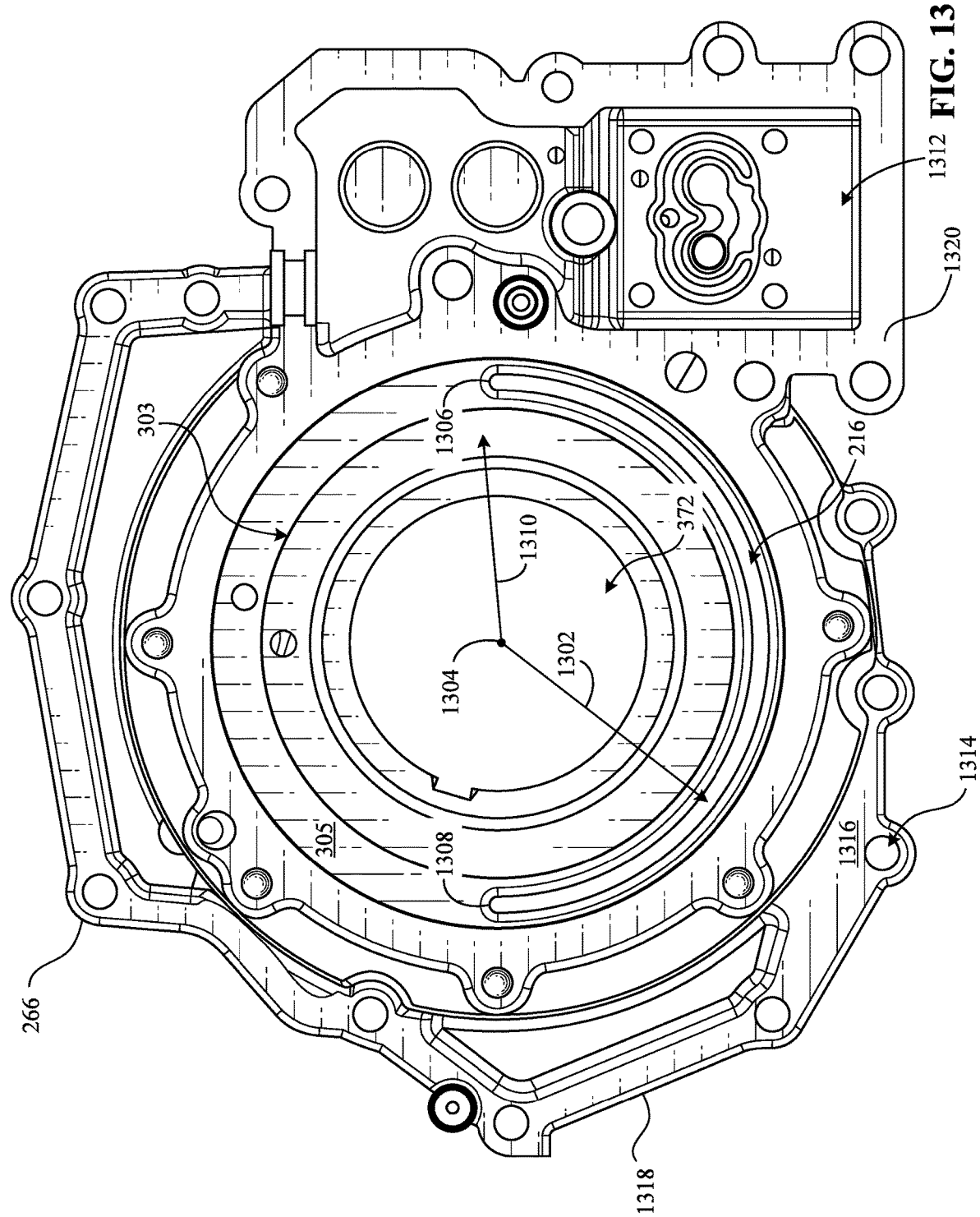
FIG. 13 is a view of an example housing portion in accordance with the teachings of this disclosure.

FIG. 13 is a view of the second housing portion 266 and shows an example configuration thereof. In some examples, the second housing portion 266 is sized, shaped, structured, and/or otherwise configured to implement the first configuration of the drive assembly 200 and/or the second configuration of the drive assembly 200. In particular, the second housing portion 266 includes one or more ports positioned thereon and/or extending therethrough to facilitate control of the first fluid 214 such as, for example, the first port 216. As shown in FIG. 13, the first port 216 is positioned on the wall 305 of the second housing portion 266 at or near a first example radius 1302 associated with the aperture 372. Further, in some examples, the first port 216 extends radially at or near the first radius 1302 relative to a second example axis 1304 associated with the aperture 372 across an example angle (e.g., about 180 degrees) from a third end 1306 of the first port 216 to a fourth end 1308 of the port 216 opposite the third end 1306. As such, the first port 216 may be semi-circular, as shown in FIG. 13.

In some examples, the second housing portion 266 is shaped and/or sized to at least partially form the chamber 304 associated with controlling the first piston 242. For example, the second housing portion 266 of FIG. 13 includes the first recessed area 303 positioned thereon, for example, at or near a second example radius 1310 associated with the aperture 372 that is smaller or less than the first radius 1302. However, in some examples, the first recessed area 303 is positioned on the second housing portion 266 differently. For example, the recessed area 303 may be positioned such that second radius 1310 is larger or greater than the first radius 1302. In any case, in such examples, the chamber 304 is formed when the body 302 of the first piston 242 is aligned to and/or disposed in the first recessed area 303.

Additionally, in some examples, the second housing portion 266 is shaped and/or sized to at least partially form one or more fluid reservoirs such as, for example, one or more of the first cavity 210, the second cavity 212, the first fluid reservoir 232, etc. For example, the second housing portion 266 of FIG. 13 includes a second example recessed area 1312 positioned thereon and/or extending at least partially into the second housing portion 266, which is to store and/or contain at least a portion of the first fluid 214. In some such examples, the first fluid reservoir 232 is formed via the second recessed area 1312 when the first and second housing portions 264, 266 are aligned to and/or positioned on each other.

In some examples, to facilitate coupling and/or securing the housing portions 264, 266, 268 together, the second housing portion 266 includes one or more other apertures 1314 for receiving respective fasteners. In such examples, the second housing portion 266 includes an example flange portion 1316 extending radially outward relative to the second axis 1304, which at least partially defines a peripheral surface 1318 of the second housing portion 266. In particular, the aperture(s) 1314 are positioned on and/or extend through the flange portion 1316. In some examples, the aperture(s) 1314 of FIG. 13 are radially distributed relative to the second axis 1304. Further, the flange portion 1316 is sized and/or shaped to receive the first housing portion 264 and the third housing portion 268. For example, as shown in FIG. 13, the flange portion 1316 has a first side 1320 that is configured to engage and/or otherwise receive the first housing portion 264.

Figure 14:
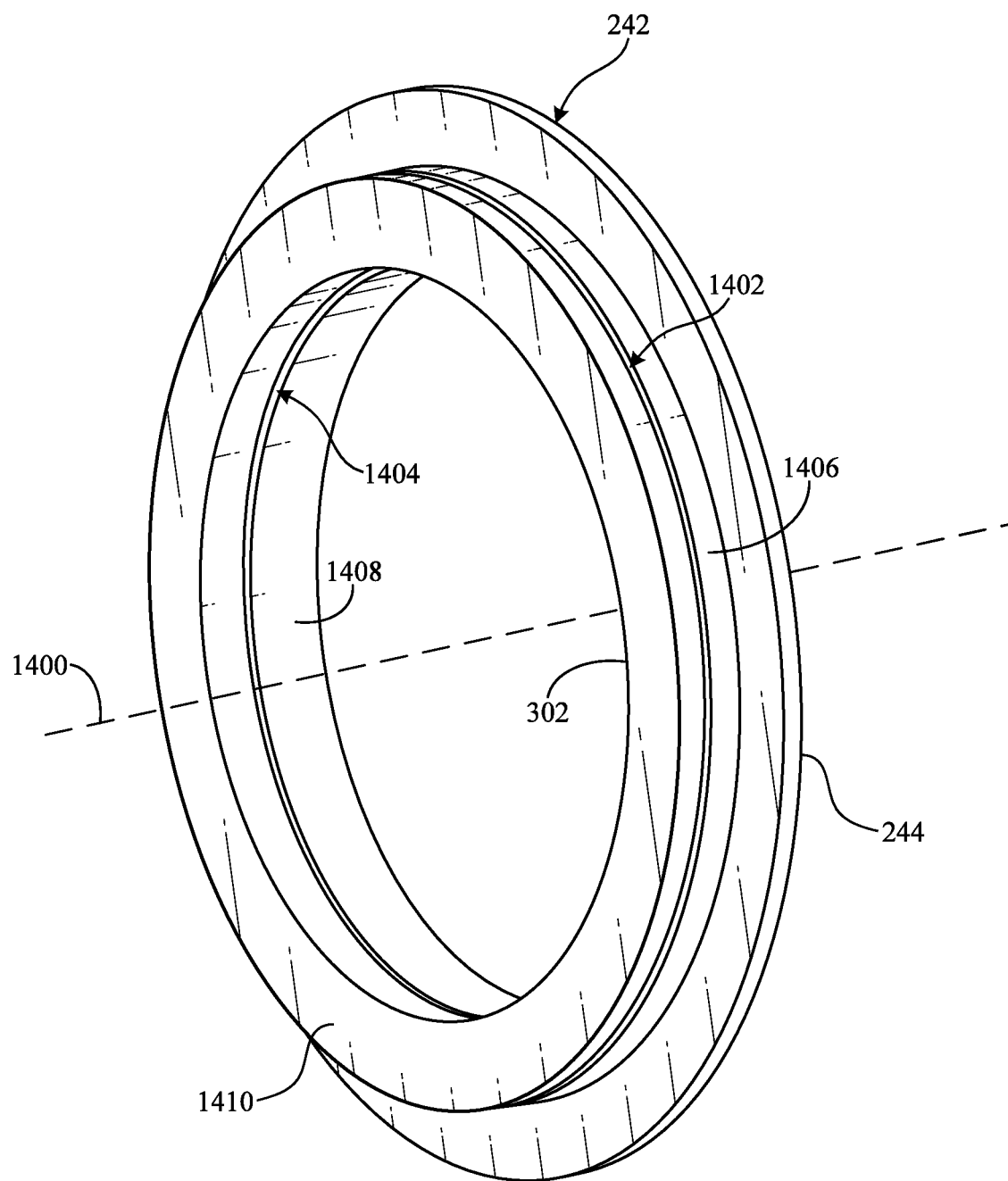
FIG. 14 is a view of an example actuator in accordance with the teachings of this disclosure.

FIG. 14 is view of the first piston 242, which is an example actuator in accordance with the teachings of this disclosure. As shown in FIG. 14, the fluid flow control portion 244 surrounds a third example axis 1400 associated with the first piston 242 and extends away from the body 302 radially outward relative to the third axis 1400. However, in some examples, the fluid flow control portion 244 is sized and/or shaped differently while still maintaining sufficient fluid control associated with the first port 216 (e.g., and/or one or more other ports). For example, the fluid flow control portion 244 may extend away from the body 302 radially inward relative to the third axis 1400. Further, although FIG. 14 depicts a single and/or a continuous fluid flow control portion 244, in some examples, the first piston 242 includes multiple fluid flow control portions positioned on the body 302 and radially distributed relative to the third axis 1400. Accordingly, in some examples where the second housing portion 266 includes multiple ports, each of the fluid flow control portions may be configured to control a flow of the first fluid 214 through a respective one of the ports.

In some examples, to facilitate coupling and/or securing the seal(s) 310, 312, the first piston 242 includes one or more example seal grooves (e.g., one or more annular grooves) 1402, 1404 positioned thereon, two of which are shown in this example (e.g., a first or outer seal groove 1402 and a second or inner seal groove 1404). In some examples, the first seal groove 1402 is positioned on an outer surface (e.g., a circumferential surface) 1406 of the body 302 and the second seal groove 1404 is positioned on an inner surface (e.g., a circumferential surface) 1408 of the body 302. In particular, the seal groove(s) 1402, 1404 of the first piston 242 are sized and/or shaped to receive respective ones of the seal(s) 310, 312.

In some examples, to facilitate operation of the clutch 204, the body 302 of FIG. 14 includes an example abutment surface (e.g., an annular shaped surface) 1410, for example, that is configured to engaged and/or otherwise receive a bearing (e.g., the bearing 326) and/or a plate (e.g., the apply plate 320). In some examples, the body 302 extends along a third example axis 1400 away from the fluid flow control portion 244 to define the abutment surface 1410. In particular, when the first piston moves 242, the abutment surface 1410 is sized and/or shaped to impart sufficient force(s) or load(s) on one or more of the bearing, the plate, and/or, more generally, at least a portion (e.g., one or more of the first clutch plates 224, 323 and/or one or more of the third clutch plates 820, 824) of the clutch 204, thereby commanding and/or generating torque for the clutch 204.

Figure 15:
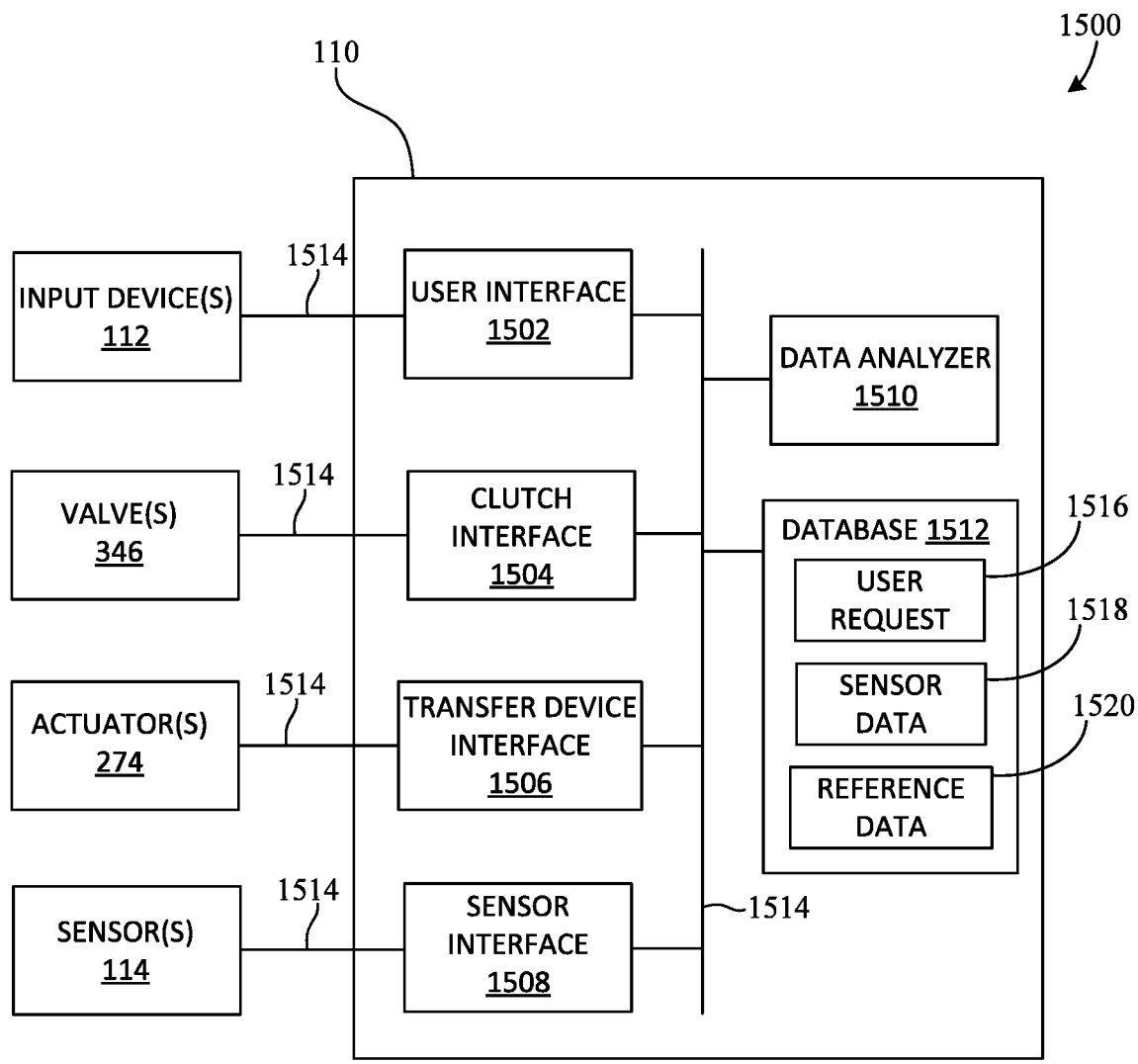
FIG. 15 is a block diagram of an example fluid control system in accordance with the teachings of this disclosure.

FIG. 15 is a block diagram of an example fluid control system 1500 in accordance with the teachings of this disclosure. In some examples, the fluid control system 1500 is implemented by the controller 110 and/or the vehicle 100. According to the illustrated example of FIG. 15, the fluid control system 1500 includes an example user interface 1502, an example clutch interface 1504, an example transfer device interface 1506, an example sensor interface 1508, an example data analyzer 1510, and an example database 1512. The fluid control system 1500 of FIG. 15 is communicatively coupled to one or more (e.g., all) of the input device(s) 112, the valves 346, the actuator(s) 274, and/or the sensor(s) 114 via one or more example communication links 1514 such as, for example, one or more signal or transmission wires, a bus (e.g., a vehicle CAN), radio frequency, etc. In particular, the fluid control system 1500 is configured to direct the valve(s) 346 and/or the actuator(s) 274 to adjust the clutch 204 and the PTU 270 in accordance with one or more example control methods, thereby transitioning the vehicle 100 from the second driving mode to the first driving mode, as discussed further below in connection with FIGS. 16 and 17. As a result of such control, the fluid control system 1500 causes the amount of the first fluid 214 in the first cavity 210 to remain substantially constant or decrease before the vehicle 100 completes the transition to the first driving mode and/or during the transition. In this manner, the fluid control system 1500 improves vehicle fuel economy when the vehicle 100 operates in the first driving mode by reducing and/or eliminating fluid drag that would have otherwise existed due to an excessive amount of the first fluid 214 in the first cavity 210.

The user interface 1502 of FIG. 15 facilitates interactions and/or communications between one or more end users (e.g., one or more of a driver, a passenger, etc.) and the fluid control system 1500. The user interface 1502 includes, for example, a human-machine interface (HMI) and/or a graphical user interface (GUI). In some examples, the user interface 1502 is communicatively coupled, via the link(s) 1514, to the input device(s) 110 to receive example user data therefrom, as shown in FIG. 8. In some such examples, the user interface 1502 generates an example user request 1516 and/or receives the user request 1516 from the input device(s) 112 in response to the user(s) interacting with the input device(s) 112 (e.g., adjusting a shifter to select the first driving mode of the vehicle 100). Such a request 1516 is indicative of a user selection corresponding to a particular driving mode of the vehicle 100. In particular, in such examples, the user request 1516 of FIG. 15 enables one or more of the clutch interface 1504, the transfer device interface 1506, the data analyzer 1510 and/or, more generally, the fluid control system 1500 to determine when and/or how to control the drivetrain system 104.

The clutch interface 1504 of FIG. 15 facilitates interactions between the fluid control system 1500 and one or more vehicle clutches (e.g., the clutch 204) and/or better enables the fluid control system 1500 implement control thereof. In some examples, the clutch interface 1504 is communicatively coupled, via the link(s) 1514, to the valve(s) 346, as shown in FIG. 15. In particular, the clutch interface 1504 is configured to direct the valve(s) 346, thereby changing a parameter (e.g., increasing or decreasing one or more of a flow rate, a fluid pressure, etc.) of the second fluid 306, for example, in the first chamber 304 and/or the second chamber 334.

In some examples, the clutch interface 1504 is configured to change the position of the first one of the valve(s) 346, thereby moving the first piston 242. For example, the clutch interface 1504 generates one or more control signals or commands and/or electrical power for the first one of the valve(s) 346 and/or otherwise provides the control signal(s) or command(s) and/or the electrical power to the first one of the valve(s) 346. Based on and/or in response to receiving the control signal(s) or command(s) and/or the electrical power, the position of the first one of the valve(s) 346 changes, for example, to one of an open position, a closed position, or an intermediate position between the open and closed positions. In this manner, the fluid control system 1500 engages, disengages, and/or otherwise changes the state of the clutch 204.

Additionally or alternatively, in some examples, the controller 110 is configured to change the position of the second one of the valve(s) 346, thereby moving the second piston 334. For example, the clutch interface 1504 generates one or more control signals or commands for the second one of the valve(s) 346 and/or otherwise provides the control signal(s) or command(s) and/or electrical power to the second one of the valve(s) 346. Based on and/or in response to receiving the control signal(s) or command(s) and/or the electrical power, the position of the second one of the valve(s) 346 changes, for example, to one of an open position, a closed position, or an intermediate position between the open and closed positions. In this manner, the fluid control system further engages, disengages, and/or otherwise changes the state of the clutch 204.

The transfer unit interface 1506 of FIG. 15 facilitates interactions between the fluid control system 1500 and a vehicle transfer device (e.g., the PTU 270) and/or better enables the fluid control system 1500 to implement control thereof. In some examples, the transfer unit interface 1506 is communicatively coupled, via the link(s) 1514, to the actuator(s) 274 associated with the PTU 270, as shown in FIG. 15. In particular, the transfer device interface 1506 is configured to direct the actuator(s) 274 to move and/or actuate, thereby changing the state of the PTU 270, for example, from the second state to the first state.

In some examples, the transfer device interface 1506 generates one or more control signals or commands for the PTU actuator(s) 274 and/or otherwise provides the control signal(s) or command(s) and/or electrical power to the actuator(s) 274. Based on and/or in response to receiving the control signal(s) or command(s) and/or the electrical power, the actuator(s) move and/or actuate to change the state of the PTU 270. In some examples, the transfer unit interface 1506 controls the PTU actuator(s) 274 to maintain engagement of the PTU 270 and/or otherwise maintain the state thereof, for example, during a transition of the vehicle 100 from the second driving mode to the first driving mode.

The sensor interface 1508 of FIG. 15 facilitates interactions and/or communications between the fluid control system 1500 and one or more vehicle sensors such as, for example, the sensor(s) 114. In some examples, the sensor interface 1508 is communicatively coupled, via the link(s) 1514, to the sensor(s) 106 to receive (e.g., repeatedly and/or continuously) example sensor data 1518 therefrom, as shown in FIG. 15. That is, in some examples, the sensor(s) 106 generate at least a portion of the sensor data 1518 in the database 1512. In some examples, at least a portion of the sensor data 1518 is indicative of one or more parameters associated with the vehicle 100 and/or the drive unit assembly 200 such as, for example, one or more of a speed of the vehicle 100, a speed of the engine 102, a speed of one of the wheels 106, 108, a speed of the second housing 219, etc. In particular, the sensor(s) 114 and/or the sensor data 1518 enable the data analyzer 1510 to detect such parameter(s) and/or transmit one or more related detections to the data analyzer 1510 for processing.

The database 1512 of FIG. 15 stores (e.g., temporarily and/or permanently) and/or provides access to at least a portion of the data 1516, 1518, 1520. In some examples, the database 1512 is communicatively coupled, via the link(s) 1514, to one or more of the user interface 1502, the clutch interface 1504, the transfer device interface 1506, the sensor interface 1508, and/or the data analyzer 1510. For example, one or more of the user interface 1502, the clutch interface 1504, the transfer device interface 1506, the sensor interface 1508, and/or the data analyzer 1510 transmit and/or otherwise provide (e.g., repeatedly and/or continuously) data to the database 1512. Conversely, in some examples, the database 1512 transmits and/or otherwise provides (e.g., repeatedly or continuously) data to the user interface 1502, the clutch interface 1504, the transfer device interface 1506, the sensor interface 1508, and/or the data analyzer 1510.

To determine when and/or how to control the valve(s) 346 and/or the actuator(s) 274 to control the first fluid 214 as well as transition the vehicle 100 between driving modes (e.g., from the second driving mode to the first driving mode), the data analyzer 1510 particularly processes at least a portion of the data 1516, 1518, 1520 (e.g., stored in the database 1512), as discussed further below in connection with FIGS. 16 and 17. In some examples, the data analyzer 1510 detects one or more conditions associated with the vehicle 100 based on at least some of the data in the database 1512 such as, for example, one or more of a condition of the input device(s) 112, a condition of a driving surface, a condition of the vehicle 100, etc. In particular, if the detected condition(s) indicate that an example driving event of interest associated with the vehicle 100 is occurring or will likely occur, the data analyzer 1510 proceeds to direct the clutch interface 1504 and/or the transfer device interface 1506 to adjust the valve(s) 346 and/or the actuator(s) 274 accordingly. In such examples, a first driving event of interest includes the vehicle 100 transitioning from the second driving mode to the first driving mode. Additionally or alternatively, in some examples, the user request 1516 serves as a trigger for the fluid control system 1500 to execute control functionality thereof.

In some examples, to facilitate determining when and/or how to control the valve(s) 346 and/or the actuator(s) 274 during the transition of the vehicle 100, the data analyzer detects the aforementioned parameter(s) via the sensor(s) 114 and/or sensor data 1518 such as, for example, the speed of the vehicle 100, the speed of the engine 102, the speed of one of the wheels 106, 108, the speed of the second housing 219, etc. In some such examples, the data analyzer 1510 calculates an amount (e.g., one or more of a volume, a mass, etc.) of the first fluid 214 that is in the first cavity 210 and/or has been expelled from the first cavity 210 during the driving event of interest based on the detected parameter(s) and the reference data 1520. The calculated amount of the first fluid 214 corresponds to the fluid level associated with first cavity 210. Then, in such examples, the data analyzer 1510 compares the calculated amount to a first example threshold (e.g., a value corresponding to an amount of fluid). Such a comparison enables the data analyzer 1510 to determine when to direct the clutch interface 1504 and/or the transfer device interface 1506 to cease rotation of the second housing 219 (i.e., cease pumping the first fluid 214 out of the first cavity 210) and/or complete the transition of the vehicle 100 via the respective valve(s) 346 and/or the actuator(s) 274. Further, in some examples, the data analyzer 1510 calculates a time interval during which to keep the clutch 204 in the third state thereof and/or the PTU 270 in the second state thereof based on the detected parameter(s) and the reference data 1520. Further still, in some examples, the data analyzer 1510 calculates a time at which to disengage and/or otherwise change the state of the clutch 204 or PTU 270 based on the detected parameter(s) and the reference data 1520.

In some examples, at least a portion of the reference data 1520 is predetermined and/or preprogrammed into the database 1512. For example, the reference data 1520 includes any of one or more equations, one or more models, one or more empirical relationships, one or more data maps, one or more tables, one or more plots, etc. that correlate the detected parameter(s) and one or more of: (1) an amount of the first fluid 214 that was evacuated from the first cavity 210 resulting from rotation of the second housing 219 during a time interval; (2) a rate which the first fluid 214 is flowing out of the first cavity 210 resulting from rotation of the second housing 219; (3) a time at which to complete the transition of the vehicle 100 from the second driving mode to the first driving mode; (4) a time interval associated with completing the transition of the vehicle 100 from the second driving mode to the first driving mode; and/or (5) any other appropriate value. In particular, a flow rate at which the second housing 219 expels the first fluid 214 from the first cavity 210 is substantially based on an angular speed of the second housing 219 relative to the first axis 316. In some examples, the flow rate correlates to, for example, the vehicle speed and/or the wheel speed. Accordingly, as the speed of the vehicle 100 and/or the speed of the wheel(s) 106, 108 increase, the flow rate increases. Conversely, as the speed of the vehicle 100 and/or the speed of the wheel(s) 106, 108 decrease, the flow rate decreases.

As such, in some examples, when the data analyzer 1510 detects that the speed of the vehicle is relatively high and/or the second housing 219 is rotating at a relatively high rate, the data analyzer 1510 uses the reference data 1520 accordingly to determine to wait for a first time interval during which the second housing 219 is to sufficiently evacuate the first fluid 214 from the first cavity 210. On the other hand, in some examples, when the data analyzer 1510 detects that the speed of the vehicle is relatively low that the second housing 219 is rotating at a relatively low rate, the data analyzer 1510 uses the reference data 1520 accordingly to determine to wait for a second time interval, longer than the first time interval, during which the second housing 219 is to sufficiently evacuate the first fluid 214 from the first cavity 210. In such examples, as a result of waiting for the first or second time interval, the fluid control system 1500 ensures a sufficient amount of the first fluid 214 has been expelled from the first cavity 210 during the during the driving event of interest.

Additionally, in some examples, the reference data 1520 includes one or more example thresholds (e.g., the first threshold) such as, for example, one or more values corresponding to an amount of fluid, a time, a time interval, etc. For example, the first threshold hold corresponds to a first predetermined or target amount of the first fluid 214, which is associated with reducing and/or eliminating fluid drag for the clutch 204 when the vehicle 100 is operating in the first driving mode. The first target amount includes an amount of the first fluid 214 that needs to (a) be expelled from the first cavity 214 during a transition of the vehicle 100 from the second driving mode to the first driving mode or (b) remain in the first cavity 210 when the vehicle 100 completes transitioning to the first driving mode. Additionally, in some examples the reference data 1520 include one or more timestamps, for example, generated by the fluid control system 1500 and corresponding to a change of the state of the clutch 204 and/or a change of the state of the PTU 270.

In some examples, the data analyzer 1510 calculates one or more time intervals based on the timestamps. For example, based on a timestamp corresponding to movement of the first piston 242 and a current or latest timestamp, the data analyzer 1510 calculates a time interval during which the clutch 204 was in the first or third state. In such examples, the parameter(s) and/or the reference data 1520 includes such time interval(s).

As such, the reference data 1520 of FIG. 15 facilitate(s) comparison(s) and/or determinations made by the data analyzer 1510. In some examples, the data analyzer 1510 compares the detected parameter(s) to the reference data 1520, thereby determining when to change the state of the clutch 204 or the PTU 270 to complete the transition of the vehicle 100 from the second driving mode to the first driving mode.

Although an example fluid control system 1500 is illustrated in FIG. 15, one or more of the elements, processes, and/or devices depicted in FIG. 15 may be combined, divided, re-arranged, omitted, eliminated, and/or implemented in any other way. Further, the example fluid control system 1500 of FIG. 15 may include one or more elements, processes, and/or devices in addition or alternatively to those illustrated in FIG. 15, and/or may include more than one of any or all of the illustrated elements, processes, and devices.

Additionally, one or more of the example controller 110, the example user interface 1502, the example clutch interface 1504, the example transfer device interface 1506, the example sensor interface 1508, the example data analyzer 1510, the example database 1512, and/or, more generally, the example fluid control system 1500 of FIG. 15 may be implemented by hardware, software, firmware and/or any combination of thereof. For example, one or more (e.g., all) of the example controller 110, the example user interface 1502, the example clutch interface 1504, the example transfer device interface 1506, the example sensor interface 1508, the example data analyzer 1510, the example database 1512, and/or, more generally, the example fluid control system 1500 could be implemented by one or more circuits (e.g., an analog or digital circuit, a logic circuit, a programmable processor, etc.). Further, in some examples, at least one of the example controller 110, the example user interface 1502, the example clutch interface 1504, the example Transfer device interface 1506, the example sensor interface 1508, the example data analyzer 1510, the example database 1512, and/or the example fluid control system 1500 include(s) a tangible machine-readable storage device or storage disk (e.g., a memory storing the software and/or firmware).

Figure 16:
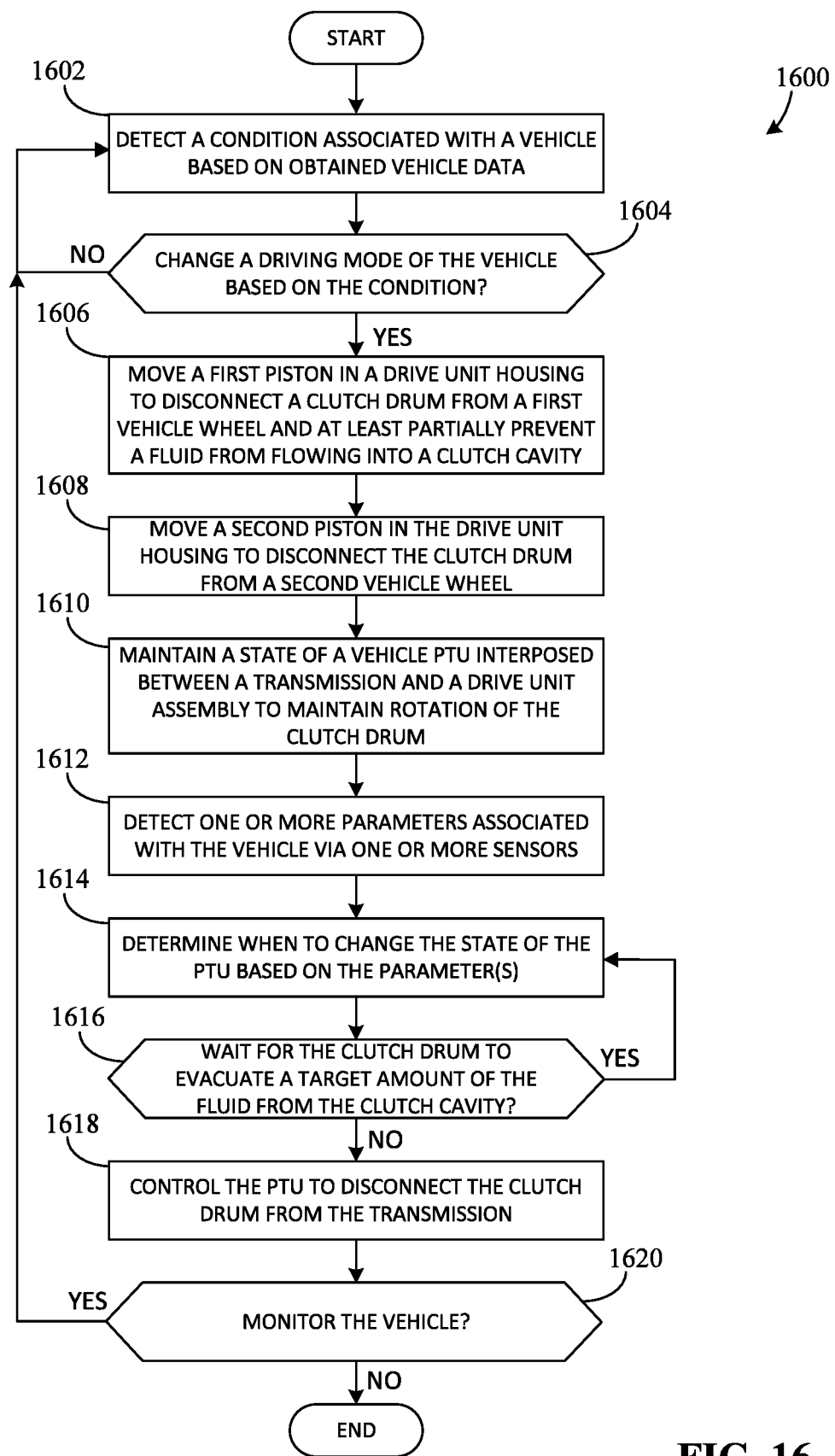
FIGS. 16 and 17 are flowcharts representative of example methods that may be executed to implement the example fluid control system of FIG. 15 to reduce fluid drag associated with a vehicle clutch.
Figure 17:
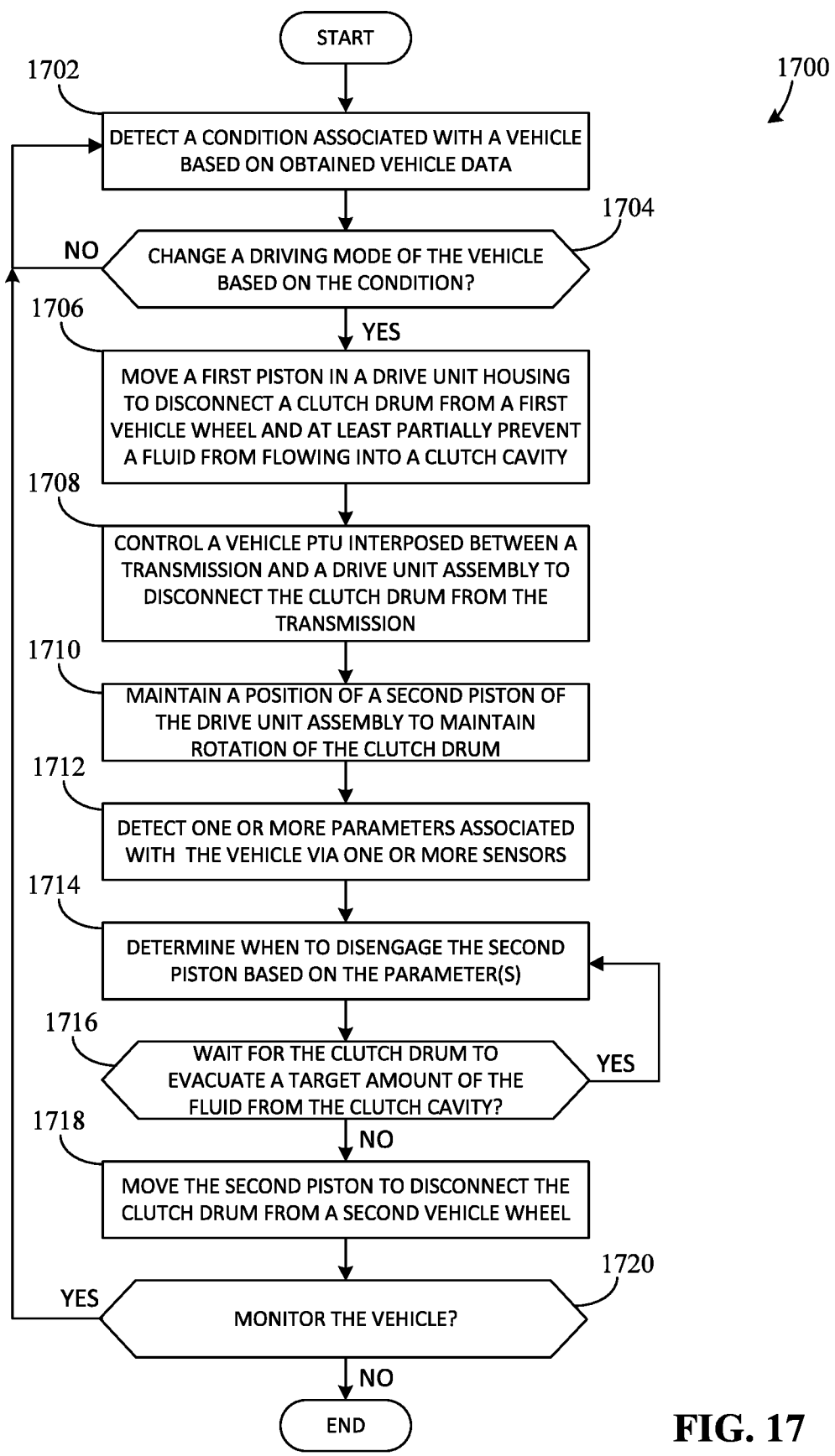

Flowcharts representative of example hardware logic or machine-readable instructions for implementing the example fluid control system 1500 of FIG. 15 are shown in FIGS. 16 and 17. The machine-readable instructions may be a program or portion of a program for execution by a processor such as the processor 1802 shown in the example processor platform 1800, which is discussed in greater detail below in connection with FIG. 18. The program may be embodied in software stored on a tangible machine-readable storage medium such as a CD-ROM, a floppy disk, a hard drive, or a memory associated with the processor 1802, but the entire program and/or parts thereof could be alternatively executed by a different device and/or embodied in firmware or dedicated hardware. Further, although the example program is described with reference to the flowcharts illustrated in FIGS. 16 and 17, many other methods of implementing the example fluid control system 1500 may alternatively be used. For example, the order of execution of the blocks may be changed, and/or some of the blocks described may be changed, eliminated, or combined. Additionally or alternatively, any or all of the block may be implemented by one or more hardware circuits (e.g., discrete and/or integrated analog and/or digital circuitry, logic circuit, a comparator, etc.)

The example processes of FIGS. 16 and 17 may be implemented using executable or coded instructions (e.g. computer or machine readable instructions) stored on a tangible machine-readable storage medium such as a hard disk drive, a compact disk (CD), a flash memory, and/or other storage device or disk in which information is stored for any duration of time. As used herein, the term tangible machine-readable storage medium is expressly defined to include any type of computer or machine-readable storage device or disk and to exclude propagating signals and all transmission media. Additionally or alternatively, the example methods of FIGS. 16 and 17 may be implemented using coded instructions stored on a non-transitory machine-readable medium in which information is stored for any duration, which includes any type of computer or machine readable storage device or disk and excludes propagating signals and transmission media.

When used in connection with multiple elements, the term "and/or" refers to any combination or subset of the elements. For example, the form A, B, and/or C refers to any of: (1) A alone; (2) B alone; (3) C alone; (4) A and B; (5) A and C; (6) B and C; and (7) A, B, and C.

FIG. 16 is a flowchart representative of an example method 1600 that can be executed to implement the fluid control system 1500 of FIG. 15 to reduce fluid drag associated with a vehicle clutch (e.g., the clutch 204). The example method 1600 of FIG. 16 can be implemented in any of the vehicle 100, the controller 110, and/or the fluid control system 1500.

The method 1600 of FIG. 16 begins by detecting a condition associated with a vehicle based on obtained vehicle data (block 1602). In some examples, the fluid control system 1500 of FIG. 15 detects (e.g., via the data analyzer 1510) a condition associated with the vehicle 100 based on at least a portion of the data 1516, 1518 such as, for example, one or more of an input device condition, a road condition, and/or a driving condition indicative of the first driving event of interest. For example, the fluid control system 1500 detects a user selection corresponding to a particular driving mode (e.g., the first driving mode) of vehicle 100 based on the user request 1516. In some such examples, the fluid control system 1500 receives (e.g., via the user interface 1502) the user request 1516 from the input device(s) 112 (e.g., at or before block 1602) in response to the user(s) interacting with the input device(s) 112. Additionally, in some examples, the fluid control system 1500 detects a driving mode in which the vehicle 100 is set.

The method 1600 of FIG. 16 also includes determining whether to change a driving mode of the vehicle based on the condition (block 1604). In some examples, the fluid control system 1500 of FIG. 15 determines (e.g., via the data analyzer 1510) whether to change the driving mode of the vehicle 100 (e.g., from the second driving mode to the first driving mode) based on the detected condition in connection with block 1602. In such examples, if the fluid control system 1500 provides a positive determination (e.g., (a) the user request 1516 corresponds to the first driving mode and (b) the vehicle 100 is in the second driving mode) (block 1604: YES), control of the example method 1600 proceeds to block 1606. However, in some examples, if the fluid control system 1500 provides a negative determination (e.g., the vehicle 100 is in the first driving mode) (block 1604: NO), control of the example method 1600 returns to block 1602.

The method 1600 of FIG. 16 also includes moving a first piston in a drive unit housing to disconnect a clutch drum from a first vehicle wheel and at least partially prevent a fluid from flowing into a clutch cavity (block 1606). In some examples, the fluid control system 1500 of FIG. 15 moves (e.g., via the user interface 1502) the first piston 242 to disconnect the second housing 219 from the first one of the wheel(s) 106, 108 and at least partially prevent the first fluid 214 from flowing into the first cavity 210. For example, the fluid control system 1500 directs the first one of the valve(s) 346 to change position (e.g., close), thereby decreasing the fluid pressure and/or the flow rate within the first chamber 304 and, thus, causing the first piston 242 to move toward the first port 216 and/or away from the first clutch pack 224, 323 to or near the first position of the first piston 242. In this manner, the fluid control system 1500 disengages (e.g., partially or fully disengages) the clutch 204 via the first piston 242 (i.e., by moving the first piston 242 away from the first clutch pack 224, 323 to disconnect the second housing 219 from the first one of the wheel(s) 106, 108). In particular, in such examples, such movement and/or actuation of the first piston 242 at least partially prevents the first fluid 214 from flowing through the port 216 and/or otherwise reduces the flow of the first fluid 214 into the first cavity 210. In examples where the clutch 204 is a dual clutch, the fluid control system 1500 partially disengages the clutch 204 and/or otherwise provides the third state of the clutch 204 in this manner. However, in examples where the clutch 204 is a single clutch, the fluid control system 1500 fully disengages the clutch 204 and/or otherwise provides the first state of the clutch 204 in this manner.

In some examples at block 1606, the fluid control system 1500 generates and/or obtains a first example timestamp corresponding to when the first piston 242 moved, which facilitates subsequent fluid calculations performed by the fluid control system 1500. For example, after block 1606, the fluid control system 1500 calculates (e.g., repeatedly), based on the first timestamp and a latest or current timestamp, a third time interval during which the first piston 242 was in or near the first position thereof. In particular, the amount of the first fluid 214 in the first cavity 210 decreases during such a time interval resulting from continued rotation of the second housing 219.

The method 1600 of FIG. 16 also includes moving a second piston in the drive unit housing to disconnect the clutch drum from a second vehicle wheel (block 1608). In some examples, the fluid control system 1500 of FIG. 15 moves (e.g., via the user interface 1502) the second piston 330 to disconnect the second housing 219 from the second one of the wheel(s) 106, 108. For example, the fluid control system 1500 directs the second one of the valve(s) 346 to change position (e.g. close), thereby decreasing the fluid pressure and/or the flow rate within the second chamber 334 and, thus, causing the second piston 330 to move away from the second clutch pack 228, 338 to or near the second position of the second piston 330. In this manner, the fluid control system 1500 disengages (e.g., fully disengages) the clutch 204 via the second piston 330 (i.e., by also moving the second piston 330 away from the second clutch pack 228, 338 to disconnect the second housing 219 from the second one of the wheel(s) 106, 108 along with the related movement of first piston 242). Thus, in some examples, the fluid control system 1500 moves (e.g., simultaneously) the first piston 242 and the second piston 330 before the PTU 270 changes state (e.g., disengages). In examples where the clutch 204 is a dual clutch, the fluid control system 1500 further disengages (i.e., fully disengages) the clutch 204 and/or otherwise provides the first state of the clutch 204 in this manner.

The method 1600 of FIG. 16 also includes maintaining a state of a vehicle PTU interposed between a transmission and a drive unit assembly to maintain rotation of the clutch drum (block 1610). In some examples, the fluid control system 1500 of FIG. 15 maintains (e.g., via the transfer device interface 1506) the state of the PTU 270 to maintain rotation of the second housing 219, for example, such that the transmission 272 remains connected to at least a front one and at least a rear one of the wheels 106, 108. In such examples, the fluid control system 1500 controls, via the actuator(s) 274, the PTU 270 to remain in the second state after the operation of block 1608. Due to engine torque imparted on the second housing 219 resulting from the PTU 270 being in the second state, the second housing 219 continues to rotate when the clutch 204 is disengaged and/or in the first state thereof. In this manner, the fluid control system 1500 maintains engagement of the PTU 270 such that the second housing 219 continues to rotate (e.g., for a time interval during which the clutch 204 is disengaged), which allows the second housing 219 to sufficiently evacuate the first fluid 214 from the first cavity 210 during such a transition between vehicle driving modes. In particular, the drive unit assembly 200 is configured such that a flow rate of the first fluid 214 out of the first cavity 210 is greater than a flow rate of the first fluid 214 into the first cavity 210, which allows the amount of the first fluid 214 in the first cavity 210 to decrease during the operations of blocks 1610, 1612, 1614, and 1616.

The method 1600 of FIG. 16 also includes detecting one or more parameters associated with a vehicle via one or more sensors (block 1612). In some examples, the fluid control system 1500 of FIG. 15 detects (e.g., via the sensor interface 1508 and/or the data analyzer 1510) one or more example parameters associated with the vehicle 100 via the sensor(s) 114 such as, for example, one or more of the speed of the vehicle 100, a speed of the wheel(s) 106, 108, and/or the speed of the second housing 219. In some examples, the parameter(s) and/or the reference data 1520 include the third time interval.

The method 1600 of FIG. 16 also includes determining when to change the state of the PTU based on the parameter(s) (block 1614). In some examples, the fluid control system 1500 of FIG. 15 determines (e.g., via the data analyzer 1510) when to change the state of the PTU based on the parameter(s), for example, by using the reference data 1520. For example, the fluid control system 1500 compares the detected parameter(s) in connection with block 1612 to the reference data 1520. Based on the comparison, the fluid control system 1500 determines whether to wait or change the state of the PTU 270. As previously mentioned, such a comparison indicates to the fluid control system 1500 whether a sufficient amount of the first fluid 214 (e.g., the first target amount) has been evacuated from the first cavity 210 via rotation of the second housing 219.

In some examples at block 1614, the fluid control system 1500 uses the detected parameter(s) and the reference data 1520 to calculate a first amount (e.g., one or more of a volume, a mass, etc.) of the first fluid 214, for example, that has been expelled from the first cavity 210 after the first timestamp. Then, the fluid control system 1500 compares the first calculated amount to the first threshold or the first target amount.

The method 1600 of FIG. 16 also includes determining whether to wait for the clutch drum to evacuate a target amount of the fluid from the clutch cavity (block 1616). In some examples, the fluid control system 1500 of FIG. 15 determines (e.g., via the data analyzer 1510) whether to wait for the second housing 219 to evacuate the first target amount of the first fluid 214 from the first cavity 210 based on the determination in connection with block 1614. In such examples, if the fluid control system 1500 provides a positive determination (e.g., the first calculated amount of the first fluid 214 in connection with block 1614 is below the first threshold) (block 1616: YES), control of the method 1600 returns to block 1614. In this manner, the fluid controls system 1500 ensures that the engagement of the PTU 270 is maintained for the time interval during which the clutch 204 is disengaged, which also ensures that the first target amount of the first fluid 214 is evacuated and/or otherwise expelled from the first cavity 210 before the second housing 219 disconnects from the transmission. However, if the fluid control system provides a negative determination (e.g., the first calculated amount of the first fluid 214 in connection with block 1614 is at or above the first threshold) (block 1616: NO), control of the method 1600 proceeds to block 1618.

The method 1600 of FIG. 16 also includes controlling the PTU to disconnect the clutch drum from the transmission (block 1618). In some examples, the fluid control system 1500 of FIG. 15 controls (e.g., via the transfer device interface 1506) the PTU 270 to disconnect the second housing 219 from the transmission 272 in response to the determination in connection with block 1616. For example, the fluid control system 1500 directs the actuator(s) 274 to move and/or actuate, thereby disengaging the PTU 270 and/or otherwise changing the PTU 270 from the second state (e.g., a connected state) to the first state (e.g., a disconnected state). In other words, the fluid control system 1500 disengages the PTU 270 to disconnect the second housing 219 from the transmission 272 after the second housing 219 expels the first target amount of the first fluid 214 from the first cavity 210. In particular, in such examples, the second housing 219 begins to decelerate and/or ceases rotating resulting from the PTU 270 operating in the first state and the clutch 204 operating in the first state. In this manner, the fluid control system 1500 completes the transition of the vehicle 100 from the second driving mode to the first driving mode while reducing and/or eliminating fluid drag associated with the first fluid 214 that would have otherwise been experienced by the clutch 204 during subsequent vehicle operation.

The method 1600 of FIG. 16 also includes determining whether to monitor the vehicle (block 1620). In some examples, the fluid control system 1500 of FIG. 15 determines (e.g., via the data analyzer 1510) whether to monitor the vehicle 100. In some examples, if the fluid control system 1500 provides a positive determination (e.g., the vehicle 100 is in operation) (block 1620: YES), control of the method 1600 returns to block 1602. However, if the fluid control system 1500 provides a negative determination (e.g., the vehicle 100 is not in operation) (block 1620: NO), the process ends.

Although the example method 1600 is described in connection with the flowchart of FIG. 16, one or more other methods of implementing the example fluid control system 1500 may alternatively be used. For example, the order of execution of the blocks 1602, 1604, 1606, 1608, 1610, 1612, 1614, 1616, 1618, 1620 may be changed, and/or at least some operations of the blocks 1602, 1604, 1606, 1608, 1610, 1612, 1614, 1616, 1618, 1620 described may be changed, eliminated, or combined FIG. 17 is a flowchart representative of an example method 1700 that can be executed to implement the fluid control system 1500 of FIG. 15 to reduce fluid drag associated with a vehicle clutch (e.g., the clutch 204). The example method 1700 of FIG. 17 can be implemented in any of the vehicle 100, the controller 110, and/or the fluid control system 1500.

The method 1700 of FIG. 17 begins by detecting a condition associated with a vehicle based on obtained vehicle data (block 1702). In some examples, the fluid control system 1500 of FIG. 15 detects (e.g., via the data analyzer 1510) a condition associated with the vehicle 100 based on at least a portion of the data 1516, 1518 such as, for example, one or more of an input device condition, a road condition, and/or a driving condition indicative of the first driving event of interest. For example, the fluid control system 1500 detects a user selection corresponding to a particular driving mode (e.g., the first driving mode) of vehicle 100 based on the user request 1516. In some such examples, the fluid control system 1500 receives (e.g., via the user interface 1502) the user request 1516 from the input device(s) 112 (e.g., at or before block 1702) in response to the user(s) interacting with the input device(s) 112. Additionally, in some examples, the fluid control system 1500 detects a driving mode in which the vehicle 100 is set.

The method 1700 of FIG. 17 also includes determining whether to change a driving mode of the vehicle based on the condition (block 1704). In some examples, the fluid control system 1500 of FIG. 15 determines (e.g., via the data analyzer 1510) whether to change the driving mode of the vehicle 100 (e.g., from the second driving mode to the first driving mode) based on the detected condition in connection with block 1702. In such examples, if the fluid control system 1500 provides a positive determination (e.g., (a) the user request 1516 corresponds to the first driving mode and (b) the vehicle 100 is in the second driving mode) (block 1704: YES), control of the example method 1700 proceeds to block 1706. However, in some examples, if the fluid control system 1500 provides a negative determination (e.g., the vehicle 100 is in the first driving mode) (block 1704: NO), control of the example method 1700 returns to block 1702.

The method 1700 of FIG. 17 also includes moving a first piston in a drive unit housing to disconnect a clutch drum from a first vehicle wheel and at least partially prevent a fluid from flowing into a clutch cavity (block 1706). In some examples, the fluid control system 1500 of FIG. 15 moves (e.g., via the user interface 1502) the first piston 242 to disconnect the second housing 219 from the first one of the wheel(s) 106, 108 and at least partially prevent the first fluid 214 from flowing into the first cavity 210. For example, the fluid control system 1500 directs the first one of the valve(s) 346 to change position (e.g., close), thereby decreasing the fluid pressure and/or the flow rate within the first chamber 304 and, thus, causing the first piston 242 to move toward the first port 216 and/or away from the first clutch pack 224, 323 to or near the first position of the first piston 242. In this manner, the fluid control system 1500 disengages (e.g., partially disengages) the clutch 204 via the first piston 242 (i.e., by moving the first piston 242 away from the first clutch pack 224, 323 to disconnect the second housing 219 from the first one of the wheel(s) 106, 108) such that the second housing 219 maintains a connection to the second one of the wheel(s) 106, 108 (e.g., for a time interval during which the PTU 270 is disengaged), as discussed further below in connection with block 1710. In particular, in such examples, such movement and/or actuation of the first piston 242 at least partially prevents the first fluid 214 from flowing through the port 216 and/or otherwise reduces the flow of the first fluid 214 into the first cavity 210, as previously mentioned. In examples where the clutch 204 is a dual clutch, the fluid control system 1500 partially disengages the clutch 204 and/or otherwise provides the third state of the clutch 204 in this manner.

In some examples at block 1706, the fluid control system 1500 generates and/or obtains a second example timestamp corresponding to when the first piston 242 moved, which facilitates subsequent fluid calculations performed by the fluid control system 1500. For example, after block 1706, the fluid control system 1500 calculates (e.g., repeatedly), based on the second timestamp and a latest or current timestamp, a fourth time interval during which the first piston 242 was in or near the first position thereof.

The method 1700 of FIG. 17 also includes controlling a PTU interposed between a transmission and a drive unit assembly to disconnect the clutch drum from the transmission (block 1708). In some examples, the fluid control system 1500 of FIG. 15 controls (e.g., via the transfer device interface 1506) the PTU 270 to disconnect the second housing 219 from the transmission 272. For example, the fluid control system 1500 directs the actuator(s) 274 to move and/or actuate, thereby disengaging the PTU 270 and/or otherwise changing the PTU 270 from the second state (e.g., a connected state) to the first state (e.g., a disconnected state). In other words, the fluid control system 1500 disengages the PTU 270 to disconnect the second housing 219 from the transmission 272.

The method 1700 of FIG. 17 also includes maintaining a position of a second piston of the drive unit assembly to maintain rotation of the clutch drum (block 1710). In some examples, the fluid control system 1500 of FIG. 15 maintains (e.g., via the clutch interface 1504) the position of the second piston 330 to maintain rotation of the second housing 219, for example, such that the second housing 219 remains connected to the second one of the wheels 106, 108. In such examples, the fluid control system 1500 directs the second one of the valve(s) 346 to remain at least partially open to urge the second piston 330 into engagement with the second clutch pack 228, 238 after the operation of block 1708. As a result of the second one of the wheel(s) 106, 108 providing a torque to the second housing 219 due to the clutch 204 being in the third state, the second housing 219 continues to rotate when the PTU 270 is disengaged and/or in the first state thereof. In this manner, the fluid control system 1500 allows the second housing 219 to sufficiently evacuate the first fluid 214 from the first cavity 210 during such a transition between vehicle driving modes. In particular, the drive unit assembly 200 is configured such that a flow rate of the first fluid 214 out of the first cavity 210 is greater than a flow rate of the first fluid 214 into the cavity, which allows the amount of the first fluid 214 in the first cavity 210 to decrease during the operations of blocks 1710, 1712, 1714, and 1716.

The method 1700 of FIG. 17 also includes detecting one or more parameters associated with a vehicle via one or more sensors (block 1712). In some examples, the fluid control system 1500 of FIG. 15 detects (e.g., via the sensor interface 1508 and/or the data analyzer 1510) one or more example parameters associated with the vehicle 100 via the sensor(s) 114 such as, for example, one or more of the speed of the vehicle 100 and/or the speed of the second housing 219. In some examples, the parameter(s) and/or the reference data 1520 include the fourth time interval.

The method 1700 of FIG. 17 also includes determining when to disengage the second piston based on the parameter(s) (block 1714). In some examples, the fluid control system 1500 of FIG. 15 determines (e.g., via the data analyzer 1510) when to disengage the second piston 330 based on the parameter(s), for example, by using the reference data 1520. For example, the fluid control system 1500 compares the detected parameter(s) in connection with block 1712 to the reference data 1520. In such examples, based on the comparison, the fluid control system 1500 determines whether to wait or proceed to further disengage the second piston 242. As previously mentioned, such a comparison indicates to the fluid control system 1500 whether a sufficient amount of the first fluid 214 (e.g., the first target amount) has been evacuated and/or otherwise expelled from the first cavity 210 via rotation of the second housing 219.

In some examples at block 1714, the fluid control system 1500 uses the detected parameter(s) and the reference data 1520 to calculate a second amount (e.g., one or more of a volume, a mass, etc.) of the first fluid 214, for example, that has been expelled from the first cavity 210 after the second timestamp. Then, the fluid control system 1500 compares the second calculated amount to the first threshold.

The method 1700 of FIG. 17 also includes determining whether to wait for the clutch drum to evacuate a target amount of the fluid from the clutch cavity (block 1716). In some examples, the fluid control system 1500 of FIG. 15 determines (e.g., via the data analyzer 1510) whether to wait for the second housing 219 to evacuate the first target amount of the first fluid 214 from the first cavity 210 based on the determination in connection with block 1714. In such examples, if the fluid control system 1500 provides a positive determination (e.g., the second calculated amount of the first fluid 214 in connection with block 1714 is below the first threshold) (block 1716: YES), control of the method 1700 returns to block 1714. In this manner, the fluid controls system 1500 ensures that the engagement of the second piston 330 is maintained for the time interval during which the PTU 270 is disengaged, which ensures that the first target amount of the first fluid 214 is evacuated and/or otherwise expelled from the first cavity 210 before the second housing 219 disconnects from the second one of the vehicle wheel(s) 106, 108. However, if the fluid control system 1500 provides a negative determination (e.g., the second calculated amount of the first fluid 214 in connection with block 1714 is at or above the first threshold) (block 1716: NO), control of the method 1700 proceeds to block 1718.

The method 1700 of FIG. 17 also includes moving the second piston to disconnect the clutch drum from a second vehicle wheel (block 1718). In some examples, the fluid control system 1500 of FIG. 15 moves (e.g., via the user interface 1502) the second piston 330 to disconnect the second housing 219 from the second one of the wheel(s) 106, 108 in response to the determination in connection with block 1716. For example, the fluid control system 1500 directs the second one of the valve(s) 346 to change position (e.g. close), thereby decreasing the fluid pressure and/or the flow rate within the second chamber 334 and, thus, causing the second piston 330 to move away from the second clutch pack 228, 338 to or near the first position of the second piston 330. In this manner, the fluid control system 1500 further disengages (e.g., fully disengages) the clutch 204 via the second piston 330 (i.e., by also moving the second piston 330 away from the second clutch pack 228, 338 to disconnect the second housing 219 from the second one of the wheel(s) 106, 108 along with the related movement of first piston 242) after the second housing 219 expels the first target amount of the first fluid 214 from the first cavity 210. In examples where the clutch 204 is a dual clutch, the fluid control system 1500 further disengages (i.e., fully disengages) the clutch 204 and/or otherwise provides the first state of the clutch 204 in this manner.

As a result, in some such examples, the second housing 219 begins to decelerate and/or ceases rotating when the second piston 330 is in or near the first position and the PTU 270 is in the first state. In this manner, the fluid control system 1500 completes the transition of the vehicle 100 from the second driving mode to the first driving mode while reducing and/or eliminating fluid drag associated with the first fluid 214 that would have otherwise been experienced by the clutch 204 during subsequent vehicle operation.

The method 1700 of FIG. 17 also includes determining whether to monitor the vehicle (block 1720). In some examples, the fluid control system 1500 of FIG. 15 determines (e.g., via the data analyzer 1510) whether to monitor the vehicle 100. In some examples, if the fluid control system 1500 provides a positive determination (e.g., the vehicle 100 is in operation) (block 1720: YES), control of the method 1700 returns to block 1702. However, if the fluid control system 1500 provides a negative determination (e.g., the vehicle 100 is not in operation) (block 1720: NO), the process ends.

Although the example method 1700 is described in connection with the flowchart of FIG. 17, one or more other methods of implementing the example fluid control system 1500 may alternatively be used. For example, the order of execution of the blocks 1702, 1704, 1706, 1708, 1710, 1712, 1714, 1716, 1718, 1720 may be changed, and/or at least some operations of the blocks 1702, 1704, 1706, 1708, 1710, 1712, 1714, 1716, 1718, 1720 described may be changed, eliminated, or combined.

Figure 18:
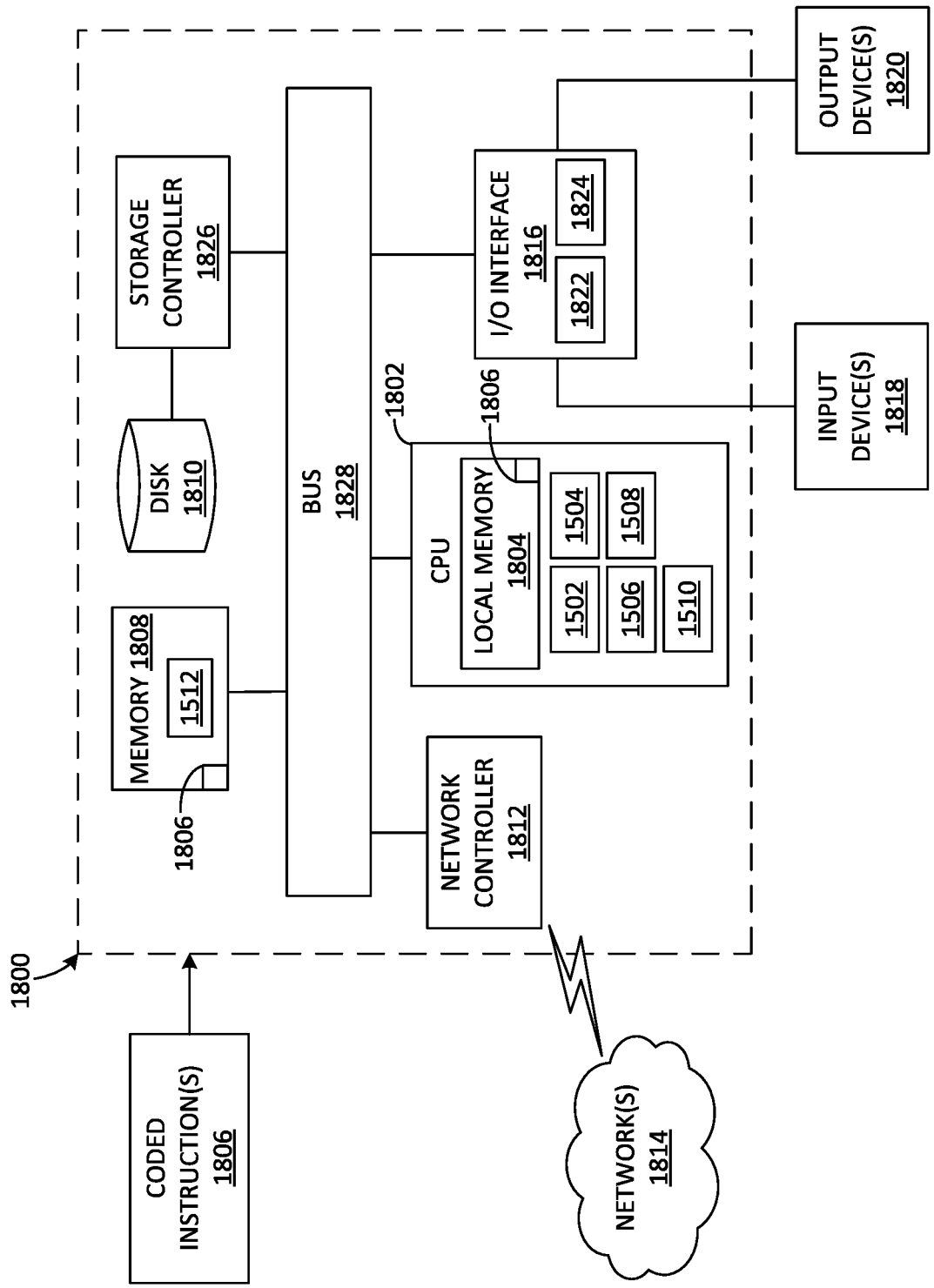
FIG. 18 is a block diagram of an example processor platform structured to execute instructions to carry out the example methods of FIGS. 16 and 17 and/or, more generally, to implement the example fluid control system of FIG. 15.

FIG. 18 is a block diagram of an example processor platform 1800 structured to execute instructions to carry out the methods of FIGS. 16 and 17 and/or, more generally, to implement the fluid control system 1500 of FIG. 15. For example, the processor platform 1800 can be a personal computer, a server, a mobile device (e.g., a cell phone, a smart phone, a tablet, etc.) or any other type of computing device. According to the illustrated example of FIG. 18, the processor platform 1800 includes a central processing unit (CPU) 1802 (sometimes referred to as a processor), which is hardware (e.g., one or more integrated circuits, logic circuits, microprocessors, etc.). The CPU 1802 of FIG. 18 includes a local memory 1804 such as, for example, a cache. According to the illustrated example of FIG. 18, the CPU 1802 implements the example user interface 1502, the example clutch interface 1504, transfer device interface 1506, sensor interface 1508, and the example data analyzer 1510.

Coded instruction(s) 1806 to implement the methods of FIGS. 16 and 17 may be stored in a main memory 1808 of the processing platform 1800. The memory 1808 may include a volatile memory (e.g., random access memory device(s) such as Dynamic Random Access Memory (DRAM)) and a non-volatile memory (e.g., flash memory). Such processes and/or instructions may also be stored on a storage medium disk 1810 associated with the processor platform 1800, such as a hard drive (HDD) or portable storage medium, or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processing platform 1800 communicates, such as a server or computer.

Further, the claimed advancements may be provided as a utility application, background daemon, or component of an operating system, or combination thereof, executing in conjunction with the CPU 1802 and an operating system such as, for example, Microsoft Windows 7, Microsoft Windows 10, UNIX, Solaris, LINUX, Apple MAC-OS or any other system(s) known to those skilled in the art.

The hardware elements in order to achieve the processing platform 1800 may be realized by various circuitry elements, known to those skilled in the art. For example, the CPU 1802 may be a Xenon or Core processor from Intel of America or an Opteron processor from AMD of America, or may be other processor types that would be recognized by one of ordinary skill in the art. Alternatively, the CPU 1802 may be implemented on an FPGA, ASIC, PLD or using discrete logic circuits, as one of ordinary skill in the art would recognize. Further, the CPU 1802 may be implemented as multiple processors cooperatively working in parallel to perform the instructions of the inventive processes described above.

In some examples, the processor platform 1800 of FIG. 18 also includes a network controller 1812 such as, for example, an Intel Ethernet PRO network interface card from Intel Corporation of America for interfacing with one or more networks 1814. As can be appreciated, the network(s) 1814 can be one or more public networks (e.g., the Internet), private networks (e.g., a local area network (LAN), a wide area network (WAN), etc.) and/or sub-networks (e.g., a public switched telephone network (PSTN), an integrated services digital network (ISDN), etc.). The network(s) 1814 can also be wired, such as an Ethernet network, or can be wireless such as a cellular network including EDGE, 3G and 4G wireless cellular systems. The wireless network can also be WiFi, Bluetooth, or any other wireless form of communication that is known.

The processing platform 1800 of FIG. 18 includes a general purpose I/O interface circuit 1816 that interfaces and/or otherwise communicates with one or more input devices 1818 and/or one or more output devices 1820. The I/O interface circuit 1816 of FIG. 18 may be implemented as an Ethernet interface, a universal serial bus (USB), a PCI express interface, and/or any other type of standard interface.

The input devices 1818 are connected to the I/O interface 1816 and may include, for example, a keyboard, a mouse, a touchscreen, a button, a microphone, a voice recognition system, a camera, and/or any other suitable device(s) for enabling a user to input data and/or commands to the CPU 1802. As such, in some examples, the I/O interface circuit 1816 includes a display controller 1822 such as, for example, a NVIDIA GeForce GTX or Quadro graphics adaptor from NVIDIA Corporation of America for interfacing with a display (e.g., a Hewlett Packard HPL2445w LCD monitor).

The output device(s) 1820 are also connected to the I/O interface circuit 1816 and may include display devices such as, for example, a light-emitting diode (LED), a liquid crystal display, a touchscreen, a printer, a scanner (e.g., an OfficeJet or DeskJet from Hewlett Packard), a speaker, and/or any other device(s) for providing or presenting information (e.g., visual information and/or audible information) to a user. As such, in some examples, the I/O interface circuit includes a sound controller 1824 such as, for example, Sound Blaster X-Fi Titanium from Creative, to interface with a speaker and/or a microphone.

The processor platform 1800 of FIG. 18 also includes a general purpose storage controller 1826 that connects the storage medium disk 1810 with a communication bus 1828. The storage controller 1826 may also control access to the memory 1808. The communication bus 1828 of FIG. 18 may be an ISA, EISA, VESA, PCI, etc. for interconnecting all of the components of the processor platform 1800. For example, the CPU 1802 communicates with the main memory 1808 via the bus 1828.

It will be appreciated that the systems, apparatus, and methods to control fluid associated with vehicle clutches disclosed in the foregoing description provide numerous advantages. Examples disclosed herein control a flow of a fluid within a vehicle drive unit to reduce and/or eliminate fluid drag that would have otherwise been experienced by the clutch resulting from a transition of the vehicle between certain driving modes. Examples disclosed herein improve vehicle fuel economy after the transition of the vehicle.

Although certain example apparatus and articles of manufacture have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. An apparatus, comprising:
   a drive unit assembly for a vehicle including:
   a housing; and
   a clutch in a cavity of the housing, rotation of a drum of the clutch expelling a fluid from the cavity; and
   a vehicle controller configured to:
   disengage the clutch via an actuator, actuation of the actuator reducing a flow of the fluid into the cavity; and
   maintain engagement of a vehicle transfer device operatively coupled between a vehicle transmission and the drum such that the drum continues to rotate for a time interval during which the clutch is disengaged.

2. The apparatus of claim 1, wherein the vehicle controller is configured to disengage the vehicle transfer device to disconnect the drum from the transmission after the drum expels a predetermined amount of the fluid from the cavity.

3. The apparatus of claim 2, wherein the vehicle controller is configured to:
   detect a parameter associated with the vehicle via a sensor;
   determine when to disengage the vehicle transfer device based on the parameter; and
   disengage the vehicle transfer device in response to the determination.

4. The apparatus of claim 1, wherein the vehicle controller is configured to disengage the clutch by moving the actuator away from a clutch pack of the clutch to disconnect the drum from a first wheel of the vehicle.

5. The apparatus of claim 4, wherein the drive unit assembly includes a port positioned in the housing near the actuator and fluidly coupled to the cavity, a flow of the fluid through the port from a different cavity of the housing to the cavity based on a position of the actuator.

6. The apparatus of claim 4, wherein the clutch is a single clutch.

7. The apparatus of claim 4, wherein the clutch is a dual clutch.

8. The apparatus of claim 7, wherein the actuator is first actuator, and wherein the vehicle controller is configured to disengage the dual clutch by also moving a second actuator away from a second clutch pack of the dual clutch to disconnect the drum from a second wheel of the vehicle.

9. The apparatus of claim 8, wherein the controller is configured to move the first actuator and the second actuator before the vehicle transfer device disengages.

10. The apparatus of claim 1, wherein a flow rate of the fluid out of the cavity is greater than or equal to a flow rate of the fluid into the cavity when the clutch is disengaged.

11. An apparatus, comprising:
    a drive unit assembly for a vehicle including:
    a housing; and
    a clutch in a cavity of the housing, rotation of a drum of the clutch expelling a fluid from the cavity; and
    a vehicle controller configured to:
    disengage a vehicle transfer device operatively coupled between a vehicle transmission and the drum to disconnect the drum from the vehicle transmission; and
    disengage the clutch via an actuator such that the drum maintains a connection to a vehicle wheel for a time during which the vehicle transfer device is disengaged, actuation of the actuator reducing a flow of the fluid into the cavity.

12. The apparatus of claim 11, wherein the clutch is a dual clutch.

13. The apparatus of claim 12, wherein the actuator is a first actuator, and wherein the vehicle controller is configured to further disengage the dual clutch via a second actuator after the drum expels a predetermined amount of the fluid from the cavity.

14. The apparatus of claim 13, wherein the vehicle controller is configured to:
    detect a parameter associated with the vehicle via a sensor;
    determine when to further disengage the dual clutch based on the parameter; and
    further disengage the dual clutch via the second actuator in response to the determination.

15. The apparatus of claim 13, wherein the vehicle controller is configured to further disengage the dual clutch by moving the second actuator away from a clutch pack of the clutch to disconnect the drum from the vehicle wheel.

16. The apparatus of claim 15, wherein the vehicle controller is configured to move the first actuator before the vehicle transfer device disengages and the second actuator after the vehicle transfer vehicle disengages.

17. The apparatus of claim 13, wherein the vehicle controller is configured to maintain a position of the second actuator in which the second actuator is engaging a clutch such that the drum continues to rotate when the vehicle transfer device is disengaged.

18. The apparatus of claim 17, wherein the drive unit assembly includes a port positioned in the housing near the actuator and fluidly coupled to the cavity, a flow of the fluid through the port from a different cavity of the housing to the cavity based on a position of the actuator.

19. The apparatus of claim 11, wherein the vehicle controller is configured to disengage the clutch by moving the actuator away from a clutch pack of the clutch to disconnect to the drum from a different vehicle wheel.

20. The apparatus of claim 11, wherein a flow rate of the fluid out of the cavity is greater than or equal to a flow rate of the fluid into the cavity when the vehicle transfer device is disengaged.

* * * * *